US009725130B2

(12) United States Patent
Takano et al.

(10) Patent No.: US 9,725,130 B2
(45) Date of Patent: Aug. 8, 2017

(54) SUSPENSION DEVICE

(71) Applicants: Yamaha Hatsudoki Kabushiki Kaisha, Iwata-shi, Shizuoka (JP); KAYABA INDUSTRY CO., LTD., Minato-ku, Tokyo (JP)

(72) Inventors: Kazuhisa Takano, Shizuoka (JP); Toshio Iizuka, Shizuoka (JP); Yosuke Hirayama, Shizuoka (JP); Tsutomu Yoshimoto, Tokyo (JP); Yasuhiro Kitamura, Tokyo (JP)

(73) Assignees: YAMAHA HATSUDOKI KABUSHIKI KAISHA, Shizuoka (JP); KYB CORPORATION, Tokyo (JP)

( * ) Notice: Subject to any disclaimer, the term of this patent is extended or adjusted under 35 U.S.C. 154(b) by 95 days.

(21) Appl. No.: 14/437,892
(22) PCT Filed: Oct. 25, 2013
(86) PCT No.: PCT/JP2013/078943
§ 371 (c)(1),
(2) Date: Apr. 23, 2015
(87) PCT Pub. No.: WO2014/065396
PCT Pub. Date: May 1, 2014

(65) Prior Publication Data
US 2015/0259027 A1 Sep. 17, 2015

(30) Foreign Application Priority Data

Oct. 25, 2012 (JP) .................................. 2012-235604
Jul. 1, 2013 (JP) .................................. 2013-138474
Oct. 24, 2013 (JP) .................................. 2013-221440

(51) Int. Cl.
*B62K 25/08* (2006.01)
*B62K 5/08* (2006.01)
(Continued)

(52) U.S. Cl.
CPC ............... *B62K 25/08* (2013.01); *B62K 5/01* (2013.01); *B62K 5/027* (2013.01); *B62K 5/05* (2013.01);
(Continued)

(58) Field of Classification Search
CPC .......... B62K 5/01; B62K 5/027; B62K 25/08; B62K 5/05; B62K 5/08; B62K 5/10
See application file for complete search history.

(56) References Cited

U.S. PATENT DOCUMENTS

| 4,351,410 A * | 9/1982 | Townsend ................ B62D 9/02 180/210 |
| 2008/0115994 A1* | 5/2008 | Martini .................... B62D 9/02 180/210 |
| 2013/0168944 A1* | 7/2013 | Bartolozzi ............... B60G 3/01 280/269 |

FOREIGN PATENT DOCUMENTS

| CN | 2564464 Y | 8/2003 |
| CN | 101774414 A | 7/2010 |

(Continued)

OTHER PUBLICATIONS

Official Communication issued in International Patent Application No. PCT/JP2013/078943, mailed on Dec. 10, 2013.
(Continued)

*Primary Examiner* — Kevin Hurley
*Assistant Examiner* — Marlon A Arce
(74) *Attorney, Agent, or Firm* — Keating and Bennett, LLP

(57) ABSTRACT

A suspension device includes two telescopic elements and achieves reduction in a size of a vehicle including the suspension device while securing rigidity sufficient to endure a load applied from a road surface to a wheel supported by the suspension device. A second outer member is smaller than a first outer member and is connected to the first outer member via a first connection portion and a second connection portion arranged in the extension/contraction direction of a second telescopic element, the second outer member is connected to the first outer member via a first connection portion and a second connection portion (Continued)

arranged in the extension/contraction direction of the second telescopic element.

14 Claims, 16 Drawing Sheets

(51) Int. Cl.
*B62K 5/05* (2013.01)
*B62K 5/10* (2013.01)
*B62K 21/02* (2006.01)
*B62K 5/027* (2013.01)
*B62K 5/01* (2013.01)
*B62K 5/00* (2013.01)

(52) U.S. Cl.
CPC .................. *B62K 5/08* (2013.01); *B62K 5/10* (2013.01); *B62K 21/02* (2013.01); *B62K 2005/001* (2013.01)

(56) References Cited

FOREIGN PATENT DOCUMENTS

| CN | 202499247 U | 10/2012 |
| EP | 1 918 187 A1 | 5/2008 |
| JP | 63-176791 A | 7/1988 |
| JP | 63-176792 A | 7/1988 |
| JP | 63-180579 A | 7/1988 |
| TW | 201210882 A | 3/2012 |
| TW | 201210882 A1 | 3/2012 |
| WO | 2012/007819 A1 | 1/2012 |

OTHER PUBLICATIONS

Official Communication issued in corresponding European Patent Application No. 13848638.6, mailed on Sep. 30, 2015.
Official Communication issued in corresponding European Patent Application No. 13848638.6, mailed on Oct. 28, 2015.

* cited by examiner

SUSPENSION DEVICE

BACKGROUND OF THE INVENTION

1. Field of the Invention

The present invention relates to a suspension device including two telescopic elements.

2. Description of the Related Art

Suspension devices installed on a vehicle equipped with a vehicle body frame that is tilted in a left-right direction when the vehicle is cornering and two front wheels that are arranged in the left-right direction of the vehicle body frame are known (for example, refer to U.S. Pat. No. 4,351,410; Chinese Unexamined Patent Publication No. 101774414A; and WO 2012/007819).

The vehicle, equipped with the tiltable vehicle body frame and the two front wheels, has a link mechanism. The link mechanism includes cross members. The link mechanism also includes aright side rod for supporting a right end portion of an upper cross member and a left side rod for supporting a left end portion of the cross member. Intermediate portions of the cross members are supported via the vehicle body frame in front of a steering shaft. The cross members are supported on the vehicle body frame so as to be rotatable about an axis extending substantially in front-rear direction of the vehicle body frame. The cross members are rotated with respect to the vehicle body frame associated with the tilting of the vehicle body frame, whereby the relative positions of the two front wheels in up-down direction of the vehicle body frame are changed. In an upright state of the vehicle body frame, the cross members are provided above the two front wheels in the up-down direction of the vehicle body frame.

The vehicle equipped with the tiltable vehicle body frame and the two front wheels includes a right suspension device for supporting the right front wheel so that the right front wheel is movable in the up-down direction of the vehicle body frame and a left suspension device for supporting the left front wheel so that the left front wheel is movable in the up-down direction of the vehicle body frame. The right suspension device is supported on the right side rod so as to be rotatable about the axis of the right side rod. The left suspension device is supported on the left side rod so as to be rotatable about the axis of the left side rod. The vehicle described in each of U.S. Pat. No. 4,351,410 and Chinese Unexamined Patent Publication No. 101774414A is further equipped with a handle, a steering shaft and a rotation transmission mechanism. The handle is secured to the steering shaft. The steering shaft is supported on the vehicle body frame so as to be rotatable with respect thereto. When the handle is turned, the steering shaft is also rotated. The rotation transmission mechanism transmits the rotation of the steering shaft to the right suspension device and the left suspension device.

Numerous components to be installed on the vehicle are disposed on the right suspension device and the left suspension device and therearound. The components are brake components, such as brake discs and brake calipers, sensors, fenders, covers, wheels.

In U.S. Pat. No. 4,351,410, as viewed from the front side of a vehicle in the upright state of the vehicle body frame thereof, a right suspension device includes a right-right telescopic element positioned on the right of a right front wheel and a right-left telescopic element positioned on the left of the right front wheel in the left-right direction of the vehicle body frame. As viewed from the front side of the vehicle in the upright state of the vehicle body frame, a left suspension device includes a left-right telescopic element positioned on the right of a left front wheel and a left-left telescopic element positioned on the left of the left front wheel in the left-right direction of the vehicle body frame. Each telescopic element includes an outer portion and an inner portion of which at least a portion is inserted into the outer portion. The extension/contraction of the telescopic element is the relative movement of the inner portion with respect to the outer portion. When the right front wheel passes through a convex portion of the road surface, the right-right telescopic element and the right-left telescopic element extend and contract, and the right front wheel is displaced upward. At this time, the right-right telescopic element and the right-left telescopic element have rigidity capable of enduring the load applied from the road surface to the front wheel supported thereby. When the left front wheel passes through the convex portion of the road surface, the left-right telescopic element and the left-left telescopic element extend and contract, and the left front wheel is displaced upward. At this time, the left-right telescopic element and the left-left telescopic element have rigidity capable of enduring the load applied from the road surface to the front wheel supported thereby. As described above, the telescopic elements are required to have rigidity sufficient to endure the load applied from the road surface to the front wheel supported thereby. The vehicle disclosed in U.S. Pat. No. 4,351,410 has a configuration capable of sufficiently enduring the loads applied from the road surface to the right front wheel and the left front wheel by using the four telescopic elements.

However, in U.S. Pat. No. 4,351,410, as viewed from the front side of the vehicle in the upright state of the vehicle body frame, six members, that is, the right-right telescopic element, the right front wheel, the right-left telescopic element, the left-right telescopic element, the left front wheel and the left-left telescopic element, are arranged in the left-right direction of the vehicle body frame. Hence, the vehicle disclosed in U.S. Pat. No. 4,351,410 is large in the left-right direction of the vehicle body frame. As a result, the vehicle disclosed in U.S. Pat. No. 4,351,410 is large in the left-right direction because the six members are arranged in the left-right direction of the vehicle body frame although the vehicle can sufficiently endure the load applied from the road surface to the right front wheel and the left front wheel using the four telescopic elements.

For the purpose of downsizing a vehicle in the left-right direction of the vehicle body frame thereof, a vehicle has been proposed in each of Chinese Unexamined Patent Publication No. 101774414A and WO 2012/007819 in which, of the four telescopic elements thereof, the right-right telescopic element disposed on the right of the right front wheel and the left-left telescopic element disposed on the left of the left front wheel are moved to the space between the right front wheel and the left front wheel. The right suspension device according to each of Chinese Unexamined Patent Publication No. 101774414A and WO 2012/007819 includes a right-front telescopic element and a right-rear telescopic element disposed on the left of the right front wheel. In addition, the left suspension device includes a left-front telescopic element and a left-rear telescopic element disposed on the right of the left front wheel. The vehicle according to each of Chinese Unexamined Patent Publication No. 101774414A and WO 2012/007819 includes four telescopic elements as well as U.S. Pat. No. 4,351,410. As a result, the vehicle according each of Chinese Unexamined Patent Publication No. 101774414A and WO 2012/007819 can sufficiently endure the load applied from the road surface to the right front wheel and the left front wheel.

However, in a vehicle equipped with the tiltable vehicle body frame and the two front wheels, the right front wheel and the right suspension device are rotated about the axis of the right side rod associated with the turn of the handle. The left front wheel and the left suspension device are rotated about the axis of the left side rod associated with the turn of the handle. Furthermore, in the vehicle equipped with the tiltable vehicle body frame and the two front wheels, the relative positions of the right front wheel and the left front wheel in the up-down direction of the vehicle body frame are changed in association with the tilting of the vehicle body frame in the left-right direction. Similarly, the relative positions of the right suspension device and the left suspension device in the up-down direction are also changed. In addition, at this time, the distance between the right front wheel and the left front wheel becomes small in the left-right direction of the vehicle body frame. Similarly, the distance between the right suspension device and the left suspension device also becomes small.

The vehicle according to each of Chinese Unexamined Patent Publication No. 101774414A and WO 2012/007819 is equipped with four telescopic elements between the right front wheel and the left front wheel. Hence, in particular, when the handle is turned while the vehicle body frame is tilted in the left-right direction, the two telescopic elements of the right suspension device rotating about the axis of the right side rod may interfere with the left front wheel or the two telescopic elements of the left suspension device rotating about the axis of the left side rod. Similarly, when the handle is turned while the vehicle body frame is tilted in the left-right direction, the two telescopic elements of the left suspension device rotating about the axis of the left side rod may interfere with the right front wheel or the two telescopic elements of the right suspension device rotating about the axis of the right side rod. For avoiding such interference, it is necessary to increase the distance between the two telescopic elements of the right suspension device and the two telescopic elements of the left suspension device. Furthermore, it is also necessary to increase the distance between the right front wheel and the left front wheel. Hence, in the vehicle according to each of Chinese Unexamined Patent Publication No. 101774414A and WO 2012/007819, although downsizing of the vehicle is achieved by moving the telescopic elements provided on the right of the right front wheel and on the left of the left front wheel to the space between the right front wheel and the left front wheel, the downsizing in the left-right direction is not sufficient because the distance between the right front wheel and the left front wheel becomes large.

SUMMARY OF THE INVENTION

Preferred embodiments of the present invention provide a suspension device that includes two telescopic elements and is capable of downsizing a vehicle including the suspension device while securing rigidity sufficient to endure a load applied from a road surface to a wheel supported by the suspension device.

A suspension device according to a preferred embodiment of the present invention includes a first telescopic element including a first outer portion and a first inner portion of which one end portion is inserted into the first outer portion, and being capable of extending/contracting by relative movement of the first inner portion with respect to the first outer portion, a second telescopic element including a second outer portion which is connected to the first outer portion and a second inner portion of which one end portion is inserted into the second outer portion and which is connected to the first inner portion, and being capable of extending/contracting by relative movement of the second inner portion with respect to the second outer portion, a wheel support portion capable of supporting a wheel on one of an outer element including the first outer portion, the second outer portion and an outer connection portion connecting the first outer portion and the second outer portion and an inner element including the first inner portion, the second inner portion and an inner connection portion connecting the first inner portion and the second inner portion, and a vehicle body support portion capable of supporting the other one of the outer element and the inner element, on the vehicle body of the vehicle, wherein the second outer portion is smaller than the first outer portion and connected to the first outer portion via a plurality of the outer connection portions arranged in the extension/contraction direction of the second telescopic element, the second inner portion has a size equal to or smaller than the first inner portion and is connected to the first inner portion via at least one inner connection portion, and the second telescopic element is when viewed from the rotation axis direction of the wheel supported on the wheel support portion, disposed at a position in which the extension/contraction direction of the second telescopic element is parallel or substantially parallel with the extension/contraction direction of the first telescopic element, and when viewed from any one direction vertical with respect to the rotation axis of the wheel supported on the wheel support portion, disposed at a position in which the second telescopic element is overlapped with at least a portion of the first telescopic element.

With this configuration, the second outer portion is smaller than the first outer portion. In addition, the second inner portion has a size equal to or smaller than the first inner portion. Hence, the rigidity of the suspension device having this configuration may be lower than the rigidity of the suspension device according to each of Chinese Unexamined Patent Publication No. 101774414A and WO 2012/007819 equipped with two telescopic elements having the same size.

However, according to an aspect of various preferred embodiments of the present invention configuration, although the second outer portion is smaller than the first outer portion, the second outer portion is connected to the first outer portion via the plurality of outer connection portions arranged in the extension/contraction direction of the second telescopic element. In addition, although the second inner portion has a size equal to or smaller than the first inner portion, the second inner portion is connected to the first inner portion via at least one inner connection portion. As a result, the second telescopic element is connected to the first telescopic element at least at three positions in the extension/contraction direction of the second telescopic element. Furthermore, the second telescopic element is disposed at a position in which the extension/contraction direction of the second telescopic element is parallel or substantially parallel with the extension/contraction direction of the first telescopic element as viewed from the rotation axis direction of the wheel supported on the wheel support portion. Moreover, the second telescopic element is disposed at a position in which the second telescopic element is overlapped with at least a portion of the first telescopic element as viewed from any one direction vertical with respect to the rotation axis of the wheel supported on the wheel support portion.

The first telescopic element includes the first inner portion and the first outer portion. One end of the first inner portion is inserted into the first outer portion. In the first telescopic element, the insertion length of the first inner portion inserted into the first outer portion is changeable. When the first inner portion is pulled outward from the first outer portion, the insertion length of the first inner portion inserted into the first outer portion becomes short.

When the insertion length of the first inner portion inserted into the first outer portion becomes short, the first telescopic element is liable to be bent by the force exerted in the direction vertical with respect to the longitudinal length of the first telescopic element. When the load applied from the road surface to the wheel is transmitted to the suspension device, the force exerted in the direction vertical with to the longitudinal length is applied to the first telescopic element. In particular, since the first outer portion is a cylindrical member, when the force exerted in the direction vertical with respect to the longitudinal length is applied to the first telescopic element, the first outer portion is liable to be bent.

Hence, in a suspension device according to a preferred embodiment of the present invention, the second telescopic element is connected to the first telescopic element so that the rigidity against the force exerted in the direction vertical with respect to the longitudinal length of the first telescopic element is increased by the second telescopic element. In other words, the second telescopic element has a so-called "splint function" to significantly reduce or prevent the deformation of the first telescopic element. As a result, the suspension device secures rigidity sufficient to endure the load applied from the road surface to the wheel supported thereby.

With this configuration, the second outer portion is smaller than the first outer portion. In addition, the second inner portion has a size equal to or smaller than the first inner portion. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized.

Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The second outer portion is shorter than the first outer portion in the extension/contraction direction of the second telescopic element, and connected to the first outer portion via the plurality of outer connection portions arranged in the extension/contraction direction of the second telescopic element.

With this configuration, because the first outer portion of the second telescopic element, which is larger in diameter than the second inner portion, is shorter, the second telescopic element is made shorter than the first telescopic element. In addition, since the second outer portion is connected to the first outer portion via the plurality of outer connection portions arranged in the extension/contraction direction of the second telescopic element, the lowering of the rigidity is significantly reduced or prevented. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The second telescopic element is shorter than the first telescopic element, and at least one of the first telescopic element and the second telescopic element includes a component support portion capable of supporting components in a concave portion, which is provided by the first telescopic element and the second telescopic element as viewed from the rotation axis direction of the wheel supported on the wheel support portion.

Usually, the component support portion capable of supporting the components to be installed on the vehicle is provided around the first telescopic element and the second telescopic element. With this configuration, since the second telescopic element is shorter than the first telescopic element, the concave portion includes the first telescopic element and the second telescopic element at the end portions thereof in the longitudinal directions thereof as viewed from the rotation axis direction of the wheel supported on the wheel support portion. The component support portion capable of supporting the components to be installed on the vehicle is provided in the concave portion. For this reason, the suspension device including the component support portion is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The concave portion is provided in the outer element.

With this configuration, the concave portion is easily configured to include the first telescopic element and the second telescopic element that is shorter than the first telescopic element. Furthermore, since the first outer portion and the second outer portion are connected via the plurality of outer connection portions, the rigidity of the outer element is high. Since the concave portion is provided in the outer element having high rigidity, the concave portion has a simple structure. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The inner connection portion connects the other end portion of the first inner portion to the other end portion of the second inner portion.

With this configuration, since the inner connection portion connects the other end portion of the first inner portion to the other end portion of the second inner portion, the concave portion is provided on one end side of the second telescopic element that is shorter than first telescopic element. Since the component support portion is configured to include the concave portion, the space thereof is used efficiently, and the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The wheel support portion is provided on the outer element and the vehicle body support portion is provided on the inner element.

The direction of the load transmitted from the wheel to the wheel support portion changes depending on the steering of the wheel and the tilting of the vehicle. Hence, when an attempt is made to provide rigidity necessary for the wheel support portion, the wheel support portion tends to become large.

With this configuration, since the first outer portion and the second outer portion are connected via the plurality of outer connection portions, the rigidity of the outer element is high. Since the wheel support portion is provided on the outer element having high rigidity, the wheel is supported with high rigidity. In addition, since the outer element is larger than the inner element, the wheel support portion is configured to have a simple structure by providing a hole in the outer element, for example. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

Moreover, since the wheel support portion is provided in the concave portion configured to include the first telescopic element and the second telescopic element that is shorter than the first telescopic element, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The inner connection portion connects the other end portion of the first inner portion to the other end portion of the second inner portion, and the vehicle body support portion is provided on the inner connection portion.

With this configuration, since the inner connection portion connects the other end portion of the first inner portion to the other end portion of the second inner portion, the distance between the first inner portion and the second inner portion is small. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The vehicle body support portion is provided on the outer element.

Since the outer portion is larger than the inner portion, it is liable to interfere with the wheel. However, with this configuration, the wheel support portion is provided on the inner element and the vehicle body support portion is provided on the outer element. In other words, since the outer portion is spaced away from the wheel, the left and right suspension devices is disposed close to each other, and the width of the vehicle is small. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The vehicle body support portion is provided on the first outer portion.

With this configuration, the vehicle body support portion is configured to include the first outer portion that is larger than the second outer portion. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The inner connection portion connects the other end portion of the first inner portion to the other end portion of the second inner portion at the same position in the extension/contraction direction of the second telescopic element.

With this configuration, the inner connection portion is small. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

This configuration may preferably be combined with various configurations described above. With this configuration, the concave portion including the first telescopic element and the second telescopic element is large. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

It is preferable that a suspension device according to a preferred embodiment of the present invention has the following configuration.

The second inner portion is smaller than the first inner portion in the direction vertical with respect to the extension/contraction direction of the second telescopic element as viewed from the rotation axis direction of the wheel supported on the wheel support portion and is also smaller than the first inner portion in the direction vertical with respect to the extension/contraction direction of the second telescopic element as viewed from any one direction vertical with respect to the rotation axis of the wheel supported on the wheel support portion.

With this configuration, since the inner portion of the second telescopic element is small, the outer portion thereof is also able to be small. Furthermore, the inner connection portion is also able to be small. For this reason, the suspension device is downsized. Hence, in the case that the suspension device according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

Preferred embodiments of the present invention provide a suspension device including two telescopic elements and being capable of downsizing a vehicle equipped therewith while securing rigidity sufficient to endure the load applied from the road surface to the wheel supported thereby.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
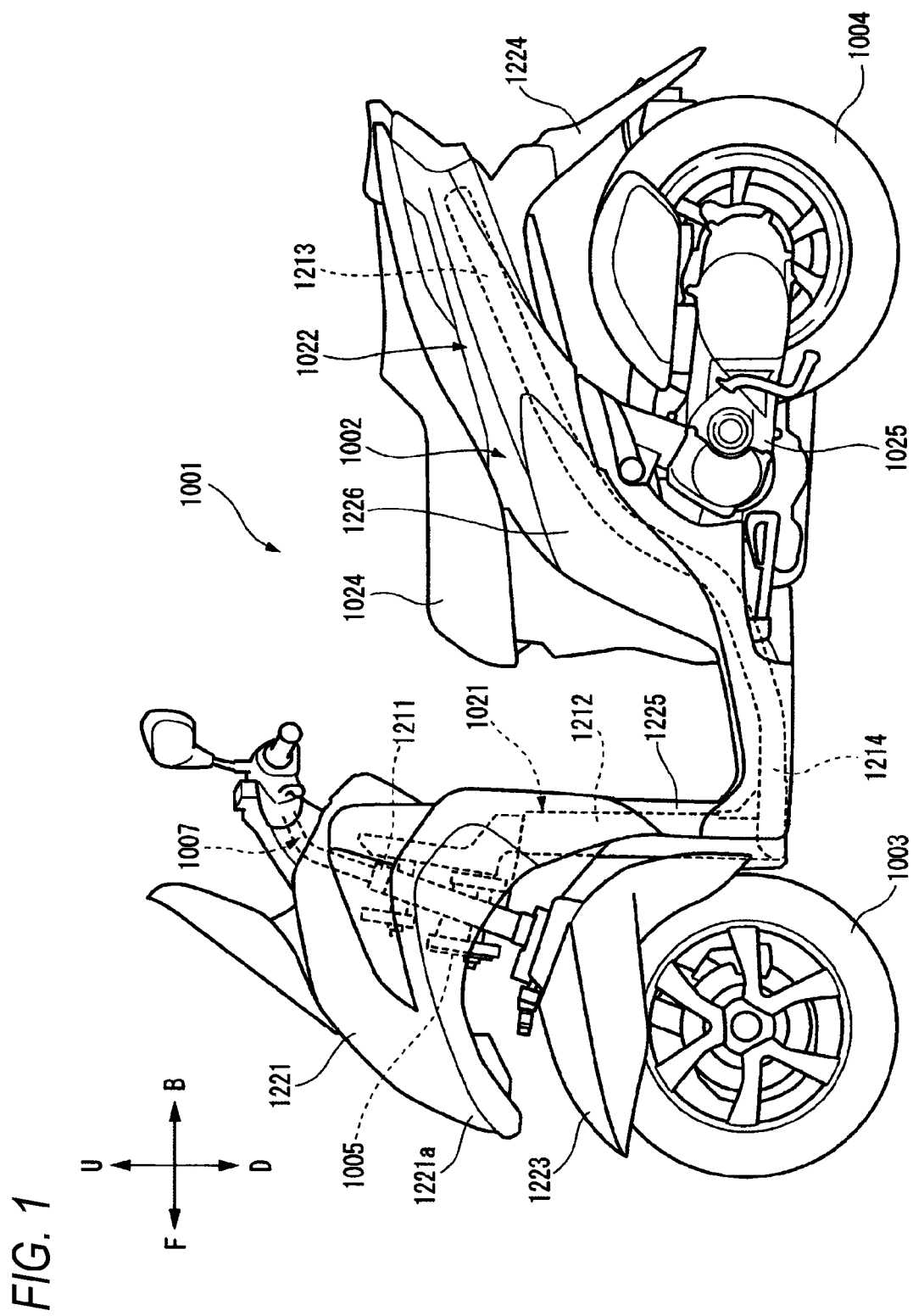
FIG. 1 is an overall side view showing a vehicle according to a first preferred embodiment of the present invention.

The vehicle according to each of Chinese Unexamined Patent Publication No. 101774414A and WO 2012/007819 can sufficiently endure the loads applied from the road surface to the right front wheel and the left front wheel. The downsizing of the vehicle according to each of Chinese Unexamined Patent Publication No. 101774414A and WO 2012/007819 in the left-right direction thereof is attained by moving the telescopic elements provided on the right of the right front wheel and on the left of the left front wheel to the space between the right front wheel and the left front wheel. However, the downsizing in the left-right direction is not sufficient because the distance between the right front wheel and the left front wheel becomes large. In order to attain the downsizing of the vehicle equipped with the telescopic elements while securing rigidity sufficient to endure the loads applied from the road surface to the wheels supported thereby, the inventors of the present invention studied the loads applied to the telescopic elements. As a result, the inventors have discovered that the largest load among the loads applied to the telescopic elements is the load applied in the direction vertical with respect to the rotation axis of the wheel supported on the wheel support portion. The inventors of the present invention have concluded that the suspension device of the vehicle is merely required to have a configuration capable of sufficiently enduring the load applied in the direction vertical with respect to the rotation axis of the wheel supported on the wheel support portion.

Then, the inventors of the present invention first studied to the layout of the telescopic elements. In the vehicle according to U.S. Pat. No. 4,351,410, six members, that is, the right-right telescopic element, the right front wheel, the right-left telescopic element, the left-right telescopic element, the left front wheel and the left-left telescopic element, are arranged in the left-right direction of the vehicle body frame. With this configuration, for example, since the right front wheel is supported on the right-right telescopic element and the right-left telescopic element on the left side and the right side, the right-right telescopic element and the right-left telescopic element preferably have the same rigidity. Similarly, the left-right telescopic element and the left-left telescopic element preferably have the same rigidity.

However, in the vehicle according to each of Chinese Unexamined Patent Publication No. 101774414A and WO 2012/007819, the right suspension device is equipped with a right-front telescopic element and a right-rear telescopic element disposed on the left of the right front wheel. In addition, the left suspension device thereof is equipped with a left-front telescopic element and a left-rear telescopic element disposed on the right of the left front wheel. Here, the inventors have discovered that the right-front telescopic element and the right-rear telescopic element are not necessarily required to have the same rigidity. Similarly, the inventors also have discovered that the left-front telescopic element and the left-rear telescopic element are not necessarily required to have the same rigidity.

Each telescopic element includes an inner element and an outer element. One end of the inner element is inserted into the outer element. In the telescopic element, the insertion length of the inner element into the outer element is changeable. When the inner element is pulled outward from the outer element, the insertion length of the inner element inserted into the outer element becomes short.

When the insertion length of the inner element inserted into the outer element becomes short, the telescopic element is liable to be bent by a force applied in the direction vertical with respect to the longitudinal direction of the telescopic element. When the load applied from the road surface to the wheel is transmitted to the suspension device, the force applied in the direction vertical with respect to the longitudinal direction is exerted to the telescopic element. The telescopic element is required to have rigidity capable of enduring this load in a state in which the inner element is pulled outward from the outer element at the maximum.

Then, the inventors of the present invention studied the function of the telescopic element. Normally, in the case that the downsizing of the vehicle in the left-right direction is desired to be attained, only the first telescopic element is merely required to be used instead of providing the second telescopic element. However, if an attempt is made to secure sufficient rigidity using only the first telescopic element, the first telescopic element becomes large in diameter or becomes long, whereby the first telescopic element becomes very large.

Accordingly, the inventors of the present invention have noticed that, when the first telescopic element receives the load in the direction vertical with respect to the rotation axis of the wheel supported on the wheel support portion, a function to increase its rigidity is merely required for the second telescopic element. Furthermore, the inventors have thought that the second telescopic element preferably is configured to significantly reduce or prevent the deformation of the first telescopic element due to the load applied from the road surface to the supported wheel, that is, the so-called splint function. The inventors have also thought that the size of the second telescopic element is configured to be small by designing a suspension device in which the second telescopic element serves as a member having the splint function instead of a member having a function of supporting the wheel.

As a result of these studies, the inventors of the present invention have discovered and conceived of the following configurations. The second outer portion is made smaller than the first outer portion and connected to the first outer portion via a plurality of outer connection portions arranged in the extension/contraction direction of the second telescopic element. In addition, the second inner portion has a size equal to or smaller than the first inner portion and connected to the first inner portion via at least one inner connection portion. Hence, the second telescopic element is connected to the first telescopic element at least at three positions in the extension/contraction direction of the second telescopic element. Moreover, the second telescopic element is disposed at a position in which the extension/contraction direction of the second telescopic element is parallel or substantially parallel with the extension/contraction direction of the first telescopic element as viewed from the rotation axis direction of the wheel supported on the wheel support portion. Furthermore, the second telescopic element is disposed at a position in which the second telescopic element is overlapped with at least a portion of the first telescopic element as viewed from any one direction vertical with respect to the rotation axis of the wheel supported on the wheel support portion. Hence, the second telescopic element is configured to significantly reduce or prevent the deformation of the first telescopic element due to the load applied from the road surface to the supported wheel, that is, the so-called splint function. For this reason, the suspension device secures rigidity sufficient to endure the load applied from the road surface to the supported wheel. In addition, the second outer portion is made smaller than the first outer portion and the second inner portion is made equal to or smaller than the first inner portion. Hence, in the case that a suspension device according to various preferred embodiments of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized.

With this configuration, the vehicle equipped with the suspension device is downsized while securing the rigidity sufficient to endure the load applied from the road surface to the supported wheel.

The inventors of the present invention have adopted the configuration that is considered to be disadvantageous from the viewpoint of rigidity while knowing that such a configuration is disadvantageous in some aspects. The configuration is disadvantageous in that the second outer portion is made smaller than the first outer portion and the second inner portion is made the same size as or smaller than the first inner portion. The inventors of the present invention have assumed that the configuration was not considered conventionally because it is disadvantageous from the viewpoint of rigidity. The inventors were able to change the way of thinking because the inventors have discovered through their study that the splint function is merely required to be provided for the second telescopic element. This is an idea not obtained through the thinking of only the rigidity required for a suspension device for supporting a wheel, and this is the best idea obtained as a result of thinking of both the rigidity and the downsizing of dimension in the left-right direction.

The present invention will be described below on the basis of preferable preferred embodiments referring to the drawings.

First Preferred Embodiment

A first preferred embodiment of a suspension device according to the preferable preferred embodiments of the present invention will be described below referring to FIGS. 1 to 8.

In the first preferred embodiment, suspension devices installed on a three-wheel vehicle (hereafter referred to as a vehicle) including two front wheels and one rear wheel will be exemplified.

FIG. 1 is an overall side view showing the vehicle as viewed from the left of the vehicle. In the following descriptions, an arrow F in the figures indicates the forward direction of the vehicle and an arrow B indicates the rearward direction of the vehicle. An arrow U indicates the upward direction of the vehicle and an arrow D indicates the downward direction of the vehicle. In the case that the front-rear direction and the left-right directions are indicated in the descriptions, the directions denote the front-rear direction and the left-right direction as viewed from the occupant who drives the vehicle. The center in the vehicle width direction denotes the center position in the vehicle width direction. In addition, the upright state of the vehicle denotes a state in which the front wheels are not steered or tilted.

As shown in FIG. 1, a vehicle 1001 is equipped with a vehicle main body 1002, a pair of left and right front wheels 1003, a rear wheel 1004, a steering mechanism 1007 and a link mechanism 1005. The vehicle main body 1002 is equipped with a vehicle body frame 1021, a vehicle body cover 1022, a seat 1024 and a power unit 1025.

The vehicle body frame 1021 includes a head pipe 1211, a down frame 1212, an under frame 1214 and a rear frame 1213. In FIG. 1, a portion of the vehicle body frame 1021 covered with the vehicle body cover 1022 is indicated in broken lines. The vehicle body frame 1021 supports the power unit 1025, the seat 1024, and the like. The power unit 1025 includes a drive source, such as an engine or an electric motor, and a transmission.

The head pipe 1211 is disposed in the front portion of the vehicle 1001. The head pipe 1211 is disposed so as to be slightly inclined with respect to the vertical direction so that its upper portion is positioned slightly behind its lower portion in a side view of the vehicle. The steering mechanism 1007 and the link mechanism 1005 are disposed around the head pipe 1211. The steering shaft 1060 of the steering mechanism 1007 is rotatably inserted into the head pipe 1211. The head pipe 1211 supports the link mechanism 1005.

The down frame 1212 is connected to the head pipe 1211. The down frame 1212 is disposed behind the head pipe 1211 and extends in the up-down direction. The under frame 1214 is connected to the lower portion of the down frame 1212. The under frame 1214 extends rearward from the lower portion of the down frame 1212. Behind the under frame 1214, the rear frame 1213 extends rearward and upward. The rear frame 1213 supports the seat 1024, the power unit 1025 and a tail lamp, and the like.

The vehicle body frame 1021 is covered with the vehicle body cover 1022. The vehicle body cover 1022 includes a front cover 1221, a pair of left and right front fenders 1223, a leg shield 1225, and a center cover 1226 and a rear fender 1224.

The front cover 1221 is positioned in front of the seat 1024. The front cover 1221 covers at least a portion of the steering mechanism 1007 and a portion of the link mechanism 1005. The leg shield 1225 is disposed below the front cover 1221 and in front of the seat 1024. The center cover 1226 is disposed so as to cover the circumference of the rear frame 1213.

The pair of left and right front fenders 1223 (refer to FIG. 2) is disposed below the front cover 1221 and above the pair of left and right front wheels 1003. The rear fender 1224 is disposed behind and above the rear wheel 1004.

The pair of left and right front wheels 1003 is disposed below the head pipe 1211 and below the front cover 1221 in the upright state. The rear wheel 1004 is disposed below the center cover 1226 and the rear fender 1224.

Figure 2:
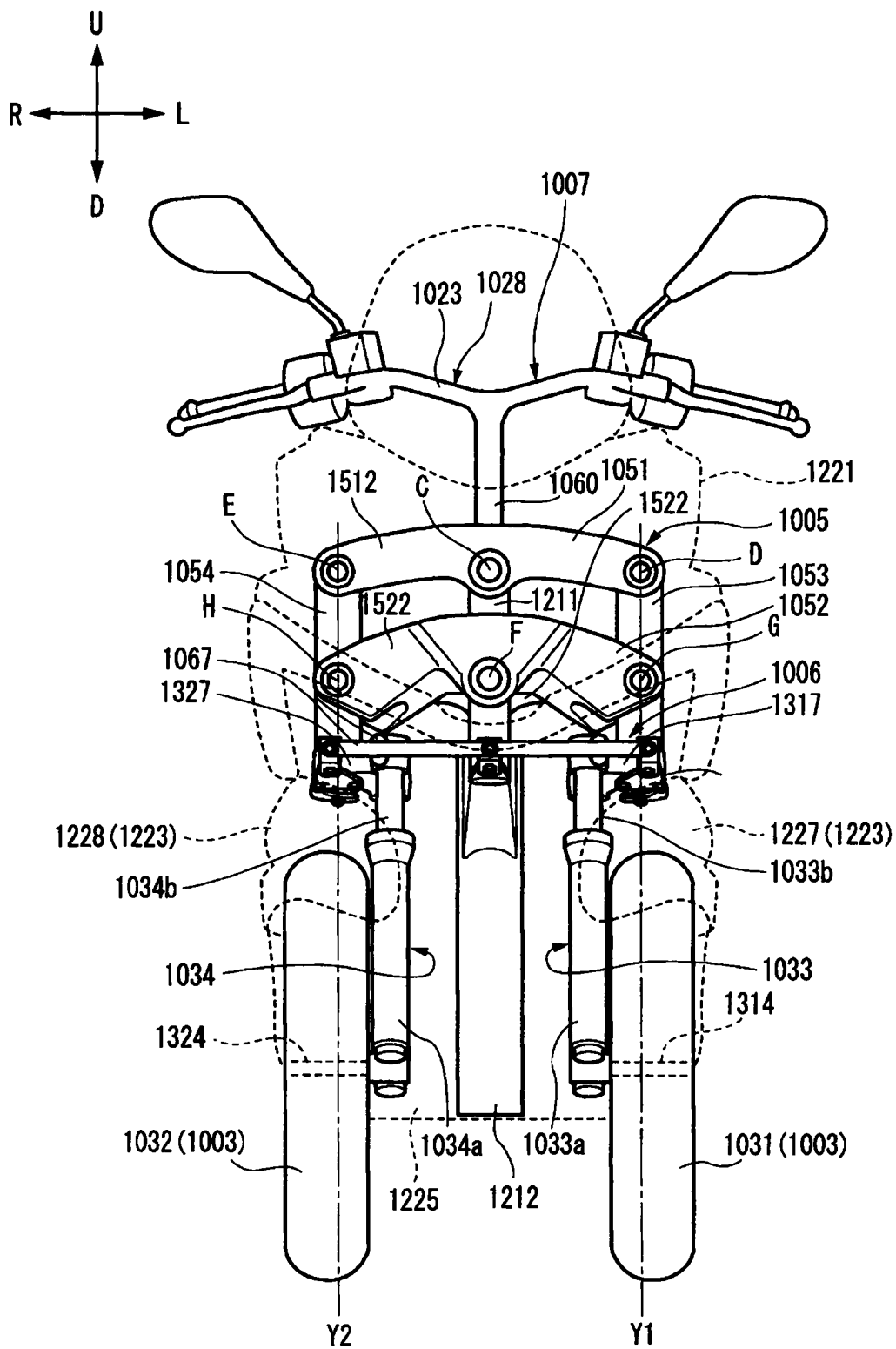
FIG. 2 is a front view showing the front portion of the vehicle of FIG. 1.
Figure 3:
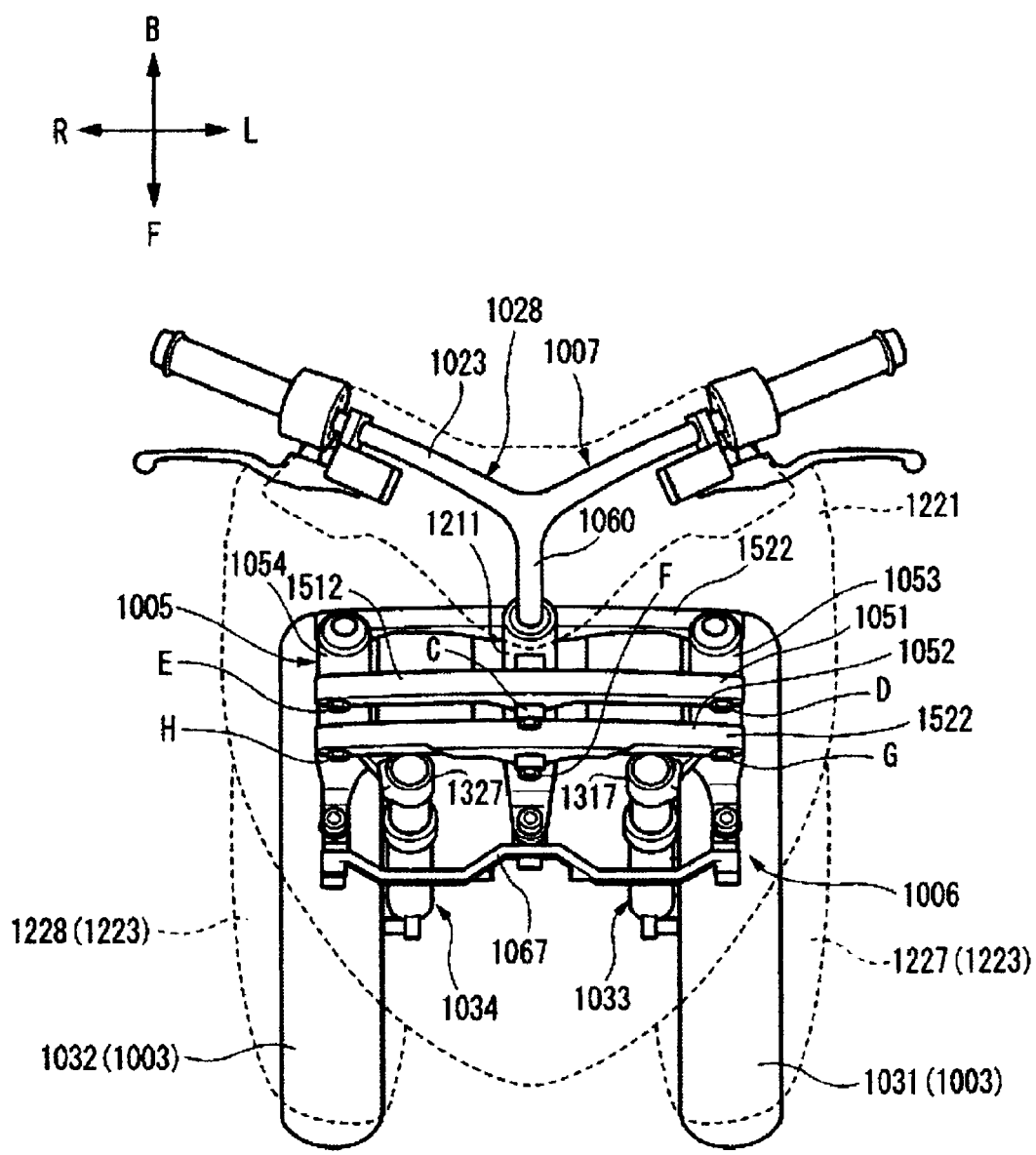
FIG. 3 is a plan view showing the front portion of the vehicle of FIG. 1.

FIG. 2 is a front view showing the front portion of the vehicle 1001 of FIG. 1 as viewed from the front. FIG. 3 is a plan view showing the front portion of the vehicle 1001 of FIG. 1 as viewed from above. FIG. 2 and FIG. 3 show the vehicle observed by seeing through the vehicle body cover 1022.

As shown in FIGS. 2 and 3, the steering mechanism 1007 includes a steering force transmission mechanism 1006, a first shock absorber 1033, a second shock absorber 1034 and the pair of left and right front wheels 1003.

The pair of left and right front wheels 1003 includes a first front wheel 1031 and a second front wheel 1032. The first front wheel 1031 is disposed on the left side in the vehicle width direction as viewed from the front of the vehicle 1001 in the upright state of the vehicle. The second front wheel 1032 is disposed on the right side in the vehicle width direction as viewed from the front of the vehicle 1001 in the upright state of the vehicle. The first front wheel 1031 and the second front wheel 1032 are disposed so as to be symmetric with each other in the vehicle width direction in the upright state of the vehicle. Furthermore, the first front fender 1227 of the pair of left and right front fenders 1223 is disposed above the first front wheel 1031. The second front fender 1228 of the pair of left and right front fenders 1223 is disposed above the second front wheel 1032. The first front wheel 1031 is supported via the first shock absorber 1033 (an example of the suspension device according to a preferred embodiment of the present invention). The second front wheel 1032 is supported via the second shock absorber 1034 (an example of the suspension device according to a preferred embodiment of the present invention).

The first shock absorber 1033 is the so-called telescopic shock absorber and dampens vibrations due to the load applied from the road surface to the first front wheel 1031 supported thereby. The first shock absorber 1033 includes a first lower portion 1033*a* (an example of an outer element according to a preferred embodiment of the present invention) and a first upper portion 1033*b* (an example of an inner element according to a preferred embodiment of the present invention). The first shock absorber 1033 includes a first side member support portion 1053A. The first front wheel 1031 is supported on the first lower portion 1033*a*. The first lower portion 1033*a* extends in the up-down direction and a first axle 1314 is supported at its lower end. The first axle 1314 supports the first front wheel 1031. The first upper portion 1033*b* is disposed above the first lower portion 1033*a* in a state in which a portion thereof is inserted into the first lower portion 1033*a*. The first upper portion 1033*b* is movable relatively with respect to the first lower portion 1033*a* in the extension direction of the first lower portion 1033*a*, thus being able to extend/contract. The upper portion of the first upper portion 1033*b* is secured to a first bracket 1317 which, together with the first side member support portion 1053A, is an example of a vehicle body support portion. The lower portion of the first side member support portion 1053A is secured to the first bracket 1317. The extension direction of the first lower portion 1033*a* coincides with the extension/contraction direction of the first shock absorber 1033.

The first lower portion 1033*a* and the first upper portion 1033*b* constitute two telescopic elements connected in parallel or substantially parallel in the front-rear direction. The first upper portion 1033*b* is prevented from being rotated relatively with respect to the first lower portion 1033*a*.

The second shock absorber 1034 is the so-called telescopic shock absorber and dampens vibrations due to the load applied from the road surface to the second front wheel 1032 supported thereby. The second shock absorber 1034 includes a second lower portion 1034*a* (an example of the outer element according to a preferred embodiment of the present invention) and a second upper portion 1034*b* (an example of the inner element according to a preferred embodiment of the present invention). The second shock absorber 1034 includes a second side member support portion 1054A. The second front wheel 1032 is supported via the second lower portion 1034*a*. The second lower portion 1034*a* extends in the up-down direction and a second axle 1324 is supported at its lower end. The second axle 1324 supports the second front wheel 1032. The second upper portion 1034*b* is disposed above the second lower portion 1034*a* in a state in which a portion thereof is inserted into the second lower portion 1034*a*. The second upper portion 1034*b* is movable relatively with respect to the second lower portion 1034*a* in the extension direction of the second lower portion 1034*a*, thus being able to extend/contract. The upper portion of the second upper portion 1034*b* is secured to a second bracket 1327. The lower portion of the second side member support portion 1054A is secured to the second bracket 1327. The extension direction of the second lower portion 1034*a* coincides with the extension/contraction direction of the second shock absorber 1034.

The second lower portion 1034*a* and the second upper portion 1034*b* constitute two telescopic elements connected parallel or substantially parallel in the front-rear direction. The second upper portion 1034*b* is prevented from being rotated relatively with respect to the second lower portion 1034*a*.

The steering force transmission mechanism 1006 is disposed above the first front wheel 1031 and the second front wheel 1032. The steering force transmission mechanism 1006 is equipped with a steering member 1028 serving as a member to which the operation force of the occupant is input. The steering member 1028 includes the steering shaft 1060 and a handlebar 1023 connected to the upper portion of the steering shaft 1060. The steering shaft 1060, a portion of which is inserted into the head pipe 1211, is disposed so as to extend substantially in the up-down direction and is rotatable with respect to the head pipe 1211. The steering shaft 1060 is rotated in accordance with the operation of the handlebar 1023 by the occupant.

The steering force transmission mechanism 1006 includes the steering member 1028, a tie rod 1067, the first bracket 1317 and the second bracket 1327. The steering force transmission mechanism 1006 transmits the steering force exerted by the occupant to operate the handlebar 1023 to the first bracket 1317 and the second bracket 1327.

In this example, the link mechanism 1005, a parallel four-bar link (also referred to as a parallelogram link) type, is preferably adopted, for example.

The link mechanism 1005 is disposed below the handlebar 1023 as viewed from the front of the vehicle 1001 in the upright state of the vehicle. The link mechanism. 1005 is connected to the head pipe 1211 of the vehicle body frame 1021. The link mechanism 1005 is equipped with a first cross member 1051, a second cross member 1052, a first side member 1053 and a second side member 1054.

The first cross member 1051 includes a plate-shaped member 1512 disposed in front of the head pipe 1211 and extending in the vehicle width direction. The intermediate portion of the plate-shaped member 1512 is supported on the head pipe 1211 via a support portion C. The support portion C is a boss provided on the head pipe 1211. The first cross member 1051 is rotatable about its intermediate upper axis extending in the front-rear direction with respect to the head pipe 1211. The first cross member 1051 is rotatable about its intermediate upper axis extending in the front-rear direction with respect to the vehicle body frame 1021. The first cross member 1051 is rotatable about its intermediate upper axis extending forward in the front-rear direction and upward with respect to the vehicle body frame 1021.

The left end of the first cross member 1051 is connected to the first side member 1053 at a support portion D. The support portion D is a boss provided on the first side member 1053. The first cross member 1051 is rotatable about the left upper axis extending in the front-rear direction with respect to the first side member 1053. The right end of the first cross member 1051 is supported on the second side member 1054 via a support portion E. The support portion E is a boss provided on the first side member. The first cross member 1051 is rotatable about the right upper axis extending in the front-rear direction with respect to the second side member 1054. The intermediate upper axis, the left upper axis and the right upper axis are parallel or substantially parallel with one another. In the upright state of the vehicle, the intermediate upper axis, the left upper axis and the right upper axis extend forward in the front-rear direction and upward in the up-down direction.

The intermediate portion of the second cross member 1052 is supported on the head pipe 1211 via a support portion F. The support portion F is a boss provided on the head pipe 1211. The second cross member 1052 is rotatable about its intermediate lower axis extending in the front-rear direction with respect to the head pipe 1211. The second cross member 1052 is disposed below the first cross member 1051 in the up-down direction of the vehicle in the upright state of the vehicle. The second cross member 1052 has a length equal or approximately equal to that of the first cross member 1051 in the vehicle width direction and is disposed parallel or substantially parallel with the first cross member 1051.

The second cross member 1052 includes a pair of plate-shaped members 1522, 1522 extending in the left-right direction of the vehicle. The pair of plate-shaped members 1522, 1522 is disposed in front of and behind the head pipe 1211 in the front-rear direction. The pair of plate-shaped members 1522, 1522 is integrally connected to each other via a connection portion 1523. However, the connection portion 1523 may be integrated with or separated from the pair of plate-shaped members 1522, 1522. The left end of the second cross member 1052 is supported on the first side member 1053 via a support portion G. The support portion G is a boss provided on the first side member 1053. The second cross member 1052 is rotatable about its left lower axis extending in the front-rear direction with respect to the first side member 1053. The right end of the second cross member 1052 is supported on the second side member 1054 via a support portion H. The support portion H is a boss provided on the second side member 1054. The second cross member 1052 is rotatable about its right lower axis extending in the front-rear direction with respect to the second side member 1054. The intermediate lower axis, the left lower axis and the right lower axis are parallel or substantially parallel with one another. In the upright state of the vehicle, the intermediate lower axis, the left lower axis and the right lower axis extend forward in the front-rear direction and upward in the up-down direction.

The first side member 1053 is disposed on the left of the head pipe 1211 and extends parallel or substantially parallel with the extension direction of the head pipe 1211. The first side member 1053 is disposed above the first front wheel 1031 and above the first shock absorber 1033. The first side member support portion 1053A is rotatably supported on the inner circumference of the first side member 1053. The first shock absorber 1033 is installed so as to be rotatable about a first center axis Y1 with respect to the first side member 1053.

The second side member 1054 is disposed on the right of the head pipe 1211 and extends parallel or substantially parallel with the extension direction of the head pipe 1211. The second side member 1054 is disposed above the second front wheel 1032 and above the second shock absorber 1034. The second side member support portion 1054A is rotatably supported on the inner circumference of the second side member 1054. The second shock absorber 1034 is installed so as to be rotatable about a second center axis Y2 with respect to the second side member 1054.

As described above, the first cross member 1051, the second cross member 1052, the first side member 1053 and the second side member 1054 are connected so that the first cross member 1051 and the second cross member 1052 are postured so as to be parallel or substantially parallel with each other and so that the first side member 1053 and the second side member 1054 are postured so as to be parallel or substantially parallel with each other.

Figure 4:
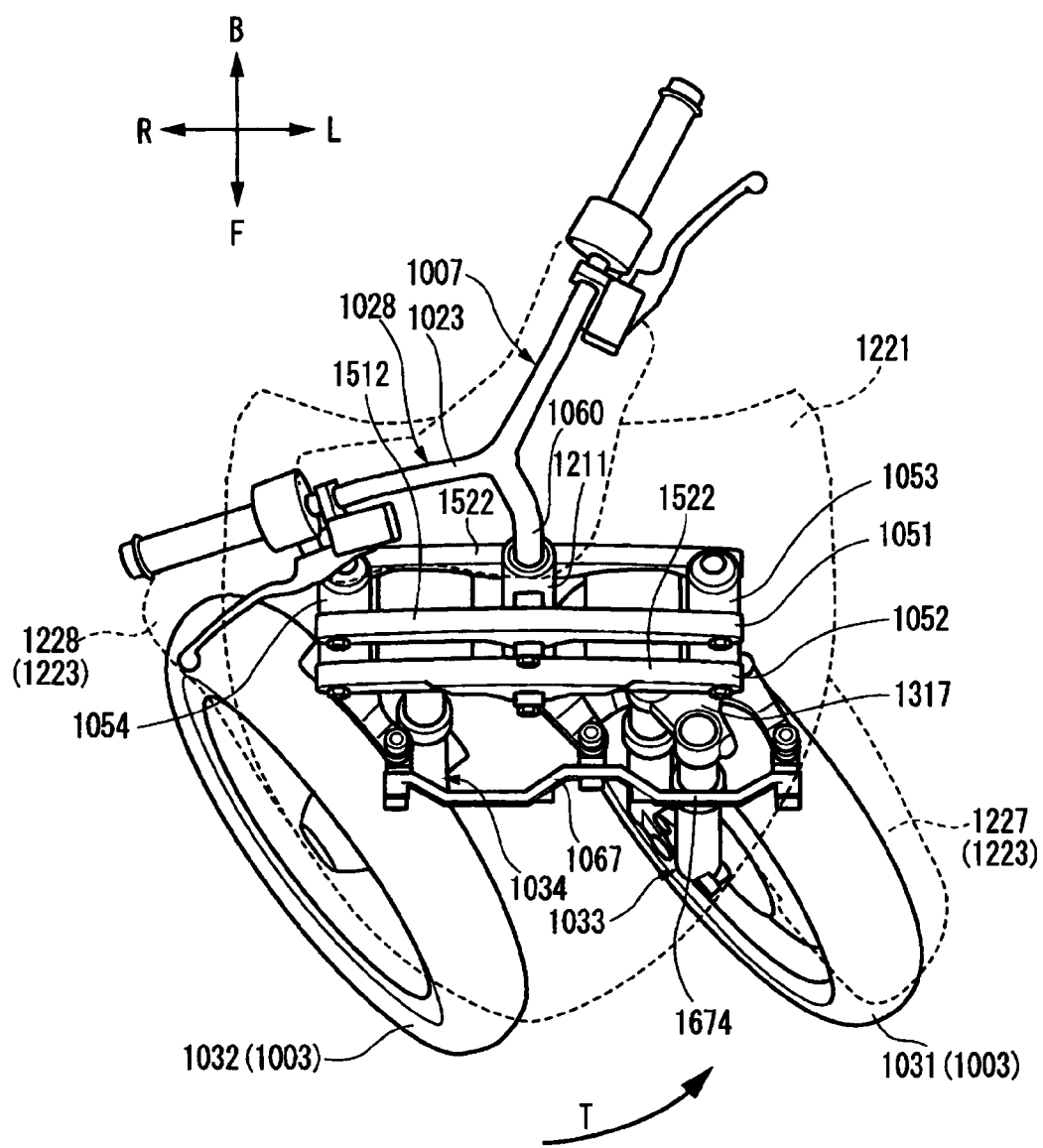
FIG. 4 is a plan view showing the front portion of the vehicle in a state in which the vehicle of FIG. 1 is steered.

FIG. 4 is a view illustrating the steering operation of the vehicle 1001 and is a plan view showing the front portion of the vehicle in a state in which the vehicle 1001 is steered.

As shown in FIG. 4, when the handlebar 1023 is turned in the left-right direction, the steering force transmission mechanism 1006 of the steering mechanism 1007 is operated, and a steering operation is performed.

For example, when the steering shaft 1060 is rotated in the direction of the arrow T of FIG. 4, the tie rod 1067 is moved in the left rearward direction. The first bracket 1317 and the second bracket 1327 are rotated in the direction of the arrow T in accordance with the movement of the tie rod 1067 in the left rearward direction. When the first bracket 1317 and the second bracket 1327 are rotated in the direction of the arrow T, the first front wheel 1031 is rotated about the first center axis Y1 (refer to FIG. 2) and the second front wheel 1032 is rotated about the second center axis Y2 (refer to FIG. 2).

Figure 5:
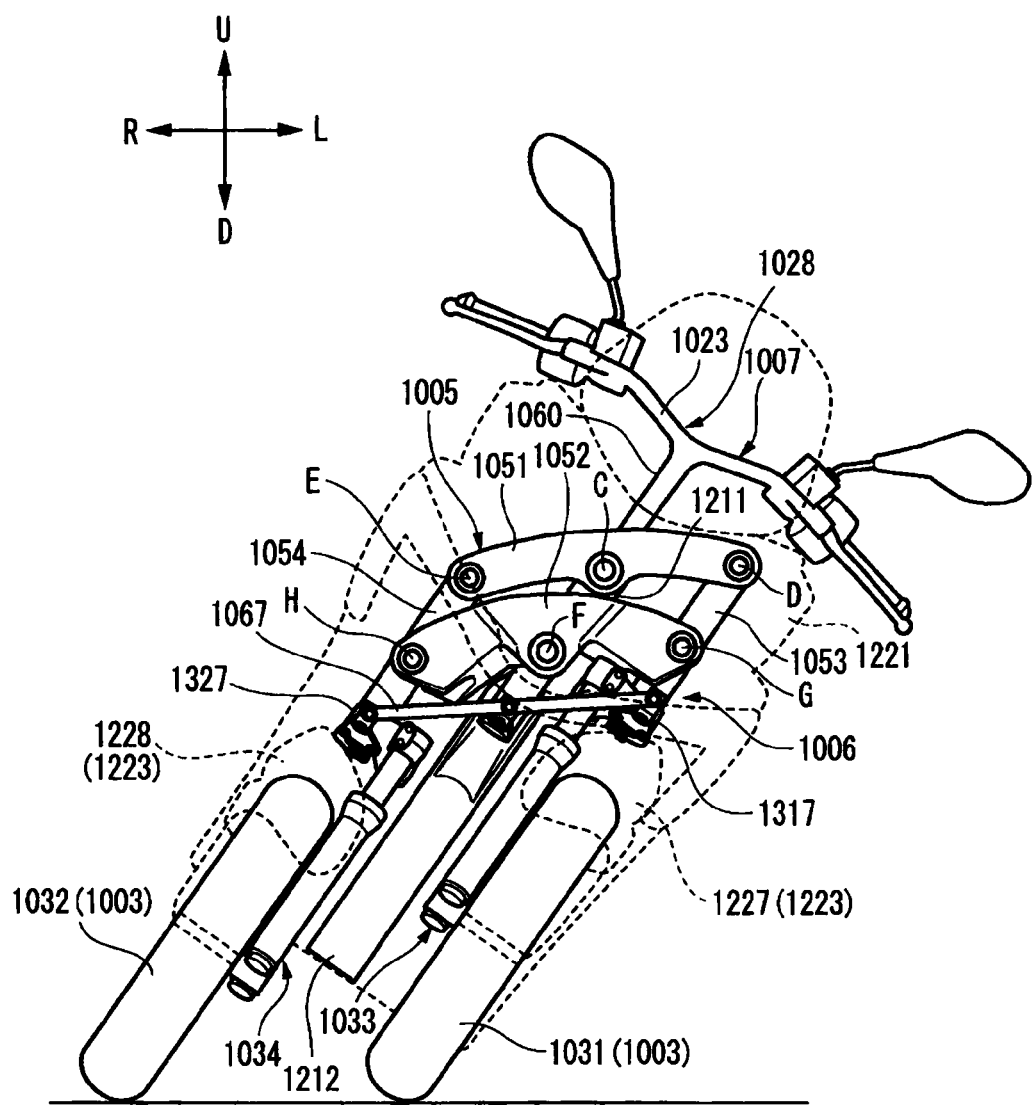
FIG. 5 is a front view showing the front portion of the vehicle in a state in which the vehicle of FIG. 1 is tilted.

FIG. 5 is a view illustrating the tilting operation of the vehicle 1001 and is a front view showing the front portion of the vehicle in a state in which the vehicle 1001 is tilted.

As shown in FIG. 5, in accordance with the operation of the link mechanism 1005, the vehicle 1001 is tilted in the left-right direction. The operation of the link mechanism 1005 means that the respective members (the first cross member 1051, the second cross member 1052, the first side member 1053 and the second side member 1054) configured to perform the tilting operation in the link mechanism 1005 are rotated relatively about their respective connection points and that the shape of the link mechanism 1005 is changed.

In the link mechanism 1005 of this preferred embodiment, for example, in the upright state of the vehicle, the first cross member 1051, the second cross member 1052, the first side member 1053 and the second side member 1054 are disposed so as to define a substantially rectangular shape in a front view, but in the tilted state of the vehicle 1001, the shape is deformed into a shape substantially close to a parallelogram. The link mechanism 1005 performs a tilting operation associated with the relative rotation operations of the first cross member 1051, the second cross member 1052, the first side member 1053 and the second side member 1054, thus tilting the first front wheel 1031 and the second front wheel 1032.

For example, when the occupant tilts the vehicle 1001 leftward, the head pipe 1211 is tilted leftward with respect to the vertical direction. When the head pipe 1211 is tilted, the first cross member 1051 is rotated with respect to the head pipe 1211 about the support portion C and the second cross member 1052 is rotated with respect to the head pipe 1211 about the support portion F. As a result, the first cross member 1051 is moved farther leftward than the second cross member 1052, and the first side member 1053 and the second side member 1054 are tilted with respect to the vertical direction while being parallel or substantially parallel with the head pipe 1211. When the first side member 1053 and the second side member 1054 are tilted, the first side member 1053 and the second side member 1054 are rotated with respect to the first cross member 1051 and the second cross member 1052. Therefore, when the vehicle 1001 is tilted, the first front wheel 1031 and the second front wheel 1032 supported on the first side member 1053 and the second side member 1054 are respectively tilted with respect to the vertical direction while being parallel or substantially parallel with the head pipe 1211 in accordance with the tilting of the first side member 1053 and the second side member 1054.

In addition, the tie rod 1067 maintains its posture that is parallel or substantially parallel with the first cross member 1051 and the second cross member 1052 even when the vehicle 1001 is tilted.

As describe above, the link mechanism 1005 configured to tilt the first front wheel 1031 and the second front wheel 1032 by performing the tilting operation is disposed above the first front wheel 1031 and the second front wheel 1032. In other words, the rotation axes of the first cross member 1051, the second cross member 1052, the first side member 1053 and the second side member 1054 constituting the link mechanism 1005 are disposed above the first front wheel 1031 and the second front wheel 1032.

Figure 6:
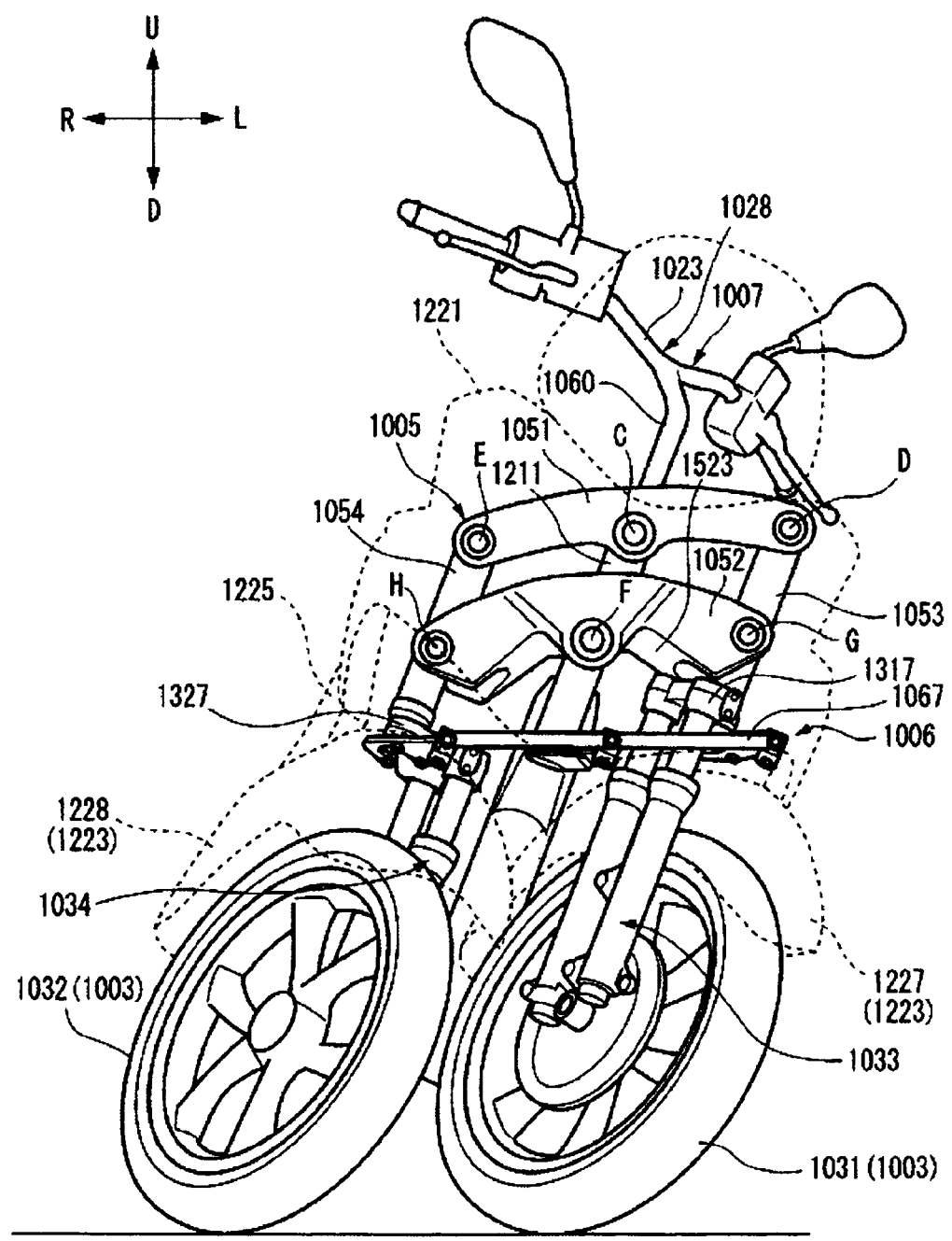
FIG. 6 is a front view showing the front portion of the vehicle in a state in which the vehicle of FIG. 1 is steered and tilted.

FIG. 6 is a front view showing the front portion of the vehicle in a state in which the vehicle 1001 is steered and tilted. FIG. 6 shows a state in which the vehicle is steered leftward and tilted leftward. At the time of the operation shown in FIG. 6, the directions of the first front wheel 1031 and the second front wheel 1032 are changed by the steering operation, and the first front wheel 1031 and the second front wheel 1032 are tilted together with the vehicle body frame 1021 by the tilting operation. In this state, the shape defined by the first cross member 1051, the second cross member 1052, the first side member 1053 and the second side member 1054 of the link mechanism 1005 is deformed into a shape substantially close to a parallelogram, and the tie rod 1067 is moved leftward or rightward depending on the steering direction (leftward in FIG. 6) and rearward.

Figure 7:
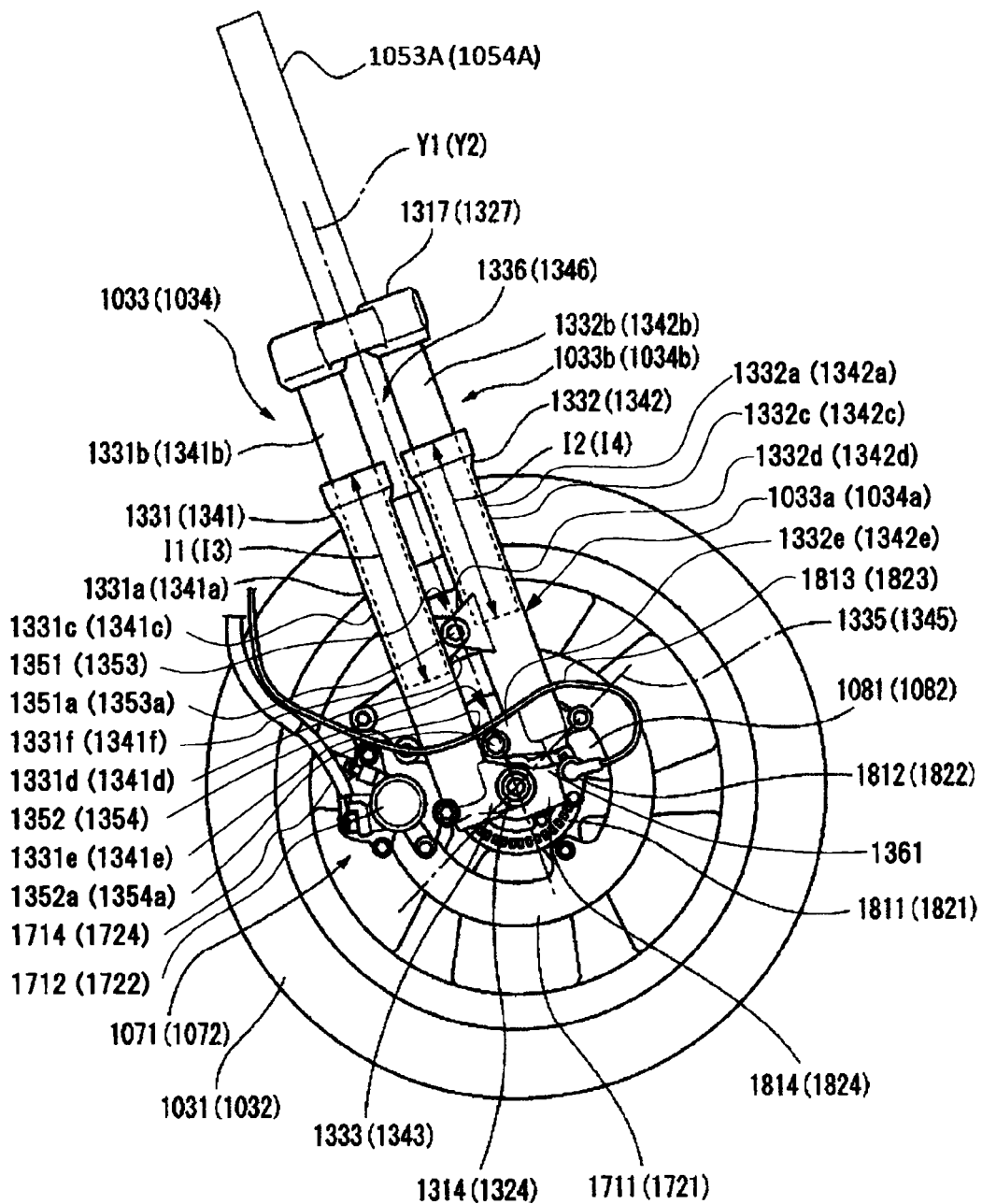
FIG. 7 is a side view showing the first shock absorber of the vehicle of FIG. 1.

FIG. 7 is a side view showing the first shock absorber 1033 as viewed from the right of the vehicle 1001 of FIG. 1. FIG. 7 is a side view showing the first shock absorber 1033 as viewed from the right in the left-right direction of the vehicle 1001 of FIG. 1. FIG. 7 is a side view showing the first shock absorber 1033 as viewed from the direction of the rotation axis of the first front wheel 1031 supported via the first shock absorber 1033. Note that, in this example, the shapes and dispositions of the second shock absorber 1034, the second front wheel 1032 and various members disposed on them are symmetric with those in the first front wheel 1031 in the left-right direction. Therefore, the respective portions of the second front wheel 1032 are described using parenthesized reference numerals in FIG. 7.

As shown in FIG. 7, the first shock absorber 1033 includes the first lower portion 1033*a* (an example of the outer element according to a preferred embodiment of the present invention) and the first upper portion 1033*b* (an example of the inner element according to a preferred embodiment of the present invention). The first shock absorber 1033 includes the first side member support portion 1053A (an example of a vehicle body support portion according to a preferred embodiment of the present invention). The first lower portion 1033*a* and the first upper portion 1033*b* include a first telescopic element 1331 and a second telescopic element 1332 connected parallel or substantially parallel as viewed from the rotation axis direction of the first front wheel 1031 that is supported via the first shock absorber 1033. The first lower portion 1033*a* and the first upper portion 1033*b* include the first telescopic element 1331 and the second telescopic element 1332 connected parallel or substantially parallel in the front-rear direction of the vehicle.

The first shock absorber 1033 includes the first telescopic element 1331, the second telescopic element 1332, the first side member support portion 1053A and the first bracket 1317 (an example of the vehicle body support portion and also an example of an inner connection portion according to a preferred embodiment of the present invention).

The first telescopic element 1331 has an extension/contraction structure so as to extend and contract in the direction of the first center axis Y1. Inside the first telescopic element 1331, an elastic member (not shown), such as a spring, and a shock-absorbing member (not shown), such as oil, for example are provided. The first telescopic element 1331 is configured to perform a damper function to absorb vibrations and impacts due to the load applied from the road surface to the first front wheel 1031.

As for the first front wheel 1031, the second telescopic element 1332 is disposed on the same side as the first telescopic element 1331 in the rotation axis direction of the first axle 1314. The first telescopic element 1331 and the second telescopic element 1332 are disposed on the right of the first front wheel 1031 parallel or substantially parallel in the front-rear direction in the upright state of the vehicle. The second telescopic element 1332 is disposed in front of the first telescopic element 1331.

The second telescopic element 1332 has an extension/contraction structure so as to extend and contract in the direction of the first center axis Y1. The extension/contraction direction of the first telescopic element 1331 and the extension/contraction direction of the second telescopic element 1332 are parallel or substantially parallel with each other as viewed from the rotation axis direction of the first front wheel 1031. The extension/contraction direction of the first telescopic element 1331 and the extension/contraction direction of the second telescopic element 1332 are parallel or substantially parallel with each other as viewed from the left-right direction of the vehicle.

The upper portion of the first telescopic element 1331 and the upper portion of the second telescopic element 1332 are connected via the first bracket 1317. The lower end portion of the second telescopic element 1332 is connected to the vicinity of the lower end portion of the first telescopic element 1331. The first axle 1314 of the first front wheel 1031 is supported on a first axle support portion 1333 (an example of a wheel support portion according to a preferred embodiment of the present invention) provided at the lower end portion of the first telescopic element 1331. The first front wheel 1031 is supported on the first bracket 1317 via the two telescopic elements, that is, the first telescopic element 1331 and the second telescopic element 1332 disposed parallel or substantially parallel in the front-rear direction of the vehicle. The first telescopic element 1331 and the second telescopic element 1332 are connected via the first bracket 1317 and the first axle support portion 1333. Therefore, the first upper portion 1033*b* is prevented from being rotated relatively with respect to the first lower portion 1033*a*.

The area around the first bracket 1317 is covered with the front cover 1221 of the vehicle body cover 1022. The first bracket 1317 is overlapped with portion of the front cover 1221 of the vehicle body cover 1022 as viewed from the side of the vehicle 1001 in the upright state, the tilted state or the steered and tilted state of the vehicle 1001. In this preferred embodiment, as shown in FIG. 5, in the tilted state of the vehicle 1001, the area around the first bracket 1317 is covered with the front cover 1221.

The second telescopic element 1332 is shorter than the first telescopic element 1331 in the extension/contraction direction thereof. The first axle support portion 1333 configured to support the first axle 1314 is disposed below the lower end portion of the second telescopic element 1332. The first axle support portion 1333 configured to support the first axle 1314 is disposed below the second telescopic element 1332. The first center axis Y1 is positioned between a first outer member 1331*a* (an example of a first outer portion according to a preferred embodiment of the present invention) and a second outer member 1332*a* (an example of a second outer portion according to a preferred embodiment of the present invention) in a side view of the vehicle. The first axle support portion 1333 is provided on the first telescopic element 1331. The first axle support portion 1333 is provided on the first outer member 1331*a*.

The first telescopic element 1331 includes a first inner member 1331*b* (an example of a first inner portion according to a preferred embodiment of the present invention) and the first outer member 1331*a*. The first inner member 1331*b* constitutes the upper portion of the first telescopic element 1331. The first outer member 1331*a* constitutes the lower portion of the first telescopic element 1331. The lower portion of the first inner member 1331*b* is inserted into the first outer member 1331*a* so as to be movable relatively.

The second telescopic element 1332 includes a second inner member 1332*b* (an example of a second inner portion according to a preferred embodiment of the present invention) and the second outer member 1332*a*. The second inner member 1332*b* constitutes the upper portion of the second telescopic element 1332. The second outer member 1332*a* constitutes the lower portion of the second telescopic element 1332. The lower portion of the second inner member 1332*b* is inserted into the second outer member 1332*a* so as to be movable relatively.

In a state in which the first telescopic element 1331 extends at the maximum, a first insertion length I1 which is the length of the portion of the first inner member 1331*b* inserted into the first outer member 1331*a* is longer than a second insertion length I2 which is the length of the portion of the second inner member 1332*b* inserted into the second outer member 1332*a*.

When vibrations and impacts are applied from the first front wheel 1031, the first outer member 1331*a* of the first telescopic element 1331 is moved relatively with respect to the first inner member 1331*b* in the extension/contraction direction thereof. When vibrations and impacts are applied from the first front wheel 1031, the second outer member 1332*a* of the second telescopic element 1332 is moved relatively with respect to the second inner member 1332*b* in the extension/contraction direction thereof.

The first outer member 1331*a* includes a first outer main body 1331*c*, a first upper support portion 1331*d*, a first lower support portion 1331*e*, a caliper support portion 1331*f* and the first axle support portion 1333.

The second outer member 1332*a* (an example of the second outer portion according to a preferred embodiment of the present invention) includes a second outer main body 1332*c*, a second upper support portion 1332*d* and a second lower support portion 1332*e*.

The first outer main body 1331*c* allows the first inner member 1331*b* to be inserted in the extension/contraction direction thereof. The second outer main body 1332*c* allows the second inner member 1332*b* to be inserted in the extension/contraction direction thereof.

The first upper support portion 1331*d* and the first lower support portion 1331*e* are disposed in front of the first outer main body 1331*c* so as to be arranged in the extension/contraction direction of the first telescopic element 1331.

The second upper support portion 1332*d* and the second lower support portion 1332*e* are disposed behind the second outer main body 1332*c* so as to be arranged in the extension/contraction direction of the second telescopic element 1332.

The first upper support portion 1331*d*, the first lower support portion 1331*e*, the second upper support portion 1332*d* and the second lower support portion 1332*e* are disposed between the first outer main body 1331*c* and the second outer main body 1332*c* as viewed from the rotation axis direction of the first front wheel 1031 that is supported via the first shock absorber 1033.

The caliper support portion 1331*f* is disposed behind the first outer main body 1331*c*.

The first axle support portion 1333 is disposed below the first outer main body 1331*c* in the extension/contraction direction of the first telescopic element 1331.

The first inner member 1331*b* and the second inner member 1332*b* are connected to each other. The first inner member 1331*b* and the second inner member 1332*b* are connected via the first bracket 1317. The upper end portion of the first inner member 1331*b* in the extension/contraction direction thereof and the upper end portion of the second inner member 1332*b* in the extension/contraction direction thereof are connected via the first bracket 1317. The first outer member 1331*a* and the second outer member 1332*a* are connected via a plurality of connection portions. The first outer member 1331*a* and the second outer member 1332*a* are connected via a first connection portion 1351 (an example of the outer connection portion according to a preferred embodiment of the present invention) and a second connection portion 1352 (an example of the outer connection portion according to a preferred embodiment of the present invention). The first connection portion 1351 and the second connection portion 1352 are arranged in the extension/contraction direction of the second telescopic element 1332. The first connection portion 1351 is disposed on the intermediate portion of the second telescopic element 1332 in the extension/contraction direction thereof. The second connection portion 1352 is disposed at the lower end portion of the second telescopic element 1332 in the extension/contraction direction thereof.

The first axle support portion 1333 is disposed below the second connection portion 1352 in the extension/contraction direction of the second telescopic element 1332. The first connection portion 1351 includes the first upper support portion 1331d, the second upper support portion 1332d and a first connection member 1351a that is used to connect the first upper support portion 1331d and the second upper support portion 1332d. The second connection portion 1352 includes the first lower support portion 1331e, the second lower support portion 1332e and a second connection member 1352a that is used to connect the first lower support portion 1331e and the second lower support portion 1332e.

The second outer member 1332a is shorter than the first outer member 1331a in the extension/contraction direction of the second telescopic element 1332. The second inner member 1332b is shorter than the first inner member 1331b in the extension/contraction direction of the second telescopic element 1332.

The second shock absorber 1034 includes the second lower portion 1034a (an example of the outer element according to a preferred embodiment of the present invention) and the second upper portion 1034b (an example of the inner element a preferred embodiment of the present invention). The second shock absorber 1034 includes the second side member support portion 1054A (an example of the vehicle body support portion according to a preferred embodiment of the present invention). The second lower portion 1034a and the second upper portion 1034b include a third telescopic element 1341 and a fourth telescopic element 1342 connected parallel or substantially parallel as viewed from the rotation axis of the second front wheel 1032 that is supported via the second shock absorber 1034. The second lower portion 1034a and the second upper portion 1034b include the third telescopic element 1341 and the fourth telescopic element 1342 connected parallel or substantially parallel in the front-rear direction of the vehicle.

The second shock absorber 1034 includes the third telescopic element 1341, the fourth telescopic element 1342, the second side member support portion 1054A and the second bracket 1327 (an example of the vehicle body support portion and also an example of the inner connection portion according to a preferred embodiment of the present invention). The third telescopic element 1341 has an extension/contraction structure so as to extend and contract in the direction of the second center axis Y2. Inside the third telescopic element 1341, an elastic member (not shown), such as a spring, and a shock-absorbing member (not shown), such as oil, for example are provided. The third telescopic element 1341 is configured to perform a damper function to absorb vibrations and impacts due to the load applied from the road surface to the second front wheel 1032. As for the second front wheel 1032, the fourth telescopic element 1342 is disposed on the same side as the third telescopic element 1341 in the rotation axis direction of the second axle 1324.

The third telescopic element 1341 and the fourth telescopic element 1342 are disposed on the left of the second front wheel 1032 parallel or substantially parallel in the front-rear direction in the upright state of the vehicle. The fourth telescopic element 1342 is disposed in front of the third telescopic element 1341.

The fourth telescopic element 1342 has an extension/contraction structure so as to extend and contract in the direction of the second center axis Y2. The extension/contraction direction of the third telescopic element 1341 and the extension/contraction direction of the fourth telescopic element 1342 are parallel or substantially parallel with each other as viewed from the rotation axis direction of the second front wheel 1032. The extension/contraction direction of the third telescopic element 1341 and the extension/contraction direction of the fourth telescopic element 1342 are parallel or substantially parallel with each other as viewed from the left-right direction of the vehicle.

The upper portion of the third telescopic element 1341 and the upper portion of the fourth telescopic element 1342 are connected via the second bracket 1327. The lower end portion of the fourth telescopic element 1342 is connected and secured to the vicinity of the lower end portion of the third telescopic element 1341. The second axle 1324 of the second front wheel 1032 is supported on a second axle support portion 1343 (an example of the wheel support portion according to a preferred embodiment of the present invention) provided at the lower end portion of the third telescopic element 1341. The second front wheel 1032 is supported on the second bracket 1327 via the two telescopic elements, that is, the third telescopic element 1341 and the fourth telescopic element 1342 disposed parallel or substantially parallel in the front-rear direction of the vehicle. The third telescopic element 1341 and the fourth telescopic element 1342 are connected via the second bracket 1327 and the second axle support portion 1343. Hence, the second upper portion 1034b is prevented from being rotated relatively with respect to the second lower portion 1034a.

The area around the second bracket 1327 is covered with the front cover 1221 of the vehicle body cover 1022. The second bracket 1327 is overlapped with portion of the front cover 1221 of the vehicle body cover 1022 as viewed from the side of the vehicle 1001 in the upright state, the tilted state or the steered and tilted state of the vehicle 1001.

The fourth telescopic element 1342 is shorter than the third telescopic element 1341 in the extension/contraction direction thereof. The second axle support portion 1343 configured to support the second axle 1324 is disposed below the lower end portion of the fourth telescopic element 1342. The second axle support portion 1343 configured to support the second axle 1324 is disposed below the fourth telescopic element 1342. The second center axis Y2 is positioned between a third outer member 1341a (an example of the first outer portion according to a preferred embodiment of the present invention) and a fourth outer member 1342a (an example of the second outer portion according to a preferred embodiment of the present invention). The second axle support portion 1343 is provided on the third telescopic element 1341. The second axle support portion 1343 is provided on the third outer member 1341a.

The third telescopic element 1341 includes a third inner member 1341b (an example of the first inner portion according to a preferred embodiment of the present invention) and the third outer member 1341a. The third inner member 1341b constitutes the upper portion of the third telescopic element 1341. The third outer member 1341a constitutes the lower portion of the third telescopic element 1341. The lower portion of the third inner member 1341*b* is inserted into the third outer member 1341*a* so as to be movable relatively.

The fourth telescopic element 1342 includes a fourth inner member 1342*b* (an example of the second inner portion according to a preferred embodiment of the present invention) and the fourth outer member 1342*a*. The fourth inner member 1342*b* constitutes the upper portion of the fourth telescopic element 1342. The fourth outer member 1342*a* constitutes the lower portion of the fourth telescopic element 1342. The lower portion of the fourth inner member 1342*b* is inserted into the fourth outer member 1342*a* so as to be movable relatively.

In a state in which the third telescopic element 1341 extends at the maximum, a third insertion length I3 which is the length of the portion of the third inner member 1341*b* inserted into the third outer member 1341*a* is longer than a fourth insertion length I4 which is the length of the portion of the fourth inner member 1342*b* inserted into the fourth outer member 1342*a*.

When vibrations and impacts are applied from the second front wheel 1032, the third outer member 1341*a* of the third telescopic element 1341 is moved relatively with respect to the third inner member 1341*b* in the extension/contraction direction thereof. When vibrations and impacts are applied from the second front wheel 1032, the fourth outer member 1342*a* of the fourth telescopic element 1342 is moved relatively with respect to the fourth inner member 1342*b* in the extension/contraction direction thereof.

The third outer member 1341*a* includes a third outer main body 1341*c*, a third upper support portion 1341*d*, a third lower support portion 1341*e*, a caliper support portion 1341*f* and the second axle support portion 1343.

The fourth outer member 1342*a* includes a fourth outer main body 1342*c*, a fourth upper support portion 1342*d* and a fourth lower support portion 1342*e*.

The third outer main body 1341*c* allows the third inner member 1341*b* to be inserted in the extension/contraction direction thereof. The fourth outer main body 1342*c* allows the fourth inner member 1342*b* to be inserted in the extension/contraction direction thereof.

The third upper support portion 1341*d* and the third lower support portion 1341*e* are disposed in front of the third outer main body 1341*c* so as to be arranged in the extension/contraction direction of the third telescopic element 1341.

The fourth upper support portion 1342*d* and the fourth lower support portion 1342*e* are disposed behind the fourth outer main body 1342*c* so as to be arranged in the extension/contraction direction of the fourth telescopic element 1342.

The third upper support portion 1341*d*, the third lower support portion 1341*e*, the fourth upper support portion 1342*d* and the fourth lower support portion 1342*e* are disposed between the third outer main body 1341*c* and the fourth outer main body 1342*c* as viewed from the rotation axis direction of the second front wheel 1032 that is supported via the second shock absorber 1034.

The caliper support portion 1341*f* is disposed behind the third outer main body 1341*c*.

The second axle support portion 1343 is disposed below the third outer main body 1341*c* in the extension/contraction direction of the third telescopic element 1341.

The third inner member 1341*b* and the fourth inner member 1342*b* are connected to each other. The third inner member 1341*b* and the fourth inner member 1342*b* are connected via the second bracket 1327. The upper end portion of the third inner member 1341*b* in the extension/contraction direction thereof and the upper end portion of the fourth inner member 1342*b* in the extension/contraction direction thereof are connected via the second bracket 1327. The third outer member 1341*a* and the fourth outer member 1342*a* are connected via a plurality of connection portions. The third outer member 1341*a* and the fourth outer member 1342*a* are connected via a third connection portion 1353 (an example of the outer connection portion according to a preferred embodiment of the present invention) and a fourth connection portion 1354 (an example of the outer connection portion according to a preferred embodiment of the present invention). The third connection portion 1353 and the fourth connection portion 1354 are arranged in the extension/contraction direction of the fourth telescopic element 1342. The third connection portion 1353 is disposed on the intermediate portion of the fourth telescopic element 1342 in the extension/contraction direction thereof. The fourth connection portion 1354 is disposed at the lower end portion of the fourth telescopic element 1342 in the extension/contraction direction thereof. The second axle support portion 1343 is disposed below the fourth connection portion 1354 in the extension/contraction direction of the fourth telescopic element 1342.

The third connection portion 1353 includes the third upper support portion 1341*d*, the fourth upper support portion 1342*d* and a third connection member 1353*a* that is used to connect the third upper support portion 1341*d* and the fourth upper support portion 1342*d*. The fourth connection portion 1354 includes the third lower support portion 1341*e*, the fourth lower support portion 1342*e* and a fourth connection member 1354*a* that is used to connect the third lower support portion 1341*e* and the fourth lower support portion 1342*e*.

The fourth outer member 1341*a* is shorter than the third outer member 1341*a* in the extension/contraction direction of the fourth telescopic element 1342. The fourth inner member 1341*b* is shorter than the third inner member 1342*b* in the extension/contraction direction of the fourth telescopic element 1342.

As shown in FIG. 7, the first front wheel 1031 is provided with a first disc brake 1071. The first disc brake 1071 brakes the first front wheel 1031. The first disc brake 1071 includes a first brake disc 1711 and a first caliper 1712. The first brake disc 1711 preferably has a ring shape about the center of the first axle 1314. The first brake disc 1711 is secured to the first front wheel 1031. The first caliper 1712 is provided on the first shock absorber 1033. The first caliper 1712 is secured to the lower end portion of the first telescopic element 1331 of the first shock absorber 1033. The first caliper 1712 is supported on the caliper support portion 1331*f*. The first caliper 1712 is disposed behind the lower end portion of the first telescopic element 1331 of the first shock absorber 1033. A brake hose 1714 is connected to the first caliper 1712. Brake oil is supplied to the first caliper 1712 via the brake hose 1714 to apply hydraulic pressure thereto. When the hydraulic pressure is applied to the first caliper 1712, brake pads are pressed against both faces of the first brake disc 1711. The first caliper 1712 holds the first brake disc 1711 with the brake pads and brakes the rotating first brake disc 1711.

The second front wheel 1032 is provided with a second disc brake 1072. The second disc brake 1072 brakes the second front wheel 1032. The second disc brake 1072 includes a second brake disc 1721 and a second caliper 1722. The second brake disc 1721 preferably has a ring shape about the center of the second axle 1324. The second brake disc 1721 is secured to the second front wheel 1032. The second caliper 1722 is provided on the second shock absorber 1034. The second caliper 1722 is supported on the caliper support portion 1341*f*. The second caliper 1722 is secured to the lower end portion of the third telescopic element 1341 of the second shock absorber 1034. The second caliper 1722 is disposed behind the lower end portion of the third telescopic element 1341 of the second shock absorber 1034. A brake hose 1724 is connected to the second caliper 1722. Brake oil is supplied to the second caliper 1722 via the brake hose 1724 to apply hydraulic pressure thereto. When the hydraulic pressure is applied to the second caliper 1722, brake pads are pressed against both faces of the second brake disc 1721. The second caliper 1722 holds the second brake disc 1721 with the brake pads and brakes the rotating second brake disc 1721.

As shown in FIG. 7, a first wheel speed sensor 1081 (an example of a component according to a preferred embodiment of the present invention) includes a first sensor disc 1811 and a first detection portion 1812. The first sensor disc 1811 preferably has a ring shape about the center of the first axle 1314. The first sensor disc 1811 is smaller than the first brake disc 1711 in diameter. The first sensor disc 1811 is disposed in the inner circumference of the first brake disc 1711. The first sensor disc 1811 is secured to the first front wheel 1031. The first detection portion 1812 detects the rotation of the first sensor disc 1811 optically or magnetically, for example. A sensor cord 1813 is connected to the first detection portion 1812. The detection value at the first detection portion 1812 is transmitted via the sensor cord 1813. The wheel speed of the first front wheel 1031 is calculated on the basis of the detection value of the first detection portion 1812 transmitted via the sensor cord 1813.

A first sensor stay 1814 (an example of a component support portion according to a preferred embodiment of the present invention) is secured to the first axle support portion 1333. The first detection portion 1812 of the first wheel speed sensor 1081 is supported on the first sensor stay 1814. The first sensor stay 1814 has rigidity to the extent that the detection accuracy of the first detection portion 1812 of the first wheel speed sensor 1081 is maintained sufficiently even if the first shock absorber 1033 vibrates during the vehicle 1001 traveling.

The first shock absorber 1033 includes the first telescopic element 1331, the second telescopic element 1332, the first bracket 1317 and a first area 1336 defined by an imaginary line 1335 connecting the lower end portion of the first telescopic element 1331 and the lower end portion of the second telescopic element 1332 as viewed from the center in the vehicle width direction to the first front wheel 1031. The first detection portion 1812 of the first wheel speed sensor 1081 is disposed outside the first area 1336. The first detection portion 1812 is disposed below the first area 1336. The first detection portion 1812 is disposed in front of the first area 1336. The first detection portion 1812 is disposed above the lower end portion of the first telescopic element 1331.

A concave portion 1361 is configured to include the first telescopic element 1331 and the second telescopic element 1332 as viewed from the rotation axis direction of the first front wheel 1031 that is supported on the first axle support portion 1333. The first sensor stay 1814 is disposed in the concave portion 1361.

The first detection portion 1812 of the first wheel speed sensor 1081 is disposed on the opposite side of the first caliper 1712 of the first disc brake 1071 with respect to the first axle 1314. The first detection portion 1812 of the first wheel speed sensor 1081 is disposed in front of the first axle 1314. The first detection portion 1812 is disposed below the extension/contraction direction of the second telescopic element 1332.

A second wheel speed sensor 1082 (an example of the component according to a preferred embodiment of the present invention) includes a second sensor disc 1821 and a second detection portion 1822. The second sensor disc 1821 preferably has a ring shape about the center of the second axle 1324. The second sensor disc 1821 is smaller than the second brake disc 1721 in diameter. The second sensor disc 1821 is disposed in the inner circumference of the second brake disc 1721. The second sensor disc 1821 is secured to the second front wheel 1032. The second detection portion 1822 detects the rotation of the second sensor disc 1821 optically or magnetically, for example. A sensor cord 1823 is connected to the second detection portion 1822. The detection value at the second detection portion 1822 is transmitted via the sensor cord 1823. The wheel speed of the second front wheel 1032 is calculated on the basis of the detection value of the second detection portion 1822 transmitted via the sensor cord 1823.

A second sensor stay 1824 (an example of the component support portion according to a preferred embodiment of the present invention) is secured to the second axle support portion 1343. The second detection portion 1822 of the second wheel speed sensor 1082 is supported on the second sensor stay 1824. The second sensor stay 1824 has rigidity to the extent that the detection accuracy of the second detection portion 1822 of the second wheel speed sensor 1082 is maintained sufficiently even if the second shock absorber 1034 vibrates during the vehicle 1001 traveling.

The second shock absorber 1034 includes the third telescopic element 1341, the fourth telescopic element 1342, the second bracket 1327 and a second area 1346 defined by an imaginary line 1345 connecting the lower end portion of the third telescopic element 1341 and the lower end portion of the fourth telescopic element 1342 as viewed from the center in the vehicle width direction to the second front wheel 1032. The second detection portion 1822 of the second wheel speed sensor 1082 is disposed outside the second area 1346. The second detection portion 1822 is disposed below the second area 1346. The second detection portion 1822 is disposed in front of the second area 1346. The second detection portion 1822 is disposed above the lower end portion of the third telescopic element 1341.

A concave portion 1362 is configured to include the third telescopic element 1341 and the fourth telescopic element 1342 as viewed from the rotation axis direction of the second front wheel 1032 that is supported on the second axle support portion 1343. The second sensor stay 1824 is disposed in the concave portion 1362.

The second detection portion 1822 of the second wheel speed sensor 1082 is disposed on the opposite side of the second caliper 1722 of the second disc brake 1072 with respect to the second axle 1324. The second detection portion 1822 of the second wheel speed sensor 1082 is disposed in front of the second axle 1324. The second detection portion 1822 is disposed so that at least a portion thereof is overlapped with the extension line in the extension/contraction direction of the fourth telescopic element 1342.

In the above-mentioned first preferred embodiment, the first telescopic element 1331 and the second telescopic element 1332 are connected via the first bracket 1317 at their upper end portions. Hence, the first bracket 1317 defines and functions as a rotation stopper for the first telescopic element 1331 and the second telescopic element 1332. Similarly, since the third telescopic element 1341 and the fourth telescopic element 1342 are connected via the second bracket 1327 at their upper end portions, the second bracket 1327 defines and functions as a rotation stopper for the third telescopic element 1341 and the fourth telescopic element 1342. As a result, the first front wheel 1031 and the second front wheel 1032 are rotated to the steered direction by movement of the steering without idling. Therefore, a support structure for the front wheels is configured with a simple configuration.

In addition, in above-mentioned first preferred embodiment, the first shock absorber 1033 including the first bracket 1317 is rotated in accordance with the rotation of the steering member 1028 and is disposed on the left of the vehicle 1001 in the left-right direction thereof. Since the second telescopic element 1332 is smaller than the first telescopic element 1331, the front portion of the vehicle 1001 is prevented from being enlarged.

Furthermore, similarly, the second shock absorber (an example of the second support member) 1034 including the second bracket 1327 is rotated in accordance with the rotation of the steering member 1028 and is disposed on the right of the vehicle 1001 in the left-right direction thereof. Since the fourth telescopic element 1342 is made smaller than the third telescopic element 1341, the front portion of the vehicle 1001 is prevented from being enlarged.

In this way, with the above-mentioned configuration, the enlargement of the size of the front portion of the vehicle 1001 is prevented while the front wheel support structure having the rotation stopping function is achieved with the simple configuration.

Besides, the first shock absorber 1033 supports the first front wheel 1031 via the two telescopic elements, that is, the first telescopic element 1331 and the second telescopic element 1332, connected to each other. Hence, the first shock absorber 1033 supports the first front wheel 1031 while having high rigidity against the force input to the first front wheel 1031 during the vehicle 1001 traveling. Moreover, similarly, the second shock absorber 1034 supports the second front wheel 1032 via the two telescopic elements, that is, the third telescopic element 1341 and the fourth telescopic element 1342, connected to each other. Hence, the second shock absorber 1034 has high rigidity against the force input to the second front wheel 1032 during the vehicle 1001 traveling.

Still further, in the vehicle 1001, the first bracket 1317 and the second bracket 1327 are overlapped with portion of the vehicle body cover 1022 as viewed from the side of the vehicle 1001 in the upright state, the tilted state or the steered and tilted state of the vehicle 1001. With the vehicle 1001 configured as described above, the first bracket 1317 and the second bracket 1327 are moved up and down with respect to the vehicle body frame 1021 and the vehicle body cover 1022. Hence, the first bracket 1317 and the second bracket 1327 avoid interference with the first bracket 1317 and the second bracket 1327. As a result, in the vehicle 1001, in particular, the downsizing of the first bracket 1317 and the second bracket 1327 contributes to the prevention of the enlargement of the size of the vehicle 1001.

In the above-mentioned first preferred embodiment, the upper portion of the first telescopic element 1331 and the upper portion of the second telescopic element 1332 are connected via the first bracket 1317, and the second telescopic element 1332 is shorter than the first telescopic element 1331.

With this configuration, certain space is secured below the lower end portion of the second telescopic element 1332.

Hence, other members (for example, the axle support portion) is disposed in the space below the second telescopic element 1332. As a result, the first telescopic element 1331 and the second telescopic element 1332 is disposed so as to be close to each other, and the first bracket 1317 is prevented from being enlarged.

Similarly, a certain space is secured below the lower end portion of the fourth telescopic element 1342. Hence, other members is disposed in the space below the fourth telescopic element 1342. As a result, the third telescopic element 1341 and the fourth telescopic element 1342 is disposed so as to be made close to each other, and the second bracket 1327 is prevented from being enlarged. For these reasons, the enlargement of the front portion of the vehicle 1001 is prevented while the front wheel support structure having the rotation stopping function is achieved with the simple configuration.

In addition, since the space is secured below the lower end portion of the second telescopic element 1332, the degree of freedom for design in disposing various components, such as the first sensor stay 1814 of the first wheel speed sensor 1081, is improved. Similarly, since the space is secured below the lower end portion of the fourth telescopic element 1342, the degree of freedom for design in disposing various components, such as the second wheel speed sensor 1082 of the second sensor stay 1824, is improved.

However, in a vehicle including two front wheels that are supported via two suspension devices each including two telescopic elements, in the case that an axle support portion is disposed close to the telescopic elements, the axle support portion is prevented from being enlarged while the rigidity thereof is secured. For this reason, in Chinese Unexamined Patent Publication No. 101774414A and WO 2012/007819, such an axle support portion is disposed between the two telescopic elements, such that the axle support portion is prevented from being enlarged in the up-down direction while a necessary extension/contraction stroke is secured. However, in this configuration, since there is the restriction of securing a space to accommodate the axle support portion, it is difficult to dispose the two telescopic elements while the elements are brought close to each other. As a result, a bracket connecting the upper end portions of the two telescopic elements spaced away from each other is enlarged eventually.

However, in the above-mentioned first preferred embodiment, since the first axle support portion 1333 is disposed below the second telescopic element 1332, the first telescopic element 1331 and the second telescopic element 1332 is disposed easily close to each other, such that the first bracket 1317 is prevented from being enlarged. Similarly, since the second axle support portion 1343 is disposed below the fourth telescopic element 1342, the second bracket 1327 is prevented from being enlarged. Hence, the enlargement of the front portion of the vehicle 1001 is prevented while the front wheel support structure having the rotation stopping function is achieved with the simple configuration.

In the above-mentioned first preferred embodiment, since the first telescopic element 1331 having the first insertion length I1 sufficiently performs the guide function (the prevention of displacement in directions other than the extension/contraction direction) for the extension/contraction movement along the extension/contraction direction of the first telescopic element 1331 and the second telescopic element 1332, the second insertion length I2 is made shorter, such that the second telescopic element 1332 becomes easy to be shortened. Similarly, since the third telescopic element 1341 having the third insertion length I3 sufficiently performs the guide function (the prevention of displacement in directions other than the extension/contraction direction) for the extension/contraction movement along the extension/contraction direction of the third telescopic element 1341 and the fourth telescopic element 1342, the fourth insertion length I4 is made shorter, such that the fourth telescopic element 1342 becomes easy to be shortened.

Modified Preferred Embodiment

Figure 8:
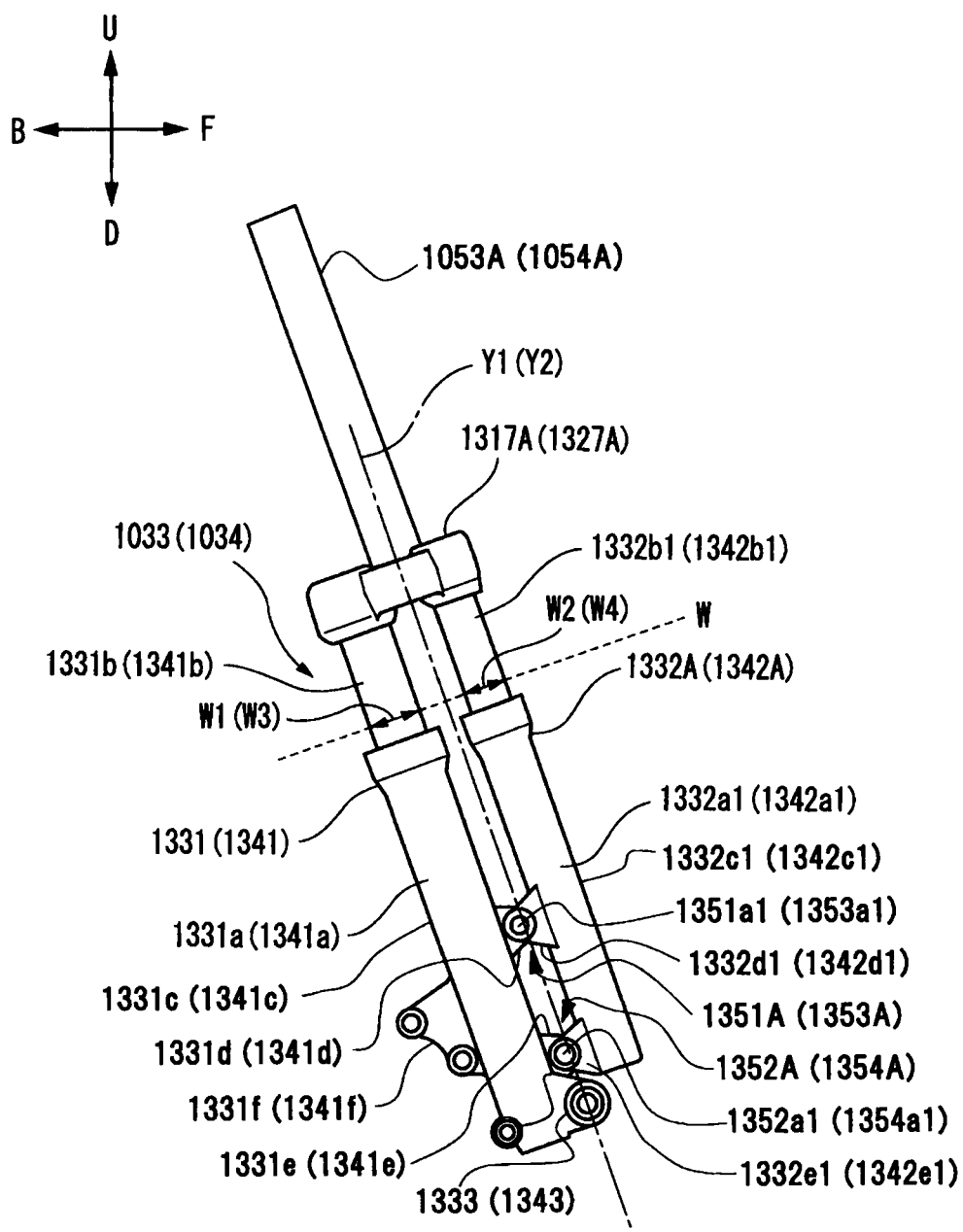
FIG. 8 is a side view showing the first shock absorber of a vehicle according to a modification according to the first preferred embodiment of the present invention.

FIG. 8 is a side view showing the first shock absorber 1033 as viewed from the second front wheel 1032 of the vehicle 1001 according to a modified preferred embodiment of the present invention. FIG. 8 is a side view showing the first shock absorber 1033 as viewed from the right of the vehicle 1001 in the left-right direction thereof according to the modified preferred embodiment. In this modified preferred embodiment, the shapes and positions of the respective members disposed on the second shock absorber 1034 and the second front wheel 1032 are symmetric or substantially symmetric with those disposed on the first shock absorber 1033 and the first front wheel 1031. Therefore, the respective portions of the second front wheel 1032 are described using reference numerals in FIG. 8.

As shown in FIG. 8, in the modified preferred embodiment, the outside diameter of a second telescopic element 1332A (an example of the second telescopic element according to a preferred embodiment of the present invention) constituting the first shock absorber 1033 is made smaller than the outside diameter of the first telescopic element 1331. More specifically, the length W2 of the second inner member 1332b1 (an example of the second inner portion according to a preferred embodiment of the present invention) of the second telescopic element 1332A in the direction W vertical with respect to the first center axis Y1 is shorter than the length W1 of the first inner member 1331b of the first telescopic element 1331 when the first shock absorber 1033 is viewed from the second front wheel 1032. Similarly, the outside diameter of the second outer member 1332a1 (an example of the second outer member according to a preferred embodiment of the present invention) of the second telescopic element 1332A is made smaller than that of the first outer member 1331a of the first telescopic element 1331. More specifically, the length of the second outer member 1332a1 of the second telescopic element 1332A in the direction W vertical with respect to the first center axis Y1 is shorter than the length of the first outer member 1331a of the first telescopic element 1331 when the first shock absorber 1033 is viewed from the second front wheel 1032.

The second outer member 1332a1 includes a second outer main body 1332c1, a second upper support portion 1332d1 and a second lower support portion 1332e1. The second outer main body 1332c1 allows the second inner member 1332b1 to be inserted in the extension/contraction direction thereof.

The second upper support portion 1332d1 and the second lower support portion 1332e1 are arranged in the extension/contraction direction of the second telescopic element 1332A on the side of the second outer main body 1332c1.

The first inner member 1331b and the second inner member 1332b1 are connected to each other. The first inner member 1331b and the second inner member 1332b1 are connected via a first bracket 1317A. The upper end portion of the first inner member 1331b in the extension/contraction direction thereof and the upper end portion of the second inner member 1332b1 in the extension/contraction direction thereof are connected via the first bracket 1317A. The first outer member 1331a and the second outer member 1332a1 are connected via a plurality of connection portions. The first outer member 1331a and the second outer member 1332a1 are connected via a first connection portion 1351A (an example of the outer connection portion according to a preferred embodiment of the present invention) and a second connection portion 1352A (an example of the outer connection portion according to a preferred embodiment of the present invention).

The first connection portion 1351A and the second connection portion 1352A are arranged in the extension/contraction direction of the second telescopic element 1332A. The first connection portion 1351A is disposed in the intermediate portion of the second telescopic element 1332A in the extension/contraction direction thereof. The second connection portion 1352A is disposed at the lower end portion of the second telescopic element 1332A in the extension/contraction direction thereof. The first axle support portion 1333 is disposed below the second connection portion 1352A in the extension/contraction direction of the second telescopic element 1332A.

The first connection portion 1351A includes the first upper support portion 1331d, the second upper support portion 1332d1 and a first connection member 1351a1 that is used to connect the first upper support portion 1331d and the second upper support portion 1332d1. The second connection portion 1352A includes the first lower support portion 1331e, the second lower support portion 1332e1 and a second connection member 1352a1 that is used to connect the first lower support portion 1331e and the second lower support portion 1332e1.

Furthermore, the outside diameter of a fourth telescopic element 1342A (an example of the second telescopic element according to a preferred embodiment of the present invention) constituting the second shock absorber 1034 is made smaller than the outside diameter of the third telescopic element 1341. More specifically, the length W4 of the fourth inner member 1342b1 (an example of the second inner portion according to a preferred embodiment of the present invention) of the fourth telescopic element in the direction W vertical with respect to the second center axis Y2 is made shorter than the length W3 of the third inner member 1341b of the third telescopic element 1341 when the second shock absorber 1034 is viewed from the first front wheel 1031. Similarly, the outside diameter of the fourth outer member 1342a1 (an example of the second outer member according to a preferred embodiment of the present invention) of the fourth telescopic element 1342A is made smaller than that of the first outer member 1341a of the third telescopic element 1341. More specifically, the length of the fourth outer member 1342a1 of the fourth telescopic element 1342A in the direction W vertical with respect to the second center axis Y2 is shorter than the length of the third outer member 1341a of the third telescopic element 1341 when the second shock absorber 1034 is viewed from the first front wheel 1031.

The fourth outer member 1342a1 includes a fourth outer main body 1342c1, a fourth upper support portion 1342d1 and a fourth lower support portion 1342e1.

The fourth outer main body 1342c1 allows the fourth inner member 1342b1 to be inserted in the extension/contraction direction thereof.

The fourth upper support portion 1342d1 and the fourth lower support portion 1342e1 are arranged in the extension/contraction direction of the fourth telescopic element 1342A on the side of the fourth outer main body 1342c1.

The third inner member 1341*b* and the fourth inner member 1342*b*1 are connected to each other. The third inner member 1341*b* and the fourth inner member 1342*b*1 are connected via a second bracket 1327A. The upper end portion of the third inner member 1341*b* in the extension/contraction direction thereof and the upper end portion of the fourth inner member 1342*b*1 in the extension/contraction direction thereof are connected via the second bracket 1327A. The third outer member 1341*a* and the fourth outer member 1342*a*1 are connected via a plurality of connection portions. The third outer member 1341*a* and the fourth outer member 1342*a*1 are connected via a third connection portion 1353A (an example of the outer connection portion according to a preferred embodiment of the present invention) and a fourth connection portion 1354A (an example of the outer connection portion according to a preferred embodiment of the present invention).

The third connection portion 1353A and the fourth connection portion 1354A are arranged in the extension/contraction direction of the fourth telescopic element 1342A. The third connection portion 1353A is disposed in the intermediate portion of the fourth telescopic element 1342A in the extension/contraction direction thereof. The fourth connection portion 1354A is disposed at the lower end portion of the fourth telescopic element 1342A in the extension/contraction direction thereof. The second axle support portion 1343 is disposed below the fourth connection portion 1354A in the extension/contraction direction of the fourth telescopic element 1342A.

The third connection portion 1353A includes the third upper support portion 1341*d*, the fourth upper support portion 1342*d*1 and a third connection member 1353*a*1 that is used to connect the third upper support portion 1341*d* and the fourth upper support portion 1342*d*1. The fourth connection portion 1354A includes the third lower support portion 1341*e*, the fourth lower support portion 1342*e*1 and a fourth connection member 1354*a*1 that is used to connect the third lower support portion 1341*e* and the fourth lower support portion 1342*e*1.

In the above-mentioned modification, the upper end portion of the first telescopic element 1331 and the upper end portion of the second telescopic element 1332A are connected via the first bracket 1317A (an example of the vehicle body support portion according to a preferred embodiment of the present invention), and the second telescopic element 1332A is smaller in diameter than the first telescopic element 1331. In comparison with a case in which the first telescopic element 1331 and the second telescopic element 1332A have the same shape, the clearance (the distance in the direction of the arrangement) between the axial center of the first telescopic element 1331 and the axial center of the second telescopic element 1332A is shortened and the first bracket 1317A is downsized.

Similarly, the clearance (the distance in the direction of the arrangement) between the third telescopic element 1341 and the fourth telescopic element 1342 is shortened and the second bracket 1327A (an example of the vehicle support portion according to a preferred embodiment of the present invention) is downsized.

As a result, the enlargement of the front portion of the vehicle 1001 is prevented while the front wheel support structure having the rotation stopping function is achieved with the simple configuration.

The suspension device (the first shock absorber 1033, the second shock absorber 1034) according to the above-mentioned first preferred embodiment is equipped with the first telescopic element (the first telescopic element 1331, the third telescopic element 1341), the second telescopic element (the second telescopic element 1332, the fourth telescopic element 1342, the second telescopic element 1332A, the fourth telescopic element 1342A), the wheel support portion (the first axle support portion 1333, the second axle support portion 1343) and the vehicle body support portion (the first bracket 1317, the second bracket 1327, the first bracket 1317A).

The first telescopic element (the first telescopic element 1331, the third telescopic element 1341) includes the first outer portion (the first outer member 1331*a*, the third outer member 1341*a*) and the first inner portion (the first inner member 1331*b*, the third inner member 1341*b*) of which one end portion is inserted into the first outer portion (the first outer member 1331*a*, the third outer member 1341*a*). The first telescopic element (the first telescopic element 1331, the third telescopic element 1341) is configured to extend and contract since the first inner portion (the first inner member 1331*b*, the third inner member 1341*b*) moves relatively with respect to the first outer portion (the first outer member 1331*a*, the third outer member 1341*a*).

The second telescopic element (the second telescopic element 1332, the fourth telescopic element 1342, the second telescopic element 1332A, the fourth telescopic element 1342A) includes the second outer portion (the second outer member 1332*a*, the fourth outer member 1342*a*, the second outer member 1332*a*1, the fourth outer member 1342*a*1) connected to the first outer portion (the first outer member 1331*a*, the third outer member 1341*a*) and the second inner portion (the second inner member 1332*b*, the fourth inner member 1342*b*, the second inner member 1332*b*1, the fourth inner member 1342*b*1) of which one end portion is inserted into the second outer portion (the second outer member 1332*a*, the fourth outer member 1342*a*, the second outer member 1332*a*1, the fourth outer member 1342*a*1) and which is connected to the first inner portion (the first inner member 1331*b*, the third inner member 1341*b*).

The second telescopic element (the second telescopic element 1332, the fourth telescopic element 1342, the second telescopic element 1332A, the fourth telescopic element 1342A) is configured to extend and contract since the second inner portion (the second inner member 1332*b*, the fourth inner member 1342*b*, the second inner member 1332*b*1, the fourth inner member 1342*b*1) moves relatively with respect to the second outer portion (the second outer member 1332*a*, the fourth outer member 1342*a*, the second outer member 1332*a*1, the fourth outer member 1342*a*1).

The wheel support portion (the first axle support portion 1333, the second axle support portion 1343) is configured to support the wheel (the first front wheel 1031, the second front wheel 1032) on the outer element (the first lower portion 1033*a*, the second lower portion 1034*a*) including the first outer portion (the first outer member 1331*a*, the third outer member 1341*a*), the second outer portion (the second outer member 1332*a*, the fourth outer member 1342*a*, the second outer member 1332*a*1, the fourth outer member 1342*a*1) and the outer connection portion (a first outer connection portion 94A, a second outer connection portion 96A) connecting the first outer portion and the second outer portion.

The vehicle body support portion (the first bracket 1317, the second bracket 1327, and the first bracket 1317A) support the inner element on the vehicle body (the vehicle main body 1002) of the vehicle (the vehicle 1001).

The second outer portion (the second outer member 1332*a*, the fourth outer member 1342*a*, the second outer member 1332*a*1, the fourth outer member 1342*a*1) is smaller than the first outer portion (the first outer member 1331a, the third outer member 1341a) and is connected to the first outer portion (the first outer member 1331a, the third outer member 1341a) via the plurality of outer connection portions (the first connection portion 1351, the second connection portion 1352, the third connection portion 1353, the fourth connection portion 1354, the first connection portion 1351A, the second connection portion 1352A) arranged in the extension/contraction direction of the second telescopic element (the second telescopic element 1332, the fourth telescopic element 1342, the second telescopic element 1332A, the fourth telescopic element 1342A).

The second inner portion (the second inner member 1332b, the fourth inner member 1342b, the second inner member 1332b1, the fourth inner member 1342b1) has a size equal to or smaller than the first inner portion (the first inner member 1331b, the third inner member 1341b). The second inner portion (the second inner member 1332b, the fourth inner member 1342b, the second inner member 1332b1, the fourth inner member 1342b1) is connected to the first inner portion (the first inner member 1331b, the third inner member 1341b) via at least one of the inner connection portions (the first bracket 1317, the second bracket 1327, first bracket 1317A, the second bracket 1327A).

The second telescopic element (the second telescopic element 1332, the fourth telescopic element 1342, the second telescopic element 1332A, the fourth telescopic element 1342A) is disposed at a position in which the extension/contraction direction of the second telescopic element (the second telescopic element 1332, the fourth telescopic element 1342, the second telescopic element 1332A, the fourth telescopic element 1342A) is parallel or substantially parallel with the extension/contraction direction of the first telescopic element (the first telescopic element 1331, the third telescopic element 1341) as viewed from the rotation axis direction of the wheel (the first front wheel 1031, the second front wheel 1032) that is supported on the wheel support portion (the first axle support portion 1333, the second axle support portion 1343).

In the case that the suspension device (the first shock absorber 1033, the second shock absorber 1034) according to the above-mentioned first preferred embodiment is installed on the vehicle (the vehicle 1001), the rotation axis direction of the wheel (the first front wheel 1031, the second front wheel 1032) supported on the wheel support portion (the first axle support portion 1333, the second axle support portion 1343) coincides with the left-right direction of the vehicle (the vehicle 1001) in the upright state of the vehicle (the vehicle 1001). Hence, the second telescopic element (the second telescopic element 1332, the fourth telescopic element 1342, the second telescopic element 1332A, the fourth telescopic element 1342A) is disposed at a position in which the extension/contraction direction of the second telescopic element (the second telescopic element 1332, the fourth telescopic element 1342, the second telescopic element 1332A, the fourth telescopic element 1342A) is parallel or substantially parallel with the extension/contraction direction of the first telescopic element (the first telescopic element 1331, the third telescopic element 1341) as viewed from the left-right direction of the vehicle (the vehicle 1001) in the upright state of the vehicle in the state of being installed on the vehicle (the vehicle 1001).

Furthermore, the second telescopic element (the second telescopic element 1332, the fourth telescopic element 1342, the second telescopic element 1332A, the fourth telescopic element 1342A) is disposed at a position in which the second telescopic element is overlapped with at least a portion of the first telescopic element (the first telescopic element 1331, the third telescopic element 1341) as viewed from any one direction vertical with respect to the rotation axis of the wheel (the first front wheel 1031, the second front wheel 1032) that is supported on the wheel support portion (the first axle support portion 1333, the second axle support portion 1343).

The second telescopic element (the second telescopic element 1332, the fourth telescopic element 1342, the second telescopic element 1332A, the fourth telescopic element 1342A) is disposed at a position in which the second telescopic element is overlapped with at least a portion of the first telescopic element (the first telescopic element 1331, the third telescopic element 1341) as viewed from the front of the vehicle (the vehicle 1001) in the upright state of the vehicle in the state of being installed on the vehicle (the vehicle 1001).

With this configuration, the second outer portion (the second outer member 1332a, the fourth outer member 1342a, the second outer member 1332a1, the fourth outer member 1342a1) is smaller than the first outer portion (the first outer member 1331a, the third outer member 1341a). In addition, the second inner portion (the second inner member 1332b, the fourth inner member 1342b, the second inner member 1332b1, the fourth inner member 1342b1) has a size equal to or smaller than the first inner portion (the first inner member 1331b, the third inner member 1341b). Hence, the rigidity of the suspension device (the first shock absorber 1033, the second shock absorber 1034) having this configuration may be lower than the rigidity of the suspension device (the first shock absorber 1033, the second shock absorber 1034) equipped with two telescopic elements having the same size.

However, with this configuration, the second outer portion (the second outer member 1332a, the fourth outer member 1342a, the second outer member 1332a1, the fourth outer member 1342a1) is smaller than the first outer portion (the first outer member 1331a, the third outer member 1341a). Yet, the second outer portion (the second outer member 1332a, the fourth outer member 1342a, the second outer member 1332a1, the fourth outer member 1342a1) is connected to the first outer portion (the first outer member 1331a, the third outer member 1341a) via the plurality of outer connection portions arranged in the extension/contraction direction of the second telescopic element (the second telescopic element 1332, the fourth telescopic element 1342, the second telescopic element 1332A, the fourth telescopic element 1342A).

In addition, although the second inner portion (the second inner member 1332b, the fourth inner member 1342b, the second inner member 1332b1, the fourth inner member 1342b1) has a size equal to or smaller than the first inner portion (the first inner member 1331b, the third inner member 1341b), the second inner portion is connected to the first inner portion (the first inner member 1331b, the third inner member 1341b) via at least one inner connection portion. As a result, the second telescopic element (the second telescopic element 1332, the fourth telescopic element 1342, the second telescopic element 1332A, the fourth telescopic element 1342A) is connected to the first telescopic element (the first telescopic element 1331, the third telescopic element 1341) at least at three positions in the extension/contraction direction of the second telescopic element (the second telescopic element 1332, the fourth telescopic element 1342, the second telescopic element 1332A, the fourth telescopic element 1342A).

Furthermore, the second telescopic element (the second telescopic element 1332, the fourth telescopic element 1342, the second telescopic element 1332A, the fourth telescopic element 1342A) is disposed at a position in which the extension/contraction direction of the second telescopic element (the second telescopic element 1332, the fourth telescopic element 1342, the second telescopic element 1332A, the fourth telescopic element 1342A) is parallel or substantially parallel with the extension/contraction direction of the first telescopic element (the first telescopic element 1331, the third telescopic element 1341) as viewed from the rotation axis direction of the wheel (the first front wheel 1031, the second front wheel 1032) that is supported on the wheel support portion (the first axle support portion 1333, the second axle support portion 1343).

Moreover, the second telescopic element (the second telescopic element 1332, the fourth telescopic element 1342, the second telescopic element 1332A, the fourth telescopic element 1342A) is disposed at a position in which the second telescopic element is overlapped with at least a portion of the first telescopic element (the first telescopic element 1331, the third telescopic element 1341) as viewed from any one direction vertical with respect to the rotation axis of the wheel (the first front wheel 1031, the second front wheel 1032) that is supported on the wheel support portion (the first axle support portion 1333, the second axle support portion 1343).

Hence, the second telescopic element (the second telescopic element 1332, the fourth telescopic element 1342, the second telescopic element 1332A, the fourth telescopic element 1342A) is configured to perform a function of significantly reducing or preventing the deformation of the first telescopic element (the first telescopic element 1331, the third telescopic element 1341) due to the load applied from the road surface to the supported wheel (the first front wheel 1031, the second front wheel 1032), so-called the splint function. As a result, the suspension device (the first shock absorber 1033, the second shock absorber 1034) secures rigidity sufficient to endure the load applied from the road surface to the supported wheel (the first front wheel 1031, the second front wheel 1032).

With this configuration, the second outer portion (the second outer member 1332a, the fourth outer member 1342a, the second outer member 1332a1, the fourth outer member 1342a1) is smaller than the first outer portion (the first outer member 1331a, the third outer member 1341a). In addition, the second inner portion (the second inner member 1332b, the fourth inner member 1342b, the second inner member 1332b1, the fourth inner member 1342b1) has a size equal to or smaller than the first inner portion (the first inner member 1331b, the third inner member 1341b).

Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily.

Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. As a result, the vehicle (the vehicle 1001) equipped with the suspension device is downsized.

With this configuration, the vehicle (the vehicle 1001) equipped with the suspension device is downsized while securing rigidity sufficient to endure the load applied from the road surface to the supported wheel (the first front wheel 1031, the second front wheel 1032).

Note that, the wheel support portion (the first axle support portion 1333, the second axle support portion 1343) may be able to support the wheel (the first front wheel 1031, the second front wheel 1032) on the inner element (the first upper portion 1033b, the second upper portion 1034b) including the first and second inner portions (the second inner member 1332b, the fourth inner member 1342b, the second inner member 1332b1, the fourth inner member 1342b1) connected to each other. The vehicle body support portion (the first bracket 1317, the second bracket 1327, and the first bracket 1317A) may be able to support the outer element (the first lower portion 1033a, the second lower portion 1034a) on the vehicle body (the vehicle main body 1002) of the vehicle (the vehicle 1001). Also in this case, the above-mentioned advantage is obtained.

The suspension device (the first shock absorber 1033, the second shock absorber 1034) according to the above-mentioned first preferred embodiment further preferably has the following configuration.

The second outer portion (the second outer member 1332a, the fourth outer member 1342a, the second outer member 1332a1, the fourth outer member 1342a1) is made shorter than the first outer portion (the first outer member 1331a, the third outer member 1341a) in the extension/contraction direction of the second telescopic element (the second telescopic element 1332, the fourth telescopic element 1342, the second telescopic element 1332A, the fourth telescopic element 1342A) in the extension/contraction direction of the second telescopic element (the second telescopic element 1332, the fourth telescopic element 1342, the second telescopic element 1332A, the fourth telescopic element 1342A) and is connected to the first outer portion (the first outer member 1331a, the third outer member 1341a) via the plurality of outer connection portions arranged in the extension/contraction direction of the second telescopic element (the second telescopic element 1332, the fourth telescopic element 1342, the second telescopic element 1332A, the fourth telescopic element 1342A).

Since the inner member is inserted into the outer member, the outer member is larger than the inner member. With this configuration, since the second outer portion (the second outer member 1332a, the fourth outer member 1342a, the second outer member 1332a1, the fourth outer member 1342a1), being larger among the second telescopic elements (the second telescopic element 1332, the fourth telescopic element 1342, the second telescopic element 1332A, the fourth telescopic element 1342A), is made shorter, the second telescopic element (the second telescopic element 1332, the fourth telescopic element 1342, the second telescopic element 1332A, the fourth telescopic element 1342A) is made shorter than the first telescopic element (the first telescopic element 1331, the third telescopic element 1341).

In addition, since the second outer portion (the second outer member 1332a, the fourth outer member 1342a, the second outer member 1332*a*1, the fourth outer member 1342*a*1) is connected to the first outer portion (the first outer member 1331*a* and the third outer member 1341*a*) via the plurality of outer connection portions arranged in the extension/contraction direction of the second telescopic element (the second telescopic element 1332, the fourth telescopic element 1342, the second telescopic element 1332A, the fourth telescopic element 1342A), the lowering of the rigidity is significantly reduced or prevented. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily.

Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032).

The suspension device (the first shock absorber 1033, the second shock absorber 1034) according to the above-mentioned first preferred embodiment further preferably has the following configuration.

The second telescopic element (the second telescopic element 1332, the fourth telescopic element 1342, the second telescopic element 1332A, and the fourth telescopic element 1342A) is shorter than the first telescopic elements (the first telescopic element 1331, the third telescopic element 1341). The first telescopic element (the first telescopic element 1331, the third telescopic element 1341) is equipped with the component support portion (the first sensor stay 1814, the second sensor stay 1824) capable of supporting the components (the first wheel speed sensor 1081, the second wheel speed sensor 1082) in the concave portion configured to include the first telescopic element (the first telescopic element 1331, the third telescopic element 1341) and the second telescopic element (the second telescopic element 1332, the fourth telescopic element 1342, the second telescopic element 1332A, the fourth telescopic element 1342A) as viewed from the rotation axis direction of the wheel (the first front wheel 1031, the second front wheel 1032) supported on the wheel support portion (the first axle support portion 1333, the second axle support portion 1343).

Usually, the component support portion capable of supporting the components installed on the vehicle (the vehicle 1001) is provided around the first telescopic element (the first telescopic element 1331, the third telescopic element 1341) and the second telescopic element (the second telescopic element 1332, the fourth telescopic element 1342, the second telescopic element 1332A, the fourth telescopic element 1342A). With this configuration, since the second outer portion (the second outer member 1332*a*, the fourth outer member 1342*a*, the second outer member 1332*a*1, the fourth outer member 1342*a*1) is made shorter than the first outer portion (the first outer member 1331*a*, the third outer member 1341*a*) in the extension/contraction direction of the second telescopic element (the second telescopic element 1332, the fourth telescopic element 1342, the second telescopic element 1332A, the fourth telescopic element 1342A), the lower end of the second outer portion (the second outer member 1332*a*, the fourth outer member 1342*a*, the second outer member 1332*a*1, the fourth outer member 1342*a*1) is positioned above the lower end of the first outer portion (the first outer member 1331*a*, the third outer member 1341*a*) in the extension/contraction direction of the second telescopic element (the second telescopic element 1332, the fourth telescopic element 1342, the second telescopic element 1332A, the fourth telescopic element 1342A). Hence, the concave portion is configured to include the first telescopic elements (the first telescopic element 1331, the third telescopic element 1341) and the second telescopic elements (the second telescopic element 1332, the fourth telescopic element 1342, the second telescopic element 1332A, and the fourth telescopic element 1342A). The component support portion capable of supporting the components installed on the vehicle (the vehicle 1001) is provided in the concave portion. For this reason, the suspension device (the first shock absorber 1033, the second shock absorber 1034) is downsized. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily. Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheels (the first front wheel 1031, the second front wheel 1032).

Note that, the component support portion may be provided on the second telescopic element (the second telescopic element 1332, the fourth telescopic element 1342, the second telescopic element 1332A, and the fourth telescopic element 1342A). Also in this case, the above-mentioned advantage is obtained.

The suspension device (the first shock absorber 1033, the second shock absorber 1034) according to the above-mentioned first preferred embodiment further preferably has the following configuration. The concave portion 1361 is provided in the outer element (the first lower portion 1033*a*, the second lower portion 1034*a*).

With this configuration, the concave portion is easily configured to include the first telescopic element (the first telescopic element 1331, the third telescopic element 1341) and the second telescopic element (the second telescopic element 1332, the fourth telescopic element 1342, the second telescopic element 1332A, the fourth telescopic element 1342A) that is shorter than the first telescopic element (the first telescopic element 1331, the third telescopic element 1341). Furthermore, since the first outer portion (the first outer member 1331a, the third outer member 1341a) and the second outer portion (the second outer member 1332a, the fourth outer member 1342a, the second outer member 1332a1, the fourth outer member 1342a1) are connected via the plurality of outer connection portions, the rigidity of the outer element is high. Since the concave portion is provided in the outer element having high rigidity, the concave portion is configured with a simple structure. For this reason, the suspension device (the first shock absorber 1033, the second shock absorber 1034) is downsized. Hence, in the case that the suspension device (the first shock absorber 1033, the second shock absorber 1034) according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the first shock absorber 1033, the second shock absorber 1034) according to the above-mentioned first preferred embodiment further preferably has the following configuration. The inner connection portion (the first bracket 1317, the second bracket 1327, the first bracket 1317A, the second bracket 1327A) connects the other end portion of the first inner portion (the first inner member 1331b, the third inner member 1341b) to the other end portion of the second inner portion (the second inner member 1332b, the fourth inner member 1342b, the second inner member 1332b1, the fourth inner member 1342b1).

With this configuration, since the inner connection portion (the first bracket 1317, the second bracket 1327, the first bracket 1317A, the second bracket 1327A) connects the other end portion of the first inner portion (the first inner member 1331b, the third inner member 1341b) to the other end portion of the second inner portion (the second inner member 1332b, the fourth inner member 1342b, the second inner member 1332b1, the fourth inner member 1342b1), the concave portion is provided on one end side of the second telescopic element (the second telescopic element 1332, the fourth telescopic element 1342, the second telescopic element 1332A, the fourth telescopic element 1342A) that is shorter than the first telescopic element (the first telescopic element 1331, the third telescopic element 1341). Since the component support portion is configured to include the concave portion, the space thereof is used efficiently, and the suspension device (the first shock absorber 1033, the second shock absorber 1034) is downsized. Hence, in the case that the suspension device (the first shock absorber 1033, the second shock absorber 1034) according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheels.

The suspension device (the first shock absorber 1033, the second shock absorber 1034) according to the above-mentioned first preferred embodiment further preferably has the following configuration. The wheel support portion (the first axle support portion 1333, the second axle support portion 1343) is provided on the outer element (the first lower portion 1033a, the second lower portion 1034a). The vehicle body support portion (the first bracket 1317, the second bracket 1327, and the first bracket 1317A) is provided on the inner element.

With this configuration (6), since the first outer portion (the first outer member 1331a, the third outer member 1341a) and the second outer portion (the second outer member 1332a, the fourth outer member 1342a, the second outer member 1332a1, the fourth outer member 1342a1) are connected via the plurality of the outer connection portions, the rigidity of the outer element (the first lower portion 1033a, the second lower portion 1034a) is high. Since the wheel support portion (the first axle support portion 1333, the second axle support portion 1343) is provided on the outer element (the first lower portion 1033a, the second lower portion 1034a) having high rigidity, the wheel support portion (the first axle support portion 1333, the second axle support portion 1343) is configured with a simple structure. For this reason, the suspension device (the first shock absorber 1033, the second shock absorber 1034) is downsized. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily. Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. Hence, the vehicle equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032).

This configuration is preferably combined with one of the above-mentioned configurations. The suspension device (the first shock absorber 1033, the second shock absorber 1034) is downsized by providing the wheel support portion (the first axle support portion 1333, the second axle support portion 1343) in the concave portion formed by the first telescopic element (the first telescopic element 1331, the third telescopic element 1341) and the second telescopic element (the second telescopic element 1332, the fourth telescopic element 1342, the second telescopic element 1332A, the fourth telescopic element 1342A). Hence, in the case that the suspension device (the first shock absorber 1033, the second shock absorber 1034) according to a preferred embodiment of the present invention is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily. Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032).

The suspension device (the first shock absorber 1033, the second shock absorber 1034) according to the above-mentioned first preferred embodiment further preferably has the following configuration. The vehicle body support portion (the first bracket 1317, the second bracket 1327, and the first bracket 1317A) is provided on the inner connection portion.

With this configuration, since the vehicle body support portion (the first bracket 1317, the second bracket 1327, the first bracket 1317A) is provided on the inner connection portion, the distance between the first inner portion (the first inner member 1331b, the third inner member 1341b) and the second inner portion (the second inner member 1332b, the fourth inner member 1342b, the second inner member 1332b1, the fourth inner member 1342b1) is small. For this reason, the suspension device (the first shock absorber 1033, the second shock absorber 1034) is downsized. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily. Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032)).

The suspension devices (the first shock absorber 1033, the second shock absorber 1034) according to the above-mentioned first preferred embodiment preferably may further have the following configuration. The vehicle body support portion is provided on the outer element.

One end of the inner portion is inserted into the outer portion. Hence, the inner portion is smaller than the outer element in the direction vertical with respect to the extension/contraction direction of the telescopic element. With this configuration, the wheel support portion (the first axle support portion 1333, the second axle support portion 1343) is provided on the inner element including the inner portion smaller than the outer portion. Furthermore, the larger outer portion is disposed away from the wheel (the first front wheel 1031, the second front wheel 1032). For this reason, the suspension device is downsized. Hence, in the case that the suspension device is installed on the vehicle (the vehicle 1001), the interference of the two telescopic elements of the right suspension device with the left front wheel (the first front wheel 1031) or the two telescopic elements of the left suspension device is avoided easily. Similarly, the interference of the two telescopic elements of the left suspension device with the right front wheel (the second front wheel 1032) or the two telescopic elements of the right suspension device is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032).

The suspension device (the first shock absorber 1033, the second shock absorber 1034) according to the above-mentioned first preferred embodiment preferably may further have the following configuration. The vehicle body support portion is provided on the first outer portion.

With this configuration, the vehicle body support portion is configured to include the first outer portion that is larger than the second outer portion. For this reason, the suspension device is downsized. Hence, in the case that the suspension device is installed on the vehicle (the vehicle 1001), the interference of the two telescopic elements of the right suspension device with the left front wheel (the first front wheel 1031) or the two telescopic elements of the left suspension device is avoided easily. Similarly, the interference of the two telescopic elements of the left suspension device with the right front wheel (the second front wheel 1032) or the two telescopic elements of the right suspension device is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032).

The suspension device (the first shock absorber 1033, the second shock absorber 1034) according to the above-mentioned first preferred embodiment further preferably has the following configuration. The inner connection portion connects the other end portion of the first inner portion (the first inner member 1331*b*, the third inner member 1341*b*) to the other end portion of the second inner portion (the second inner member 1332*b*, the fourth inner member 1342*b*, the second inner member 1332*b*1, the fourth inner member 1342*b*1) at the same position as that of the second telescopic element (the second telescopic element 1332, the fourth telescopic element 1342, the second telescopic element 1332A, the fourth telescopic element 1342A) in the extension/contraction directions thereof.

The inner connection portion includes the upper end portion of the first inner portion (the first inner member 1331*b*, the third inner member 1341*b*) and the upper end portion of the second inner portion (the second inner member 1332*b*, the fourth inner member 1342*b*, the second inner member 1332*b*1, the fourth inner member 1342*b*1) on an imaginary plane vertical with respect to the extension/contraction direction of the second telescopic element (the second telescopic element 1332, the fourth telescopic element 1342, the second telescopic element 1332A, the fourth telescopic element 1342A).

With this configuration, the inner connection portion is small. For this reason, the suspension device (the first shock absorber 1033, the second shock absorber 1034) is downsized. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily. Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. Hence, the vehicle (the vehicle 1001) equipped with the suspension device is downsized further. As a result, with this configuration, the vehicle (the vehicle 1001) equipped with the suspension devices is downsized while securing rigidity sufficient to endure the load applied from the road surface to the supported wheel (the first front wheel 1031, the second front wheel 1032).

This configuration is preferably combined with the above-mentioned configurations. With this configuration, the concave portion configured to include the first telescopic element (the first telescopic element 1331, the third telescopic element 1341) and the second telescopic element (the second telescopic element 1332, the fourth telescopic element 1342, the second telescopic element 1332A, the fourth telescopic element 1342A) is made large. For this reason, the suspension device (the first shock absorber 1033, the second shock absorber 1034) is downsized. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342, the fourth telescopic element 1342A) of the right suspension device (the second shock absorber 1034) with the left front wheel (the first front wheel 1031) or the two telescopic elements (the first telescopic element 1331, the second telescopic element 1332, the second telescopic element 1332A) of the left suspension device (the first shock absorber 1033) is avoided easily. Similarly, the interference of the two telescopic elements (the first telescopic element 1331, the second telescopic element 1332, the second telescopic element 1332A) of the left suspension device (the first shock absorber 1033) with the right front wheel (the second front wheel 1032) or the two telescopic elements (the third telescopic element 1341, the fourth telescopic element 1342, the fourth telescopic element 1342A) of the right suspension device (the second shock absorber 1034) is avoided easily. Hence, the vehicle (the vehicle 1001) equipped with the suspension device is downsized further. As a result, with this configuration, the vehicle (the vehicle 1001) equipped with the suspension devices is downsized while securing rigidity sufficient to endure the load applied from the road surface to the supported wheel (the first front wheel 1031, the second front wheel 1032).

The suspension device (the first shock absorber 1033, the second shock absorber 1034) according to the above-mentioned first preferred embodiment preferably may further have the following configuration. The second inner portion (the second inner member 1332*b*1, the fourth inner member 1342*b*1) is smaller than the first inner portion (the first inner member 1331*b*, the third inner member 1341*b*) in the direction vertical with respect to the extension/contraction direction of the second telescopic element (the second telescopic element 1332A, the fourth telescopic element 1342A) as viewed from the rotation axis direction of the wheel supported on the wheel support portion (the first axle support portion 1333, the second axle support portion 1343). Furthermore, the second inner portion (the second inner member 1332*b*1, the fourth inner member 1342*b*1) is smaller than the first inner portion (the first inner member 1331*b*, the third inner member 1341*b*) in the direction vertical with respect to the extension/contraction direction of the second telescopic element (the second telescopic element 1332A, the fourth telescopic element 1342A) as viewed from any one direction vertical with respect to the rotation axis of the wheel (the first front wheel 1031, the second front wheel 1032) supported on the wheel support portion (the first axle support portion 1333, the second axle support portion 1343).

With this configuration (11), the second inner portion (the second inner member 1332*b*1, the fourth inner member 1342*b*1) is small in the extension/contraction direction of the second telescopic element (the second telescopic element 1332A, the fourth telescopic element 1342A). Hence, the second outer portion (the second outer member 1332*a*1, the fourth outer member 1342*a*1) is also able to be small in the direction vertical with respect to the extension/contraction direction of the second telescopic element (the second telescopic element 1332A, the fourth telescopic element 1342A). Furthermore, the inner connection portion is also able to be small. For this reason, the suspension device (the first shock absorber 1033, the second shock absorber 1034)

is downsized. Hence, in the case that the suspension device (the first shock absorber 1033, the second shock absorber 1034) according to the above-mentioned first preferred embodiment is installed on the vehicle (the vehicle 1001), the interference of the two telescopic elements (the third telescopic element 1341, the fourth telescopic element 1342A) of the right suspension device (the second shock absorber 1034) with the left front wheel (the first front wheel 1031) or the two telescopic elements (the first telescopic element 1331, the second telescopic element 1332A) of the left suspension device (the first shock absorber 1033) is avoided easily. Similarly, the interference of the two telescopic elements (the first telescopic element 1331, the second telescopic element 1332A) of the left suspension device (the first shock absorber 1033) with the right front wheel (the second front wheel 1032) or the two telescopic elements (the third telescopic element 1341, the fourth telescopic element 1342A) of the right suspension device (the second shock absorber 1034) is avoided easily. Hence, the vehicle (the vehicle 1001) equipped with the suspension device is downsized further. As a result, with this configuration, the vehicle (the vehicle 1001) equipped with the suspension device is downsized while securing rigidity sufficient to endure the load applied from the road surface to the supported wheel (the first front wheel 1031, the second front wheel 1032).

In the above-mentioned first preferred embodiment, although the upper portions of the first telescopic element 1331 and the second telescopic element 1332 are the inner members and the lower portions thereof are the outer members, the elements are not limited to this example. The upper portions of the first telescopic element 1331 and the second telescopic element 1332 may be the outer members and the lower portions thereof may be the inner members. Similarly, the upper portions of the third telescopic element 1341 and the fourth telescopic element 1342 may be the outer members and the lower portions thereof may be the inner members.

In addition, in the above-mentioned first preferred embodiment, although the second telescopic element 1332 is disposed in front of the first telescopic element 1331, the disposition is not limited to this example. The first telescopic element 1331 and the second telescopic element 1332 are merely required to be disposed on the same side of the first front wheel 1031; for example, the second telescopic element 1332 may be disposed behind the first telescopic element 1331. Similarly, the third telescopic element 1341 and the fourth telescopic element 1342 are merely required to be disposed on the same side of the second front wheel 1032; for example, the fourth telescopic element 1342 may be disposed behind the third telescopic element 1341.

Furthermore, in the above-mentioned first preferred embodiment, the first shock absorber 1033 and the second shock absorber 1034 are preferably disposed between the first front wheel 1031 and the second front wheel 1032 in the left-right direction of the vehicle. However, the first shock absorber 1033 may be disposed further outside the vehicle than the first front wheel 1031 in the left-right direction of the vehicle; similarly, the second shock absorber 1034 may be disposed further outside the vehicle than the second front wheel 1032 in the left-right direction of the vehicle.

Moreover, in the above-mentioned first preferred embodiment, although an example in which the first telescopic element 1331 preferably is configured to perform the damper function and the second telescopic element 1332 has no damper function has been described, the configuration thereof is not limited to this example. For example, both the first telescopic element 1331 and the second telescopic element 1332 may be configured to perform the damper function. Similarly, both the third telescopic element 1341 and the fourth telescopic element 1342 may be configured to perform the damper function.

Still further, in the above-mentioned first preferred embodiment, the extension/contraction direction of the first telescopic element 1331 and the extension/contraction direction of the second telescopic element 1332 preferably are parallel or substantially parallel with the direction of the first center axis Y1. However, the extension/contraction direction of the first telescopic element 1331 and the extension/contraction direction of the second telescopic element 1332 may not be parallel or substantially parallel with the direction of the first center axis Y1. Similarly, in the above-mentioned first preferred embodiment, the extension/contraction direction of the third telescopic element 1341 and the extension/contraction direction of the fourth telescopic element 1342 preferably are parallel or substantially parallel with the direction of the second center axis Y2. However, the extension/contraction direction of the third telescopic element 1341 and the extension/contraction direction of the fourth telescopic element 1342 may not be parallel or substantially parallel with the direction of the second center axis Y2.

Reference Example

A suspension device mounted on a three-wheel vehicle 1 according to a reference example will be described below referring to FIGS. 9 to 14. The reference example will be described so as to explain in comparison with a second preferred embodiment of the present invention which will be explained next. In the figures, the same or corresponding components are designated by the same numerals and their explanations are not repeated. In the following descriptions, an arrow F in the figures indicates the forward direction of the three-wheel vehicle 1. An arrow R in the figures indicates the rightward direction of the three-wheel vehicle 1. An arrow L in the figures indicates the leftward direction of the three-wheel vehicle 1. An arrow U indicates the upward direction thereof. The center in the vehicle width direction is defined as the center position in the vehicle width direction in a front view. In the reference example, it is noted that a first rotation prevention portion 8 and a second rotation prevention portion 7 are not telescopic elements.

Figure 9:
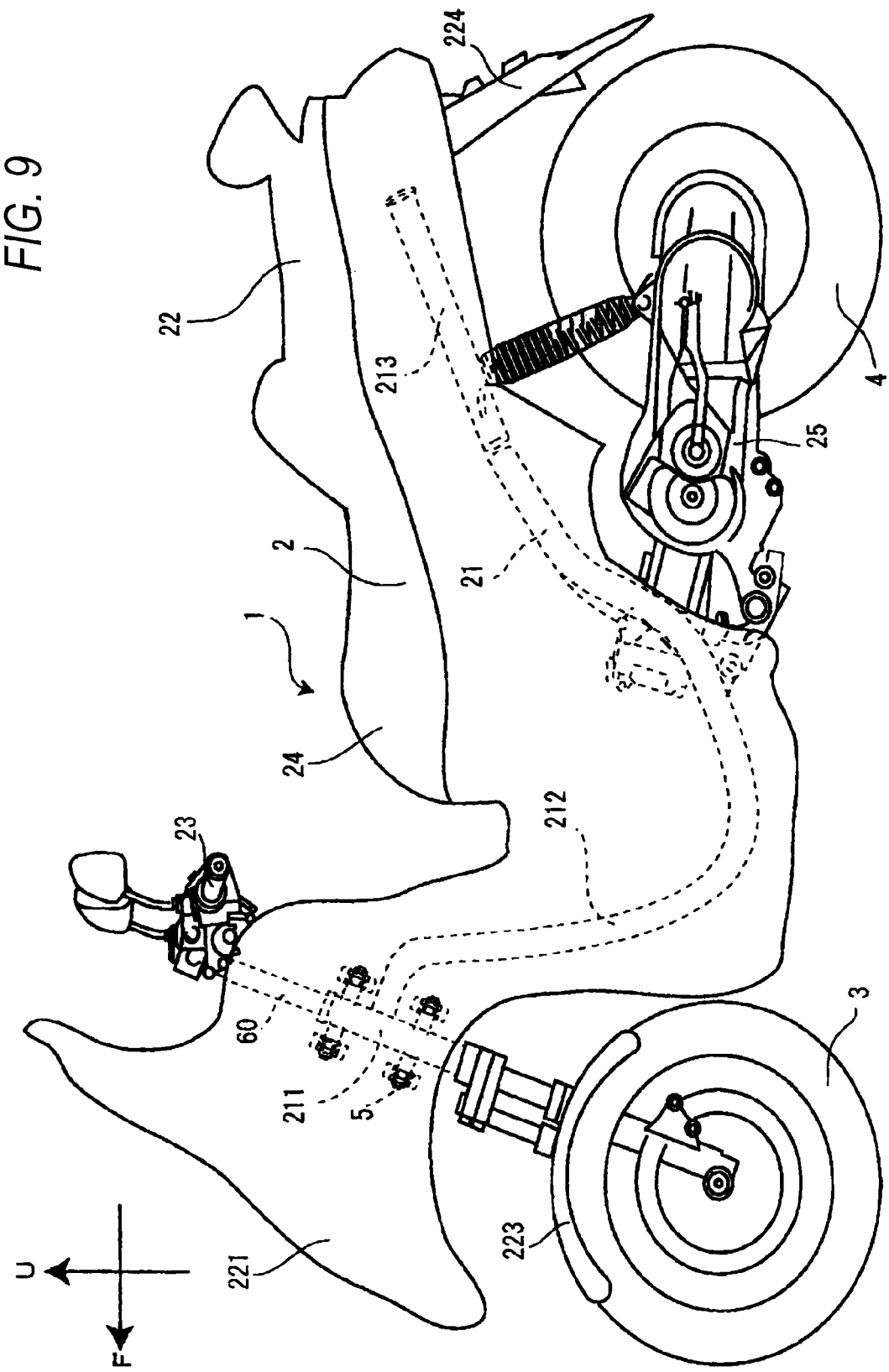
FIG. 9 is an overall side view showing a three-wheel vehicle according to a reference example.

FIG. 9 is an overall side schematic view showing the three-wheel vehicle 1. In the case that the front-rear direction and the left-right direction are indicated in the following descriptions, the directions denote the front-rear direction and the left-right direction as viewed from the occupant diving the three-wheel vehicle 1.

The three-wheel vehicle 1 is equipped with a vehicle body 2, front wheels 3 and a rear wheel 4. The vehicle body 2 mainly includes a vehicle body frame 21, a vehicle body cover 22, a handle 23, a seat 24 and a power unit 25.

The vehicle body frame 21 supports the power unit 25, the seat 24, and the like. The power unit 25 includes an engine, a transmission, and the like. In FIG. 9, the vehicle body frame 21 is indicated in broken lines.

The vehicle body frame 21 includes a head pipe 211, a front frame 212 and a rear frame 213. The head pipe 211 is disposed in the front portion of the vehicle. A link mechanism 5 is disposed around the head pipe 211. A steering shaft 60 is rotatably inserted into the head pipe 211. The steering shaft 60 extends in the up-down direction. The handle 23 is installed at the upper end of the steering shaft 60. The front frame 212 is inclined downward from the front end to the rear. The rear frame 213 supports the seat 24 and a tail lamp.

The vehicle body frame 21 is covered with the vehicle body cover 22. The vehicle body cover 22 includes a front cover 221, front fenders 223 and a rear fender 224.

The front cover 221 is positioned in front of the seat 24. The front cover 221 covers the head pipe 211 and the link mechanism 5.

The front fenders 223 are respectively disposed above the pair of left and right front wheels 3. The front fenders 223 are disposed below the front cover 221. The rear fender 224 is disposed above the rear wheel 4.

The front wheels 3 are positioned below the head pipe 211 and the link mechanism 5. The front wheels 3 are disposed below the front cover 221.

Figure 10:
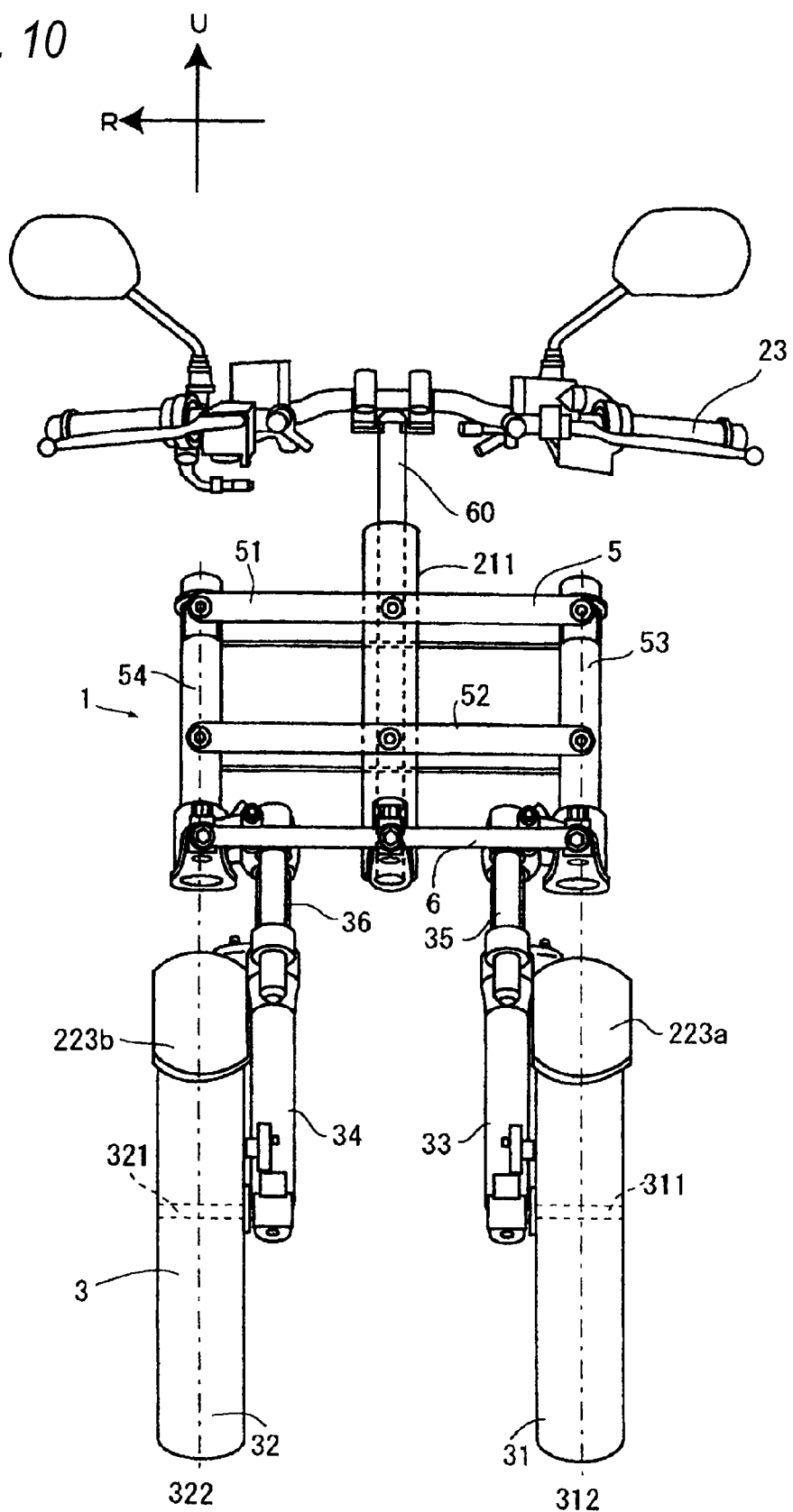
FIG. 10 is an overall front view showing the three-wheel vehicle of FIG. 9 in a state in which the vehicle body cover thereof is removed.

FIG. 10 is an overall front view showing the three-wheel vehicle 1 in a state in which the vehicle body cover 22 is removed. In FIG. 10, the front frame 212, and the like are not shown.

The three-wheel vehicle 1 is equipped with the handle 23, the steering shaft 60, the head pipe 211, the pair of left and right front wheels 3, a first shock-absorbing mechanism 35, a second shock-absorbing mechanism 36, the link mechanism 5 and an operation force transmission mechanism 6.

The front wheels 3 include a first front wheel 31 and a second front wheel 32. The first front wheel 31 is disposed on the left side in the vehicle width direction. A first front fender 223a is disposed above the first front wheel 31. The second front wheel 32 is disposed on the right side in the vehicle width direction. A second front fender 223b is disposed above the second front wheel 32. The second front wheel 32 is disposed so as to be symmetric with the first front wheel 31 in the vehicle width direction in the upright state of the vehicle.

Figure 13:
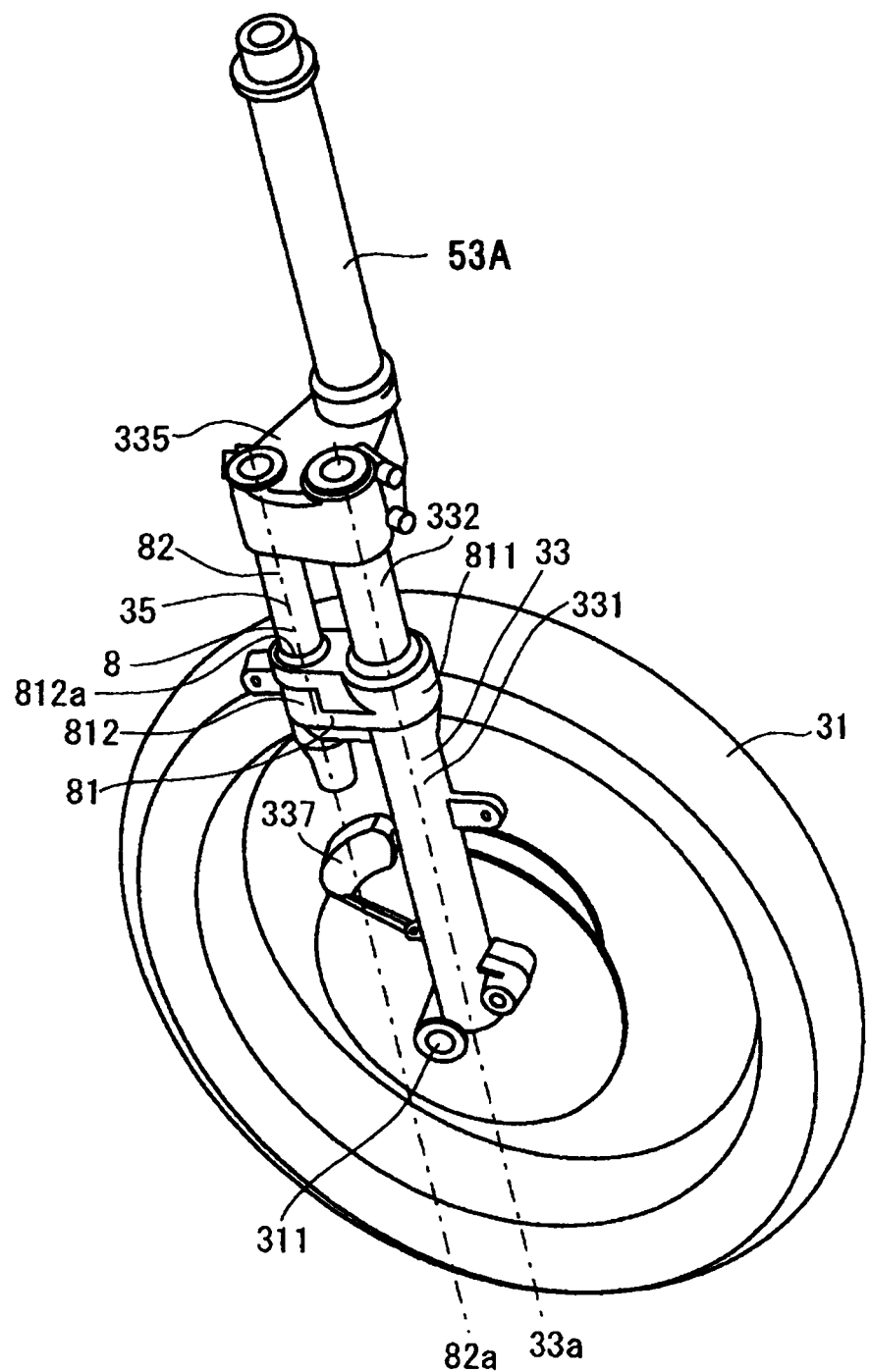
FIG. 13 is a perspective view showing the first rotation mechanism and the first front wheel of the three-wheel vehicle of FIG. 9.

As shown in FIG. 13, the first shock-absorbing mechanism 35 includes a first shock absorber 33. The first front wheel 31 is supported via the first shock-absorbing mechanism 35. The first front wheel 31 is supported via the first shock absorber 33. The first front wheel 31 is supported at the lower portion of the first shock absorber 33. The first front wheel 31 is rotatable about a first rotation shaft 311. The first rotation shaft 311 is rotatably supported via the first shock absorber 33. The first rotation shaft 311 extends in the vehicle width direction. The first front wheel 31 is rotatable about a second rotation axis 312. The second rotation axis 312 extends in the up-down direction passing through the point at which the first front wheel 31 makes contact with the ground in a front view.

The second shock-absorbing mechanism 36 includes a second shock absorber 34. The second front wheel 32 is supported via the second shock-absorbing mechanism 36. The second front wheel 32 is supported via the second shock absorber 34. The second front wheel 32 is supported at the lower portion of the second shock absorber 34. The second front wheel 32 is rotatable about a third rotation shaft 321. The third rotation shaft 321 is rotatably supported via the second shock absorber 34. The third rotation shaft 321 extends in the vehicle width direction. The second front wheel 32 is rotatable about a fourth rotation axis 322. The fourth rotation axis 322 extends in the up-down direction passing through the point at which the second front wheel 32 makes contact with the ground in a front view. The first shock-absorbing mechanism 35 is disposed below the link mechanism 5. The lower end of the first shock-absorbing mechanism 35 is positioned below the first rotation shaft 311 of the first front wheel 31 in a side view.

The first shock absorber 33 absorbs the impact applied to the first front wheel 31. The first shock absorber 33 is disposed below the link mechanism 5. The first shock absorber 33 extends in the extension direction of the steering shaft 60 and the head pipe 211. The first shock absorber 33 is disposed on the left side in the vehicle width direction. The first shock absorber 33 is disposed on the right of the first front wheel 31. The second shock absorber 34 absorbs the impact applied to the second front wheel 32. The second shock absorber 34 is disposed below the link mechanism 5. The second shock absorber 34 is disposed on the right side in the vehicle width direction. The second shock absorber 34 is disposed on the left of the second front wheel 32. The second shock-absorbing mechanism 36 is disposed below the link mechanism 5. The second shock-absorbing mechanism 36 is positioned below the third rotation shaft 321 of the second front wheel 32. The second shock-absorbing mechanism 36 is similar to the first shock-absorbing mechanism 35 in configuration in a side view.

The second shock-absorbing mechanism 36 is disposed below the link mechanism 5. The second shock-absorbing mechanism 36 is positioned below the third rotation shaft 321 of the second front wheel 32. The second shock-absorbing mechanism 36 is similar to the first shock-absorbing mechanism 35 in configuration in a side view.

The link mechanism 5 is used to tilt the first front wheel 31 and the second front wheel 32 in the left-right direction with respect to the vertical direction together with the vehicle body. The link mechanism 5 is disposed around the head pipe 211.

In the case that the occupant operates the handle 23, the operation force transmission mechanism 6 rotates the first front wheel 31 about the second rotation axis 312 in the left-right direction and rotates the second front wheel 32 about the fourth rotation axis 322 in the left-right direction in accordance with the operation of the handle 23. The operation force transmission mechanism 6 is disposed below the link mechanism 5 and above the first front wheel 31 and the second front wheel 32 in the upright state of the vehicle.

Figure 11:
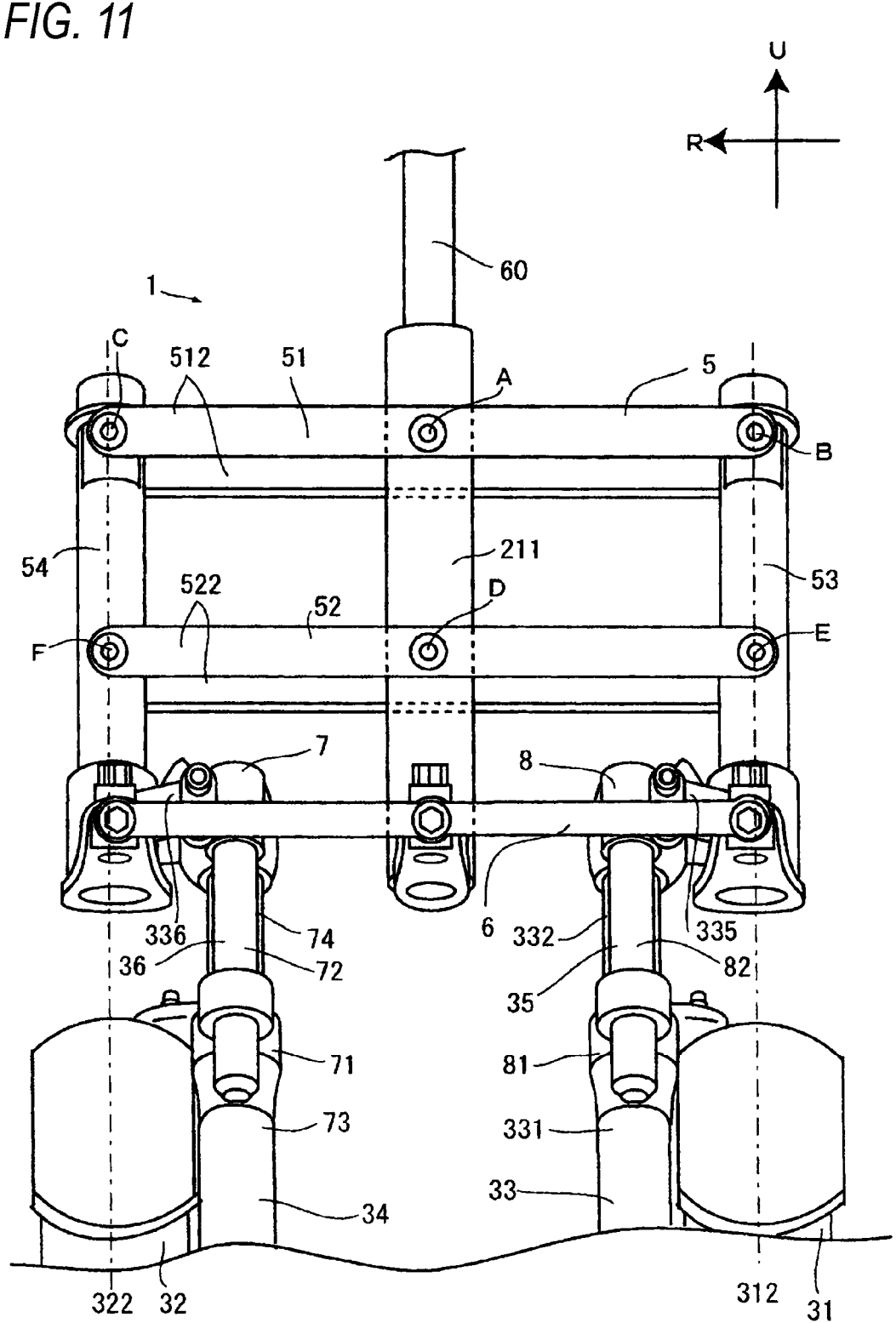
FIG. 11 is an enlarged front view showing the area around the link mechanism of the three-wheel vehicle of FIG. 9.

FIG. 11 is an enlarged front view showing the area around the link mechanism 5. The link mechanism 5 supports the first front wheel 31 and the second front wheel 32 with respect to the vehicle body frame 21. The link mechanism 5 includes a first cross member 51, a second cross member 52, a first side member 53 and a second side member 54.

The first cross member 51 extends in the vehicle width direction. The first cross member 51 is supported on the vehicle body frame 21 (the head pipe 211) via a support portion A. The first cross member 51 is supported on the vehicle body frame 21 so as to be rotatable about the rotation axis of the support portion A. The first cross member 51 is rotatable relatively with respect to the steering shaft 60. Even in the case that the steering shaft 60 is rotated in accordance with the turn of the handle 23, the first cross member 51 is not rotated with respect to the vehicle body frame 21. The first cross member 51 includes a pair of plate-shaped members 512. The pair of plate-shaped members 512 is disposed in front of and behind the head pipe 211, respectively. The first cross member 51 is supported on the first side member 53 via a support portion B. The first cross member 51 is supported so as to be rotatable about the rotation axis of the support portion B with respect to the first side member 53. The first cross member 51 is supported on the second side member 54 via a support portion C. The first cross member 51 is supported so as to be rotatable about the rotation axis of the support portion C with respect to the second side member 54. The first cross member 51 is rotatable with respect to the first side member 53 and the second side member 54 in the plane including the first cross member 51 and the second cross member 52.

The second cross member 52 is supported on the vehicle body frame 21 (the head pipe 211) via a support portion D. The second cross member 52 is supported on the vehicle body frame 21 so as to be rotatable about the rotation axis of the support portion D. The second cross member 52 is disposed below the first cross member 51. The second cross member 52 is parallel or substantially parallel with the first cross member 51. The second cross member 52 has the same length as that of the first cross member 51. The second cross member 52 is rotatable relatively with respect to the steering shaft 60. Even in the case that the steering shaft 60 is rotated in accordance with the turn of the handle 23, the second cross member 52 is not rotated with respect to the vehicle body frame 21. The second cross member 52 includes a pair of plate-shaped members 522. The second cross member 52 extends in the vehicle width direction. The pair of plate-shaped members 522 is disposed in front of and behind the head pipe 211, respectively. The second cross member 52 is supported on the first side member 53 via a support portion E. The second cross member 52 is supported on the first side member 53 so as to be rotatable about the rotation axis of the support portion E. The second cross member 52 is supported on the second side member 54 via a support portion F. The second cross member 52 is supported so as to be rotatable about the rotation axis of the support portion F. The second cross member 52 is rotatable with respect to the first side member 53 and the second side member 54 in the plane including the first cross member 51 and the second cross member 52. In the reference example, the first cross member 51 and the second cross member 52 include a pair of front and rear plate-shaped members respectively extending in the left-right direction; however, each of the first cross member 51 and the second cross member 52 may be a member including a member extending from the head pipe 211 in the right direction and a member extending from the head pipe 211 in the left direction.

The first side member 53 is a cylindrical member. The first side member 53 is disposed on the left of the head pipe 211. The first side member 53 extends in the extension direction of the head pipe 211. The first side member 53 extends in the extension direction of the steering shaft 60. The first side member 53 is disposed above the first front wheel 31. A first bracket 335 is supported on the first side member 53 so as to be rotatable about the second axis 312. The first bracket 335 is rotated about the second rotation axis 312 in accordance with the turn of the handle 23. In the case that the first bracket 335 is rotated, the first side member 53 is not rotated with respect to the vehicle body frame 21. The first side member 53 is disposed on the left of the first shock absorber 33. The first side member 53 is disposed above the first shock absorber 33.

The first shock-absorbing mechanism 35 includes the first shock absorber 33, the first rotation prevention portion 8, the first bracket 335 and a first side support member 53A. The first rotation prevention portion 8 includes a first guide 81 and a first rod member 82. The first shock absorber 33 includes a first outer tube 331 and a first inner tube 332. A portion of the first inner tube 332 is inserted into the inner circumference of the first outer tube 331. The details of the configuration of the first shock absorber 35 will be described later.

The second side member 54 is a cylindrical member. The second side member 54 is disposed on the right of the head pipe 211. The second side member 54 extends in the extension direction of the head pipe 211. The second side member 54 extends in the extension direction of the steering shaft 60. The second side member 54 is disposed above the second front wheel 32. A second bracket 336 is supported on the second side member 54 so as to be rotatable about the fourth rotation axis 322. The second bracket 336 is rotated about the fourth rotation axis 322 in accordance with the turn of the handle 23. In the case that the second bracket 336 is rotated, the second side member 54 is not rotated with respect to the vehicle body frame 21. The second side member 54 is disposed on the right of the second shock absorber 34. The second side member 54 is disposed above the second shock absorber 34.

The second shock-absorbing mechanism 36 includes the second shock absorber 34, the second rotation prevention portion 7, the second bracket 336 and a second side support member 54A. The second rotation prevention portion 7 includes a second guide 71 and a second rod member 72. The second shock absorber 34 includes a second outer tube 73 and a second inner tube 74. A portion of the second inner tube 74 is inserted into the inner circumference of the second outer tube 73.

Figure 12:
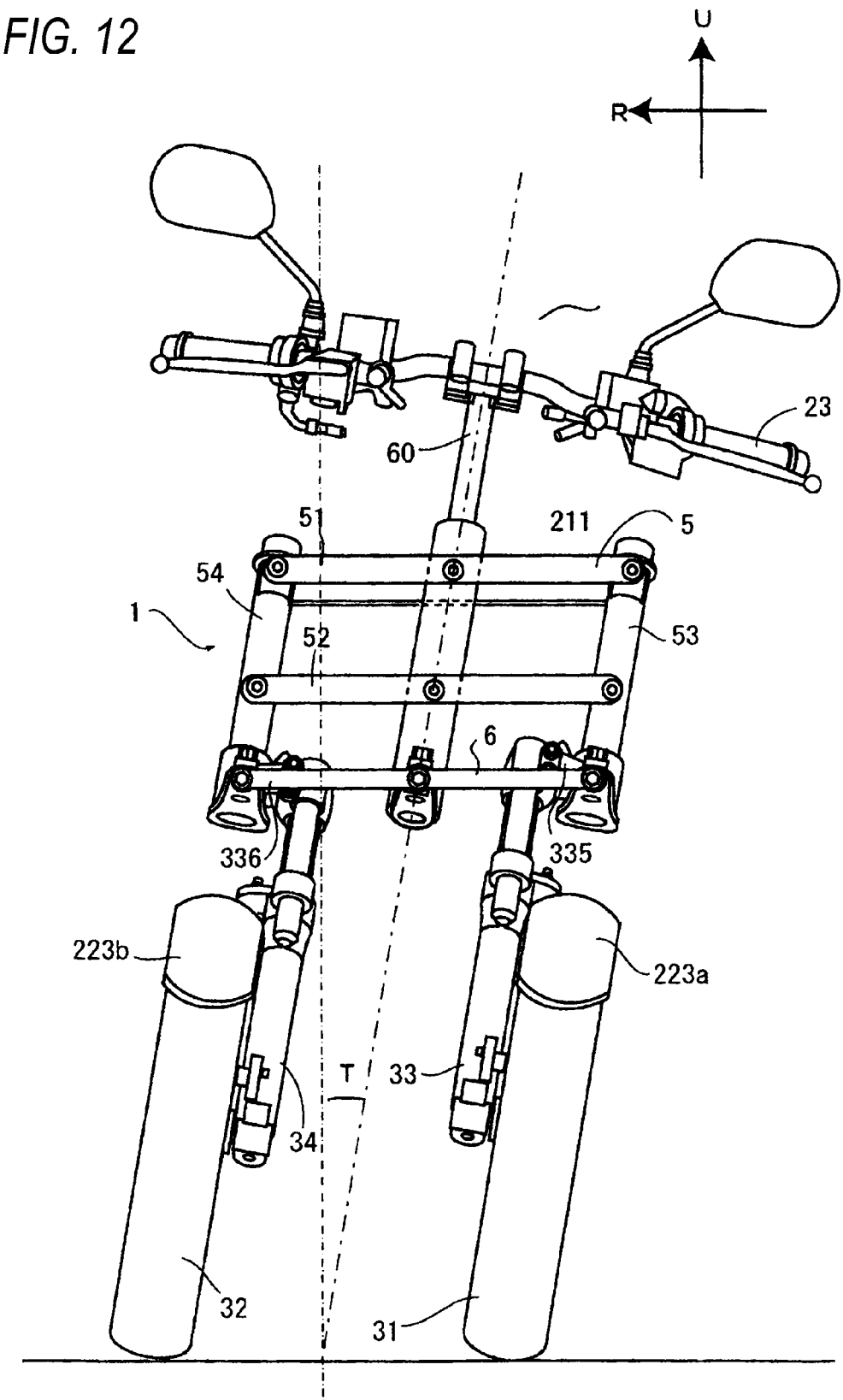
FIG. 12 is an overall front view showing the three-wheel vehicle of FIG. 9 in the tilted state thereof.

FIG. 12 is an overall front view showing the three-wheel vehicle 1 of which vehicle body is tilted by an angle T with respect to the vertical direction from the state shown in FIG. 10. When the three-wheel vehicle 1 is tilted with respect to the vertical direction, the first cross member 51 is rotated with respect to the first side member 53 and the second side member 54. The second cross member 52 is rotated with respect to the first side member 53 and the second side member 54. The left end of the first cross member 51 is moved further leftward than the left end of the second cross member 52. Hence, the first side member 53 and the second side member 54 are tilted leftward with respect to the vertical direction. In accordance with the tilting of the first side member 53 and the second side member 54 with respect to the vertical direction, the first shock absorber 33 and the second shock absorber 34 are tilted with respect to the vertical direction. In this way, the three-wheel vehicle 1 is tilted leftward with respect to the vertical direction, and the three-wheel vehicle 1 is changed from the state shown in FIG. 10 to the state shown in FIG. 12.

FIG. 13 is a perspective view showing the first shock-absorbing mechanism 35 and the first front wheel 31. The first inner tube 332 is disposed above the first outer tube 331. The first inner tube 332 is movable relatively with respect to the first outer tube 331 in the extension direction of the first outer tube 331. The first bracket 335 is disposed at the upper portion of the first inner tube 332. The upper portion of the first inner tube 332 is secured to the first bracket 335. The first shock absorber 33 preferably is the so-called telescopic shock absorber, for example. A first brake device 337 is installed on the first outer tube 331. The upper end of the first brake device 337 is disposed below the lower end of the first rotation prevention portion 8 in a side view. The first brake device 337 stops the rotation of the first front wheel.

The first rotation prevention portion 8 prevents the relative rotation between the first outer tube 331 and the first inner tube 332. The first rotation prevention portion 8 prevents the first outer tube 331 from rotating about the center of the first inner tube 332.

The first guide 81 guides the movement of the first rod member 82. The first guide 81 is preferably configured integrally with the first outer tube 331 by casting. The first guide 81 includes a guide cylinder 812. The guide cylinder 812 includes a first insertion hole 812a. The first rod member 82 is movable inside the first insertion hole 812a. The first rod member 82 is disposed in the first insertion hole 812a of the guide cylinder 812. The first rod member 82 extends in the extension direction of the first shock absorber 33. The first rod member 82 is disposed parallel or substantially parallel with the first shock absorber 33. The first brake device 337 is disposed in the space provided below the first rod member 82. The first rod member 82 is shorter and lighter than the first shock absorber 33. The lower end of the first rod member 82 is positioned above the lower end of the first shock absorber 33. The cross-sectional area of the upper portion of the first rod member 82 is larger than the cross-sectional area of the lower portion thereof.

The first bracket 335 is disposed at the upper portion of the first shock absorber 33. The first bracket 335 is used to secure the upper portion of the first inner tube 332. The first bracket 335 is used to secure the upper portion of the first rod member 82. The first bracket 335 is used to secure the lower portion of the first side support member 53A. The first side support member 53A is rotatable relatively with respect to the first side member 53. The first bracket 335 is supported on the first side member 53 so as to be rotatable about the second rotation axis 312. The first side support member 53A is secured to the first bracket 335 so as not to be movable in the up-down direction with respect thereto.

The first rotation shaft 311 supported at the lower end of the first shock absorber 33 is positioned at a position closer to the axis 33a of the first shock absorber 33 than the axis 82a of the first rod member 82 in a side view.

Figure 14:
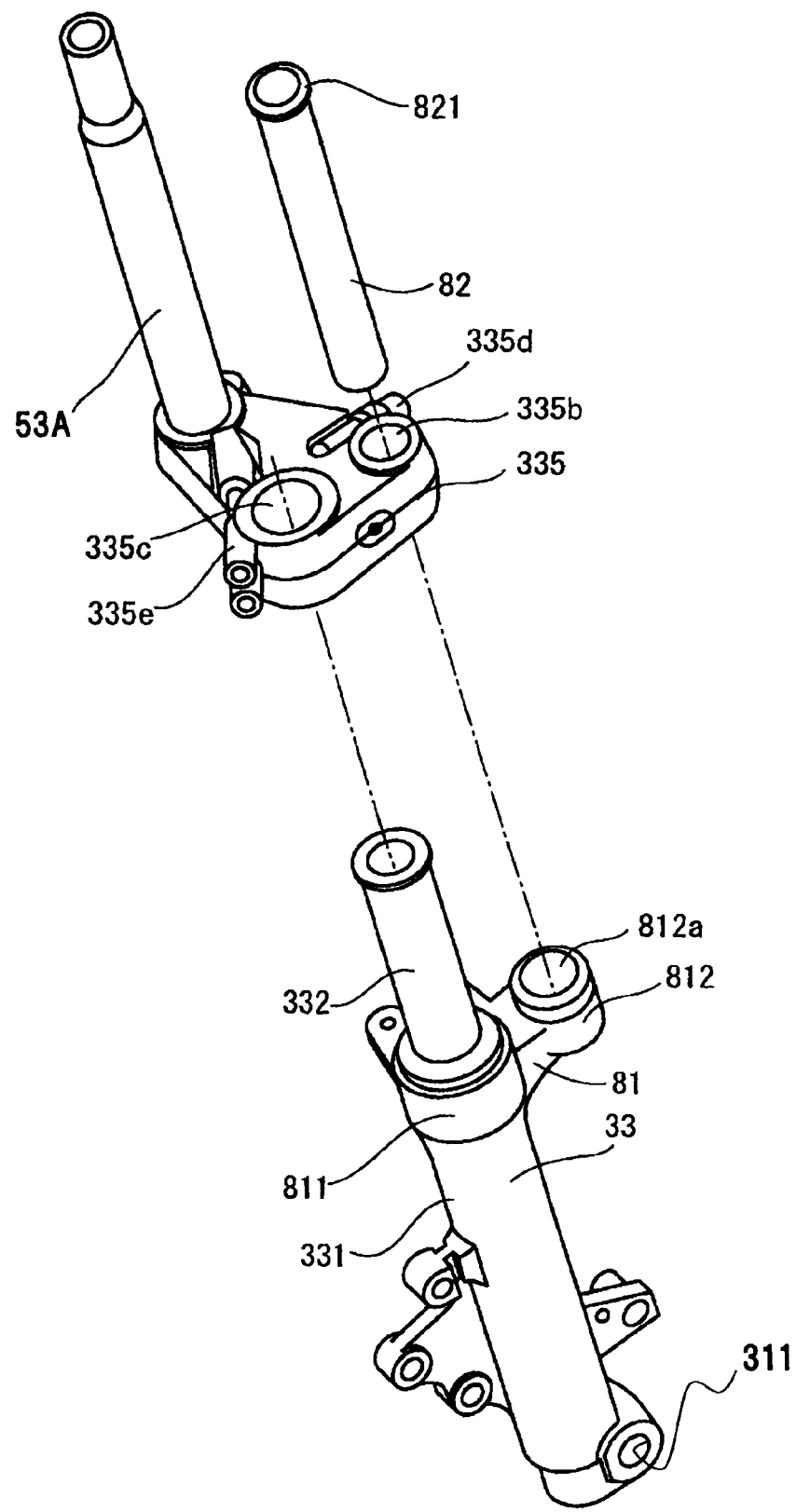
FIG. 14 is a view showing the first shock-absorbing mechanism of the three-wheel vehicle of FIG. 9 in the disassembled state thereof.

FIG. 14 is an exploded perspective view showing a state in which the first shock-absorbing mechanism 35 is disassembled. In FIG. 14, the first front wheel 31 is not shown. The second guide cylinder 812 of the first guide 81 guides the movement direction of the first rod member 82. The second guide cylinder 812 does not secure the first rod member 82. Hence, the first rod member 82 is provided so as to be movable with respect to the second guide cylinder 812 in the extension direction of the first rod member 82.

The first bracket 335 includes a first through hole 335b, a second through hole 335c, a first adjustment screw 335d and a second adjustment screw 335e. The first rod member 82 is inserted into the first through hole 335b. A large diameter portion 821 is provided at one end of the first rod member 82. The large diameter portion 821 is larger than the other portion of the first rod member 82 in diameter. The first through hole 335b is smaller than the large diameter portion 821 in diameter. The first inner tube 332 is inserted into the second through hole 335c. The first adjustment screw 335d is disposed close to the first through hole 335b. The first adjustment screw 335d is used to adjust the diameter of the first through hole 335b. The second adjustment screw 335e is disposed close to the second through hole 335c. The second adjustment screw 335e is used to adjust the diameter of the second through hole 335c.

The first shock-absorbing mechanism 35 is assembled as described below. The second adjustment screw 335e is adjusted to allow the diameter of the second through hole 335c to become larger, and the first inner tube 332 is inserted into the second through hole 335c from the lower side to the upper side of the second through hole 335c. Then, the second adjustment screw 335e is adjusted. The first rod member 82 is inserted into the first through hole 335b from the upper side to the lower side of the first through hole 335b. Then the first adjustment screw 335d is adjusted, and the first rod member 82 is secured to the first bracket 335. The first bracket 335 connects the first inner tube 332 and the first rod member 82. In this state, when the first inner tube 332 is further inserted into the first outer tube 331, the first bracket 335 and the first rod member 82 are moved downward in accordance with the insertion of the first inner tube 332.

The characteristics of the reference example will be described below.

In the reference example, the first shock-absorbing mechanism 35 prevents the relative rotation of the first outer tube 331 and the first inner tube 332. In other words, the first shock-absorbing mechanism 35 prevents the first outer tube 331 from rotating about the center of the first inner tube 332.

When the first outer tube 331 is going to rotate relatively with respect to the first inner tube 332, the first rod member 82 is going to rotate about the center of the first shock absorber 33 by the first guide 81 that is secured to the first outer tube 331. Since the first rod member 82 is connected to the first inner tube 332 via the first bracket 335, the first rod member 82 cannot rotate about the center of the first shock absorber 33 unless the first bracket 335 rotates. This is also applicable to the second shock-absorbing mechanism 36.

In the above-mentioned three-wheel vehicle 1, the first rod member 82 is lighter than the first shock absorber 33. For this reason, the unsprung weight of the vehicle is made smaller than that in the case that the weight of the first rod member 82 is equal to or greater than that of the first shock absorber 33.

In the above-mentioned three-wheel vehicle 1, the first rod member 82 is shorter than the first shock absorber 33. For example, in the case of a configuration in which a rod member having the same length as that of the first shock absorber 33 is used instead of the first rod member 82 to support the first front wheel 31 together with the first shock absorber 33, the following problem will occur. The shock absorber can extend and contract in the extension direction of the shock absorber. In the case that the installation accuracy of the shock absorber and the rod member supporting the first front wheel 31 is poor, for example, in the case that the distance between the lower end of the shock absorber and the lower end of the rod member is larger than the distance between the upper end of the shock absorber and the upper end of the rod member, the shock absorber may be tilted with respect to the vertical direction. In this case, the shock absorber becomes hard to extend/contract and becomes hard to absorb impact. Hence, in the configuration in which the shock absorber and the rod member have the same length, the shock absorber and the rod member are required to be disposed accurately parallel or substantially parallel with each other. However, if the length of the rod member is longer, it is difficult to dispose the rod member parallel or substantially parallel with the shock absorber. In the above-mentioned three-wheel vehicle 1, since the first rod member 82 is shorter than the first shock absorber 33, the first shock absorber 33 and the first rod member 82 are easily disposed parallel or substantially parallel with each other.

In the three-wheel vehicle 1, the first rod member 82 is shorter than the first shock absorber 33. For this reason, a space is provided below the first rod member 82. In the three-wheel vehicle 1, the first brake device 337 is disposed in this space. As a result, the configuration around the first front wheel 31 and the first shock absorber 33 becomes compact.

When the first rod member 82 is installed in the first bracket 335, the first rod member 82 is inserted into the first through hole 335b from the upper side to the lower side of the first through hole 335b, and the first adjustment screw 335d is adjusted, such that the first rod member 82 is installed in the first bracket 335. With this configuration, the assembly is facilitated.

Second Preferred Embodiment

A second preferred embodiment of the suspension device according to the preferable preferred embodiments of the present invention will be described below referring to FIGS. 15 and 16.

A third shock-absorbing mechanism 9 according to the second preferred embodiment is installed in the three-wheel vehicle 1 described in the above-mentioned reference example, instead of the first shock-absorbing mechanism 35 and the second shock-absorbing mechanism 36.

Figure 15:
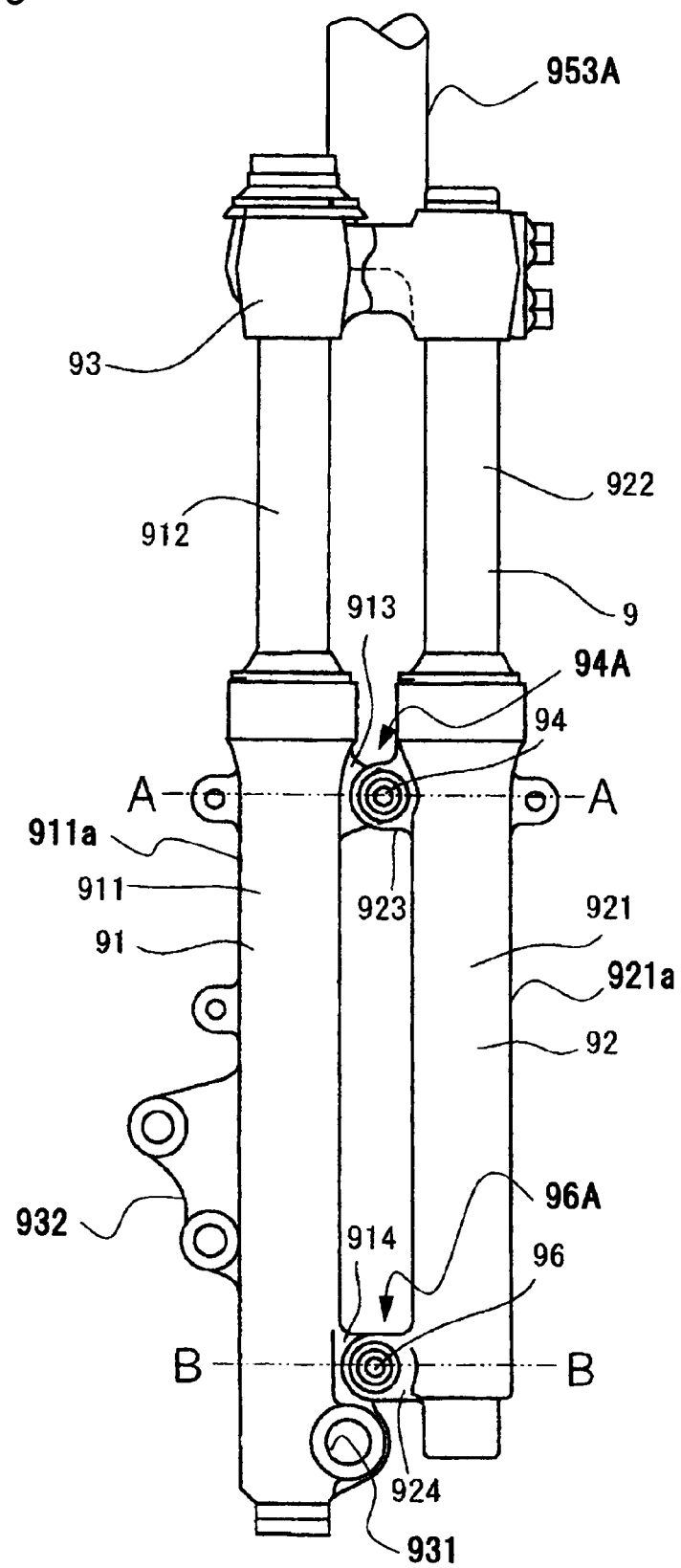
FIG. 15 is a front view showing a shock-absorbing mechanism according to a second preferred embodiment of the present invention.

FIG. 15 shows the third shock-absorbing mechanism 9 (an example of the suspension device according to a preferred embodiment of the present invention) according to the second preferred embodiment. The third shock-absorbing mechanism 9 includes a third shock absorber 91 (an example of the first telescopic element according to a preferred embodiment of the present invention), a fourth shock absorber 92 (an example of the second telescopic element according to a preferred embodiment of the present invention) and a bracket 93 (an example of the vehicle body support portion according to a preferred embodiment of the present invention, an example of the inner connection portion). The bracket 93 preferably has a configuration similar to those of the first bracket 335 and the second bracket 336. The third shock absorber 91 supports the front wheel at the lower portion thereof. The third shock absorber 91 includes a wheel support portion 931. The third shock-absorbing mechanism 9 includes the wheel support portion 931 (an example of the component support portion according to a preferred embodiment of the present invention) configured to support the front wheel. The extension/contraction direction of the fourth shock absorber 92 is parallel or substantially parallel with the extension/contraction direction of the third shock absorber 91 as viewed from the rotation axis direction of the front wheel supported on the wheel support portion 931.

The upper portion of the third shock absorber 91 is secured to the bracket 93. The third shock absorber 91 includes a third outer tube 911 (an example of the first outer portion according to a preferred embodiment of the present invention) and a third inner tube 912 (an example of the first inner portion according to a preferred embodiment of the present invention). The third shock absorber 91 preferably is the so-called telescopic shock absorber, for example. The lower end portion of the third inner tube 912 is inserted into the third outer tube 911. The third inner tube 912 is movable relatively with respect to the third outer tube 911 in the extension/contraction direction thereof. The third outer tube 911 includes a third outer tube main body 911a, the wheel support portion 931, a first fixing plate 913 and a second fixing plate 914. The third outer tube 911 includes a caliper support portion 932. The caliper support portion 932 supports a brake caliper, not shown. The first fixing plate 913 and the second fixing plate 914 are arranged in the extension/contraction direction of the third shock absorber 91 on the side portion of the third outer tube main body 911a. The first fixing plate 913 and the second fixing plate 914 are each provided with a mounting hole. The first fixing plate 913 and the second fixing plate 914 extend from the third outer tube 911 to the fourth shock absorber 92. The first fixing plate 913 is positioned above the second fixing plate 914. The fourth shock absorber 92 (an example of the second telescopic element according to a preferred embodiment of the present invention) includes a fourth outer tube 921 (an example of the second outer portion according to a preferred embodiment of the present invention) and a fourth inner tube 922 (an example of the second inner portion according to a preferred embodiment of the present invention).

The fourth shock absorber 92 preferably is the so-called telescopic shock absorber, for example. The lower end portion of the fourth inner tube 922 is inserted into the fourth outer tube 921. The fourth inner tube 922 is movable relatively with respect to the fourth outer tube 921 in the extension/contraction direction thereof. The fourth shock absorber 92 is lighter than the third shock absorber 91. The fourth shock absorber 92 is shorter than the third shock absorber 91. The fourth shock absorber 92 is shorter than the third shock absorber 91 in the extension/contraction direction thereof. The fourth outer tube 921 is shorter than the third outer tube 911 in the extension/contraction direction thereof.

The upper portion of the fourth inner tube 922 is secured to the bracket 93. The fourth outer tube 921 is disposed below the fourth inner tube 922. The fourth outer tube 921 includes a fourth outer tube body 921a, a third fixing plate 923 and a fourth fixing plate 924. The third fixing plate 923 and the fourth fixing plate 924 are arranged in the extension/contraction direction of the fourth shock absorber 92 on the side portion of the fourth outer tube body 921a. The third fixing plate 923 and the fourth fixing plate 924 are each provided with a mounting hole. The third fixing plate 923 is positioned above the fourth fixing plate 924. The third fixing plate 923 is positioned at the same level as that of the first fixing plate 913. The fourth fixing plate 924 is positioned at the same level as that of the second fixing plate 914. The mounting hole provided in the third fixing plate 923 is overlapped with the mounting hole provided in the first fixing plate 913. The mounting hole provided in the fourth fixing plate 924 is overlapped with the mounting hole provided in the second fixing plate 914.

The upper portion of the third inner tube 912 and the upper portion of the fourth inner tube 922 are secured to the bracket 93. The upper portion of the third inner tube 912 and the upper portion of the fourth inner tube 922 are connected to each other via the bracket 93. The third outer tube 911 and the fourth outer tube 921 are connected to each other via a first outer connection portion 94A and a second outer connection portion 96A arranged in the extension/contraction direction of the fourth shock absorber 92. The third outer tube 911 and the fourth outer tube 921 are connected to each other via a first bolt 94 and a second bolt 96 arranged in the extension/contraction direction of the fourth shock absorber 92. The first outer connection portion 94A connects the upper portion of the third outer tube 911 and the upper portion of the fourth outer tube 921 in the extension/contraction direction of the fourth shock absorber 92. The second outer connection portion 96A connects the lower portion of the third outer tube 911 and the lower end portion of the fourth outer tube 921 in the extension/contraction direction of the fourth shock absorber 92. The first outer connection portion 94A includes the first fixing plate 913, the third fixing plate 923 and the first bolt 94. The second outer connection portion 96A includes the second fixing plate 914, the fourth fixing plate 924 and the second bolt 96. The wheel support portion 931 is positioned below the second outer connection portion 96A in the extension/contraction direction of the fourth shock absorber 92. The wheel support portion 931 is disposed below the second bolt 96 in the extension/contraction direction of the fourth shock absorber 92.

The third shock-absorbing mechanism 9 includes a side support portion 953A. The lower portion of the side support portion 953A is secured to the bracket 93.

Figure 16A:
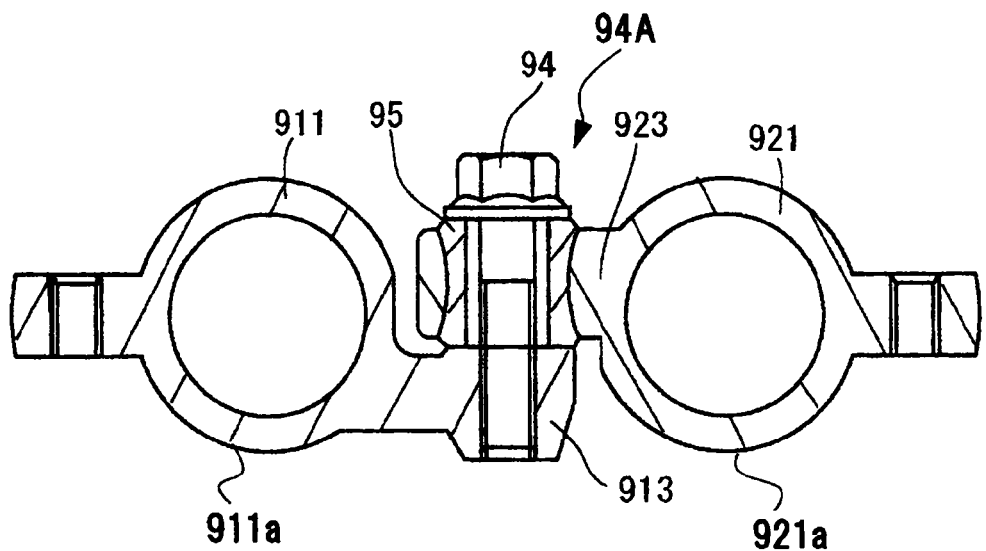
FIGS. 16A and 16B are sectional views showing the shock-absorbing mechanism according to the second preferred embodiment of the present invention.
Figure 16B:
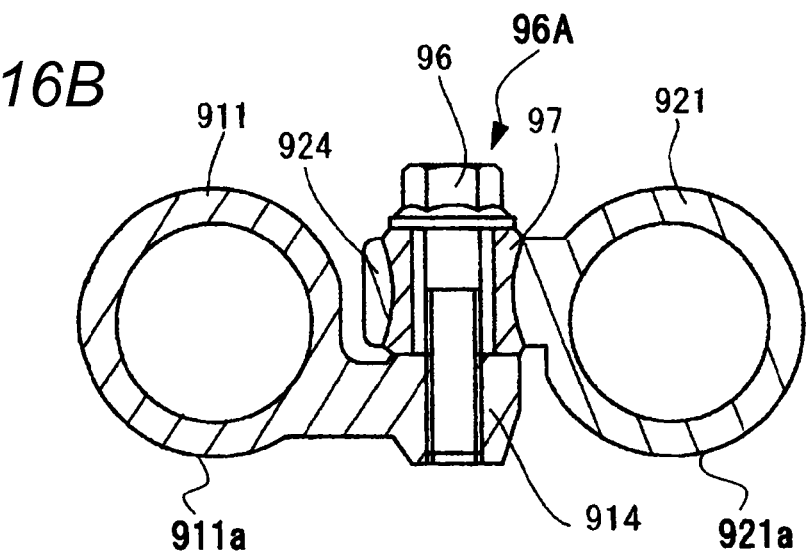

FIG. 16A is a sectional view taken on line A-A of FIG. 15. FIG. 16B is a sectional view taken on line B-B of FIG. 15.

As shown in FIG. 16A, the first outer connection portion 94A connects the first fixing plate 913 and the third fixing plate 923 via the first bolt 94. A first elastic member 95 is disposed between the first bolt 94 and the mounting hole provided in the third fixing plate 923. The first elastic member 95 covers the circumference of the first bolt 94 in the circumferential direction thereof.

As shown in FIG. 16B, the second outer connection portion 96A connects the second fixing plate 914 and the second fixing plate 924 via the second bolt 96. A second elastic member 97 is disposed between the second bolt 96 and the mounting hole provided in the fourth fixing plate 924. The second elastic member 97 covers the circumference of the second bolt 96 in the circumferential direction thereof.

The configuration of the third shock-absorbing mechanism 9 is made simple since the mechanism does not require a member corresponding to the first guide 81 in the above-mentioned reference example. Since the third shock-absorbing mechanism 9 includes the third shock absorber 91 and the fourth shock absorber 92, the mechanism is configured to absorb larger impact than the first shock-absorbing mechanism 35 and the second shock-absorbing mechanism 36. The third shock-absorbing mechanism 9 does not require high installation accuracy because the first elastic member 95 is disposed around the first bolt 94 and the second elastic member 97 is disposed around the second bolt 96.

The suspension device (the third shock-absorbing mechanism 9) according to the above-mentioned second preferred embodiment preferably includes the first telescopic element (the third shock absorber 91), the second telescopic element (the fourth shock absorber 92), the wheel support portion (the wheel support portion 931) and the vehicle body support portion (the bracket 93).

The first telescopic element (the third shock absorber 91) includes the first outer portion (the third outer tube 911) and the first inner portion (the third inner tube 912), one end portion of which is inserted into the first outer portion (the third outer tube 911). The first telescopic element (the third shock absorber 91) is configured to extend and contract by relative movement of the first inner portion (the third inner tube 912) with respect to the first outer portion (the third outer tube 911).

The second telescopic element (the fourth shock absorber 92) includes the second outer portion (the fourth outer tube 921) connected to the first outer portion (the third outer tube 911) and the second inner portion (the fourth inner tube 922), one end portion of which is inserted into the second outer portion (the fourth outer tube 921) and which is connected to the first inner portion (the third inner tube 912). The second telescopic element (the fourth shock absorber 92) is configured to extend and contract by relative movement of the second inner portion (the fourth inner tube 922) with respect to the second outer portion (the fourth outer tube 921).

The wheel support portion (the wheel support portion 931) supports the wheel on the outer element including the first outer portion (the third outer tube 911), the second outer portion (the fourth outer tube 921) and the outer connection portion (the first outer connection portion 94A, the second outer connection portion 96A) that is used to connect the first outer portion and the second outer portion.

The vehicle body support portion (the bracket 93) supports the inner element on the vehicle body of the vehicle.

The second outer portion (the fourth outer tube 921) is smaller than the first outer portion (the third outer tube 911). Furthermore, the second outer portion (the fourth outer tube 921) is connected to the first outer portion (the third outer tube 911) via the plurality of outer connection portions (the first outer connection portion 94A, the second outer connection portion 96A) arranged in the extension/contraction direction of the second telescopic element (the fourth shock absorber 92).

The second inner portion (the fourth inner tube 922) is smaller than the first inner portion (the third inner tube 912). The second inner portion (the fourth inner tube 922) is connected to the first inner portion (the third inner tube 912) via at least one inner connection portion (the bracket 93).

The second telescopic element (the fourth shock absorber 92) is disposed at a position in which the extension/contraction direction of the second telescopic element (the fourth shock absorber 92) is parallel or substantially parallel with the extension/contraction direction of the first telescopic element (the third shock absorber 91) as viewed from the rotation axis direction of the wheel supported via the wheel support portion (the wheel support portion 931). In the case that the suspension device (the third shock-absorbing mechanism 9) according to the above-mentioned second preferred embodiment is installed on the vehicle, the rotation axis direction of the wheel supported on the wheel support portion (the wheel support portion 931) is aligned with the left-right direction of the vehicle in the upright state of the vehicle. Hence, the second telescopic element (the fourth shock absorber 92) in the state of being installed on the vehicle is disposed at a position in which the extension/contraction direction of the second telescopic element (the fourth shock absorber 92) is parallel or substantially parallel with the extension/contraction direction of the first telescopic element (the third shock absorber 91) as viewed from the left-right direction of the vehicle in the upright state of the vehicle.

Moreover, the second telescopic element (the fourth shock absorber 92) is disposed at a position in which the element is overlapped with at least a portion of the first telescopic element (the third shock absorber 91) as viewed from any one direction vertical with respect to the rotation axis of the wheel supported on the wheel support portion (the wheel support portion 931). The second telescopic element (the fourth shock absorber 92) in the state of being installed on the vehicle is disposed at a position in which the element is overlapped with at least a portion of the first telescopic element (the third shock absorber 91) as viewed from the front of the vehicle in the upright state of the vehicle.

With this configuration, the second outer portion (the fourth outer tube 921) is smaller than the first outer portion (the third outer tube 911). In addition, the second inner portion (the fourth inner tube 922) is smaller than the first inner portion (the third inner tube 912). For this reason, there is a danger that the rigidity of the suspension device (the third shock-absorbing mechanism 9) having this configuration may be lower than the rigidity of the suspension device (the third shock-absorbing mechanism 9) equipped with two telescopic elements having the same size.

However, with this configuration, although the second outer portion (the fourth outer tube 921) is smaller than the first outer portion (the third outer tube 911), the second outer portion is connected to the first outer portion (the third outer tube 911) via the plurality of outer connection portions (the first outer connection portion 94A, the second outer connection portion 96A) arranged in the extension/contraction direction of the second telescopic element (the fourth shock absorber 92).

In addition, although the second inner portion (the fourth inner tube 922) is smaller than the first inner portion (the third inner tube 912), the second inner portion is connected to the first inner portion (the third inner tube 912) via at least one inner connection portion (the bracket 93). Hence, the second telescopic element (the fourth shock absorber 92) is connected to the first telescopic element (the third shock absorber 91) at least at three positions in the extension/contraction direction of the second telescopic element (the fourth shock absorber 92).

Furthermore, the second telescopic element (the fourth shock absorber 92) is disposed at a position in which the extension/contraction direction of the second telescopic element (the fourth shock absorber 92) is parallel or substantially parallel with the extension/contraction direction of the first telescopic element (the third shock absorber 91) as viewed from the rotation axis direction of the wheel supported via the wheel support portion (the wheel support portion 931).

In addition, the second telescopic element (the fourth shock absorber 92) is disposed at a position in which the element is overlapped with at least a portion of the first telescopic element (the third shock absorber 91) as viewed from any one direction vertical with respect to the rotation axis of the wheel supported on the wheel support portion (the wheel support portion 931). Hence, the second telescopic element (the fourth shock absorber 92) is configured to prevent the deformation of the first telescopic element (the third shock absorber 91) due to the load applied from the road surface to the supported wheel, the so-called splint function. As a result, the suspension device (the third shock-absorbing mechanism 9) secures rigidity sufficient to endure the load applied from the road surface to the supported wheel.

With this configuration, the second outer portion (the fourth outer tube 921) is smaller than the first outer portion (the third outer tube 911). In addition, the second inner portion (the fourth inner tube 922) has a size equal to or smaller than the first inner portion (the third inner tube 912). For this reason, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized.

Hence, with this configuration, the vehicle equipped with the suspension device is downsized while securing rigidity sufficient to endure the load applied from the road surface to the supported wheel.

Note that, the second inner portion (the fourth inner tube 922) may have the same size as that of the first inner portion (the third inner tube 912). Also in this case, the above-mentioned advantage is obtained. Furthermore, the wheel support portion (the wheel support portion 931) supports the wheel on the inner element including the first inner portion and the second inner portion (the fourth inner tube 922) connected thereto, and the vehicle body support portion (the bracket 93) may be able to support the outer element on the vehicle body of the vehicle. Also in this case, the above-mentioned advantage is obtained.

The suspension device (the third shock-absorbing mechanism 9) according to the above-mentioned second preferred embodiment preferably is further equipped with the following configuration.

The second outer portion (the fourth outer tube 921) is made shorter than the first outer portion (the third outer tube 911) in the extension/contraction direction of the second telescopic element (the fourth shock absorber 92). Furthermore, the second outer portion (the fourth outer tube 921) is connected to the first outer portion (the third outer tube 911) via the plurality of outer connection portions (the first outer connection portion 94A, the second outer connection portion 96A) arranged in the extension/contraction direction of the second telescopic element (the fourth shock absorber 92).

With this configuration, since the second outer portion (the fourth outer tube 921), that is, the larger component in the second telescopic element (the fourth shock absorber 92), is made shorter, the second telescopic element (the fourth shock absorber 92) is made shorter than the first telescopic element (the third shock absorber 91). In addition, since the second outer portion (the fourth outer tube 921) is connected to the first outer portion (the third outer tube 911) via the plurality of outer connection portions (the first outer connection portion 94A, the second outer connection portion 96A) arranged in the extension/contraction direction of the second telescopic element (the fourth shock absorber 92), the lowering of rigidity is significantly reduced or prevented. For this reason, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment preferably is further equipped with the following configuration.

The second telescopic element (the fourth shock absorber 92) is shorter than the first telescopic element (the third shock absorber 91). The first telescopic element (the third shock absorber 91) is equipped with the component support portion (the wheel support portion 931) configured to support components in a concave portion configured to include the first telescopic element (the third shock absorber 91) and the second telescopic element (the fourth shock absorber 92) as viewed from the rotation axis direction of the wheel supported via the wheel support portion (the wheel support portion 931).

Usually, the component support portion (the wheel support portion 931) configured to support the components installed on the vehicle is provided around the first telescopic element (the third shock absorber 91) and the second telescopic element (the fourth shock absorber 92). With this configuration, since the second outer portion (the fourth outer tube 921) is made shorter than the first outer portion (the third outer tube 911) in the extension/contraction direction of the second telescopic element (the fourth shock absorber 92), the lower end of the second outer portion (the fourth outer tube 921) is positioned above the lower end of the first outer portion (the third outer tube 911) in the extension/contraction direction of the second telescopic element (the fourth shock absorber 92). Hence, the concave portion is configured to include the first telescopic elements (the third shock absorber 91) and the second telescopic elements (the fourth shock absorber 92). The component support portion (the wheel support portion 931) configured to support the components installed on the vehicle (the vehicle 1001) is provided in the concave portion. For this reason, the suspension device (the third shock-absorbing mechanism 9) is downsized. Hence, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

Note that, the component support portion (the wheel support portion 931) may be provided on the second telescopic element (the fourth shock absorber 92). Also in this case, the above-mentioned advantage is obtained.

The suspension device (the third shock-absorbing mechanism 9) according to the above-mentioned second preferred embodiment preferably is further equipped with the following configuration. The concave portion is provided in the outer element.

With this configuration, the concave portion is easily configured to include the first telescopic element (the third shock absorber 91) and the second telescopic element (the fourth shock absorber 92) that is shorter than the first telescopic element (the third shock absorber 91). Furthermore, since the first outer portion (the third outer tube 911) and the second outer portion (the fourth outer tube 921) are connected via the plurality of outer connection portions (the first outer connection portion 94A, the second outer connection portion 96A), the rigidity of the outer element is high. Since the concave portion is provided in the outer element having high rigidity, the concave portion is configured by a simple structure. For this reason, the suspension device (the third shock-absorbing mechanism 9) is downsized. Hence, in the case that the suspension device (the third shock-absorbing mechanism 9) according to the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment preferably is further equipped with the following configuration. The inner connection portion (the bracket 93) connects the other end portion of the first inner portion (the third inner tube 912) to the other end portion of the second inner portion (the fourth inner tube 922).

With this configuration, since the inner connection portion (the bracket 93) connects the other end portion of the first inner portion (the third inner tube 912) to the other end portion of the second inner portion (the fourth inner tube 922), the concave portion is provided on one end side of the second telescopic element (the fourth shock absorber 92) that is shorter than the first telescopic element (the third shock absorber 91). Since the component support portion is configured to include the concave portion, the space thereof is used efficiently, and the suspension device (the third shock-absorbing mechanism 9) is downsized. Hence, in the case that the suspension device (the third shock-absorbing mechanism 9) according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment is preferably further equipped with the following configuration. The wheel support portion (the wheel support portion 931) is provided on the outer element. The vehicle body support portion (the bracket 93) is provided on the inner element.

With this configuration, since the first outer portion (the third outer tube 911) and the second outer portion (the fourth outer tube 921) are connected via the plurality of outer connection portions (the first outer connection portion 94A, the second outer connection portion 96A), the rigidity of the outer element is high. Since the wheel support portion (the wheel support portion 931) is provided on the outer elements having high rigidity, the wheel support portion (the wheel support portion 931) is configured by a simple structure. For this reason, the suspension device (the third shock-absorbing mechanism 9) is downsized. Hence, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

This configuration is preferably combined with one of the above-mentioned configurations. Since the wheel support portion (the wheel support portion 931) is provided in the concave portion configured to include the first telescopic element (the third shock absorber 91) and the second telescopic element (the fourth shock absorber 92), the suspension device (the third shock-absorbing mechanism 9) is downsized. Hence, in the case that the suspension device (the third shock-absorbing mechanism 9) according to a preferred embodiment of the present invention is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment is further equipped with the following configuration. The inner connection portion (the bracket 93) connects the other end portion of the first inner portion (the third inner tube 912) to the other end portion of the second inner portion (the fourth inner tube 922). The vehicle body support portion (the bracket 93) is provided on the inner connection portion (the bracket 93).

With this configuration (7), since the inner connection portion (the bracket 93) connects the other end portion of the first inner portion (the third inner tube 912) to the other end portion of the second inner portion (the fourth inner tube 922) and the vehicle body support portion (the bracket 93) is provided on the inner connection portion (the bracket 93), the distance between the first inner portion (the third inner tube 912) and the second inner portion (the fourth inner tube 922) is small. For this reason, the suspension device (the third shock-absorbing mechanism 9) is downsized. Hence, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment may be further equipped with the following configuration. The wheel support portion (the wheel support portion 931) is provided on the inner element. The wheel body support portion is provided on the outer element.

One end of the inner portion is inserted into the outer portion. Hence, the inner portion is smaller than the outer portion in the direction vertical with respect to the extension/contraction direction of the telescopic element. With this configuration, the wheel support portion (the wheel support portion 931) is provided on the inner element including the inner portion that is smaller than the outer portion. In addition, the larger outer portion is disposed away from the wheel. For this reason, the suspension device (the third shock-absorbing mechanism 9) is downsized. Hence, in the case that this suspension device (the third shock-absorbing mechanism 9) is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment preferably may be further equipped with the following configuration. The outer element includes the first outer portion (the third outer tube 911), the second outer portion (the fourth outer tube 921) and the outer connection portion. The vehicle body support portion is provided on the first outer portion (the third outer tube 911).

With this configuration, the vehicle body support portion is configured to include the first outer portion (the third outer tube 911) that is larger than the second outer portion (the fourth outer tube 921). For this reason, the suspension device (the third shock-absorbing mechanism 9) is downsized. Hence, in the case that the suspension device (the third shock-absorbing mechanism 9) is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

The suspension device (the third shock-absorbing mechanism 9) according to the above-mentioned second preferred embodiment preferably is further equipped with the following configuration. The inner connection portion (the bracket 93) connects the other end portion of the first inner portion (the third inner tube 912) to the other end portion of the second inner portion (the fourth inner tube 922) at the same position in the extension/contraction direction of the second telescopic element (the fourth shock absorber 92). The inner connection portion (the bracket 93) includes the upper end portion of the first inner portion (the third inner tube 912) and the upper end portion of the second inner portion (the fourth inner tube 922) on an imaginary plane vertical with respect to the extension/contraction direction of the second telescopic element (the fourth shock absorber 92).

With this configuration, the inner connection portion (the bracket 93) is small. For this reason, the suspension device (the third shock-absorbing mechanism 9) is downsized. Hence, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

This configuration is preferably combined with one of the above-mentioned configurations. With this configuration, the concave portion configured to include the first telescopic element (the third shock absorber 91 and the second telescopic element (the fourth shock absorber 92) is large. For this reason, the suspension device (the third shock-absorbing mechanism 9) is downsized. Hence, in the case that the suspension device (the third shock-absorbing mechanism 9) according to the above-mentioned second preferred embodiment is installed on the vehicle, the interference of the two telescopic elements of the right suspension device with the left front wheel or the two telescopic elements of the left suspension device is avoided easily. Similarly, the interference of the two telescopic elements of the left suspension device with the right front wheel or the two telescopic elements of the right suspension device is avoided easily. As a result, the vehicle equipped with the suspension device is downsized further. Hence, with this configuration, the vehicle equipped with the suspension device is downsized while securing rigidity sufficient to endure the load applied from the road surface to the supported wheel.

In the case that only the first shock absorber 33 supports the first front wheel 31, the strength in the front-rear direction of the configuration supporting the first front wheel 31 is low. Hence, in the configuration in which only the first shock absorber 33 supports the first front wheel 31, the so-called judder, that is, the vibration of the first front wheel 31 and the second front wheel 32 in the front-rear direction, may occur in some cases. In the above-mentioned vehicle, the first telescopic element and the second telescopic element are arranged in the front-rear direction in a side view. Hence, the strength of the vehicle is high in the front-rear direction, and the occurrence of judder is significantly reduced or prevented.

Although the inner tube preferably is disposed above the outer tube in the shock absorber according to the above-mentioned second preferred embodiment, the present invention is not limited to this configuration. The three-wheel vehicle 1 may have a configuration in which a shock absorber configured such that the inner tube is disposed below the outer tube is used.

In the above-mentioned second preferred embodiment, the first outer connection portion 94A preferably includes the first bolt 94 and is connected by the first bolt 94. The second outer connection portion 96A preferably includes the second bolt 96 and is connected by the second bolt 96. However, the outer connection portions according to the present invention are not limited to those according to the above-mentioned second preferred embodiment. The outer connection portions according to the present invention may merely be those used to connect the first outer portion to the second outer portion, and connecting structures and elements are not limited.

In the above-mentioned first preferred embodiment, the wheel support portion preferably supports the wheel on the outer element including the first outer portion and the second outer portion connected to each other. The vehicle body support portion preferably supports the inner element including the first inner portion and the second inner portion connected to each other on the vehicle body. However, the present invention is not limited to the above-mentioned first preferred embodiment. For example, the wheel support portion may preferably support the wheel on the inner element including the first inner portion and the second inner portion connected to each other, and the vehicle body support portion may preferably support the outer element including the first outer portion and the second outer portion connected to each other on the vehicle body of the vehicle.

In the above-mentioned first preferred embodiment, the second outer portion preferably is smaller than the first outer portion and the second inner portion preferably is smaller than the first inner portion. However, the present invention is not limited to the above-mentioned first preferred embodiment. In the present invention, the second outer portion is merely required to be smaller than the first outer portion. For example, the second outer portion is smaller than the first outer portion and the second inner portion may have the same size as that of the first inner portion.

In the above-mentioned first preferred embodiment, the first sensor stay 1814 preferably is exemplified as a component support portion and the first wheel speed sensor 1081 preferably is exemplified as a component that is supported on the component support portion. However, the component support portion and the components that are supported on the component support portion according to the present invention are not limited to those according to the above-mentioned preferred embodiment. The component support portion according to the present invention may be a component support portion that is accommodated in the concave portion configured to include the first telescopic element and the second telescopic element. For example, the components that are supported on the component support portion according to the present invention may be the wheel or the vehicle body frame or may be others than those.

The up-down direction of the vehicle coincides with the direction vertical with respect to the ground surface. The left-right direction of the vehicle coincides with the direction parallel or substantially parallel with the ground surface. The vehicle described in each of the above-mentioned preferred embodiments is a tiltable vehicle. In the upright state of the vehicle, the up-down direction of the vehicle coincides with the direction vertical with respect to the ground surface. However, in the tilted state of the vehicle, the up-down direction of the vehicle body frame is inclined with respect to the ground surface. In other words, in the upright state of the vehicle, the up-down direction of the vehicle body frame coincides with the up-down direction of the vehicle. However, in the tilted state of the vehicle, the up-down direction of the vehicle body frame is inclined with respect to the up-down direction of the vehicle. In addition, in the upright state of the vehicle, the left-right direction of the vehicle body frame coincides with the left-right direction of the vehicle. However, in the tilted state of the vehicle, the left-right direction of the vehicle body frame is inclined with respect to the left-right direction of the vehicle. In the above-mentioned preferred embodiments, the directions are described to indicate the up-down direction, the left-right direction and the front-rear direction. However, the up-down direction, the left-right direction and the front-rear direction of the vehicle according to each of the above-mentioned preferred embodiments correspond to the up-down direction, the left-right direction and the front-rear direction of the vehicle body frame as describe above and can thus be replaced with the up-down direction, the left-right direction and the front-rear direction of the vehicle body frame.

The vehicles according to various preferred embodiments of the present invention and modifications thereof are vehicles equipped with a tiltable vehicle body frame and two front wheels. The number of the rear wheel is not limited to one but may be two. Furthermore, the vehicle may be equipped with a vehicle body cover configured to cover the vehicle body frame. The vehicle may not be equipped with the vehicle body cover configured to cover the vehicle body frame. The power source of the vehicle is not limited to an engine but may be an electric motor, for example.

In this description, the term "parallel" includes two straight lines in members not intersecting with each other although inclined in the range of ±40°. In the present invention, the term "along" to be used for the terms "direction" and "member" for example includes a case in which the direction and the member are inclined in the range of ±40°. In the present invention, the term "extend" to be used for the term "direction" includes a case in which the direction is inclined in the range of ±40°.

The terms and expressions used herein are used for explanation only and not for limited interpretation. No equivalents of features, elements, configurations, etc. indicated and described herein are eliminated, and various modifications within the scope of the claims of the present invention must be recognized to be allowable.

The present invention is embodied in a variety of different forms. This disclosure should be regarded to provide preferred embodiments based on the principles of the present invention. Numerous illustrated preferred embodiments have been described herein under the understanding that the present invention is not intended to be limited to the preferable preferred embodiments described and/or illustrated herein.

Some of illustrated preferred embodiments according to the present invention have been described herein. The present invention is not limited to the various preferable preferred embodiments described herein. The present invention includes all the preferred embodiments including equivalent elements, modifications, deletions, combinations (for example, the combinations of features common to various preferred embodiments), improvements and/or changes that can be recognized by those skilled in the art on the basis of this disclosure. The limitations in the claims should be construed widely on the basis of the terms used in the claims and should not be limited to the preferred embodiments described during the prosecution of the present invention or the present application. Those preferred embodiments should be construed as non-exclusive. For example, in this disclosure, the terms "preferable" and "good" are not exclusive and the meanings of the terms are "preferable but not limited to this."

This application is based on Japanese Patent Application No. 2012-235604 filed on Oct. 25, 2012, Japanese Patent Application No. 2013-138474 filed on Jul. 1, 2013, and Japanese Patent Application No. 2013-221440 filed on Oct. 24, 2013, the contents of which are hereby incorporated in the entirety by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A suspension device comprising:
a first telescopic element including a first outer portion and a first inner portion of which one end portion is inserted into the first outer portion, and configured to extend/contract by relative movement of the first inner portion with respect to the first outer portion;
a second telescopic element including a second outer portion which is connected to the first outer portion and a second inner portion of which one end portion is inserted into the second outer portion and which is connected to the first inner portion, and being configured to extend/contract by relative movement of the second inner portion with respect to the second outer portion;
a wheel support portion configured to support a wheel on one of an outer element including the first outer portion, the second outer portion and an outer connection portion connecting the first outer portion and the second outer portion and an inner element including the first inner portion, the second inner portion and an inner connection portion connecting the first inner portion and the second inner portion; and
a vehicle body support portion including a side member support portion and the inner connection portion, and configured to support the other one of the outer element and the inner element, on the vehicle body of the vehicle; wherein
the second outer portion is smaller than the first outer portion and connected to the first outer portion via a plurality of the outer connection portions arranged in an extension/contraction direction of the second telescopic element;
the second inner portion has a size equal to or smaller than the first inner portion and connected to the first inner portion via at least one inner connection portion; and
the second telescopic element is configured such that:
when viewed from a rotation axis direction of the wheel supported on the wheel support portion, the second telescopic element is disposed at a position in which the extension/contraction direction of the second telescopic element is parallel or substantially parallel with the extension/contraction direction of the first telescopic element; and
when viewed from any one direction vertical with respect to the rotation axis of the wheel supported on the wheel support portion, the second telescopic element is disposed at a position in which the second telescopic element is overlapped with at least a portion of the first telescopic element.

2. The suspension device according to claim 1, wherein the second outer portion is:
shorter than the first outer portion in the extension/contraction direction of the second telescopic element; and
connected to the first outer portion via the plurality of outer connection portions arranged in the extension/contraction direction of the second telescopic element.

3. The suspension device according to claim 1, wherein the second telescopic element is shorter than the first telescopic element; and
at least one of the first telescopic element and the second telescopic element includes a component support portion configured to support components in a concave portion that includes the first telescopic element and the second telescopic element as viewed from the rotation axis direction of the wheel supported on the wheel support portion.

4. The suspension device according to claim 3, wherein the concave portion is provided in the outer element.

5. The suspension device according to claim 4, wherein the inner connection portion connects the other end portion of the first inner portion to the other end portion of the second inner portion.

6. The suspension device according to claim 1, wherein the wheel support portion is provided on the outer element and the vehicle body support portion is provided on the inner element.

7. The suspension device according to claim 6, wherein
the inner connection portion connects the other end portion of the first inner portion to the other end portion of the second inner portion; and
the vehicle body support portion is provided on the inner connection portion.

8. The suspension device according to claim 1, wherein the vehicle body support portion is provided on the outer element.

9. The suspension device according to claim 8, wherein the vehicle body support portion is provided on the first outer portion.

10. The suspension device according to claim 1, wherein the inner connection portion connects the other end portion of the first inner portion to the other end portion of the second inner portion at the same position in the extension/contraction direction of the second telescopic element.

11. The suspension device according to claim 1, wherein the second inner portion is smaller than the first inner portion in the direction vertical with respect to the extension/contraction direction of the second telescopic element as viewed from the rotation axis direction of the wheel supported on the wheel support portion and is also smaller than the first inner portion in the direction vertical with respect to the extension/contraction direction of the second telescopic element as viewed from any one direction vertical with respect to the rotation axis of the wheel supported on the wheel support portion.

12. The suspension device according to claim 1, wherein the second outer portion is shorter than the first outer portion.

13. A vehicle having a vehicle body, a first front wheel disposed on a left side in a vehicle width direction and a second front wheel disposed on a right side in the vehicle width direction,
wherein the first front wheel is supported by a first suspension device and the second front wheel is supported by a second suspension device, each suspension device comprises:
a first telescopic element including a first outer portion and a first inner portion of which one end portion is inserted into the first outer portion, and configured to extend/contract by relative movement of the first inner portion with respect to the first outer portion;
a second telescopic element including a second outer portion which is connected to the first outer portion and a second inner portion of which one end portion is inserted into the second outer portion and which is connected to the first inner portion, and being configured to extend/contract by relative movement of the second inner portion with respect to the second outer portion;
a wheel support portion configured to support a wheel on one of an outer element including the first outer portion, the second outer portion and an outer connection portion connecting the first outer portion and the second outer portion and an inner element including the first inner portion, the second inner portion and an inner connection portion connecting the first inner portion and the second inner portion; and
a vehicle body support portion including a side member support portion and the inner connection portion, and configured to support the other one of the outer element and the inner element, on the vehicle body of the vehicle; wherein
the second outer portion is smaller than the first outer portion and connected to the first outer portion via a plurality of the outer connection portions arranged in an extension/contraction direction of the second telescopic element;
the second inner portion has a size equal to or smaller than the first inner portion and connected to the first inner portion via at least one inner connection portion; and
the second telescopic element is configured such that:
when viewed from a rotation axis direction of the wheel supported on the wheel support portion, the second telescopic element is disposed at a position in which the extension/contraction direction of the second telescopic element is parallel or substantially parallel with the extension/contraction direction of the first telescopic element; and
when viewed from any one direction vertical with respect to the rotation axis of the wheel supported on the wheel support portion, the second telescopic element is disposed at a position in which the second telescopic element is overlapped with at least a portion of the first telescopic element.

14. The vehicle according to claim 13, wherein the second outer portion is shorter than the first outer portion.

* * * * *